US012783554B2

(12) United States Patent
Lloyd et al.

(10) Patent No.: US 12,783,554 B2
(45) Date of Patent: Nov. 3, 2026

(54) DATA INTEGRATION EVALUATION AND PROFILING IN A DATABASE SYSTEM

(71) Applicant: PeerNova, Inc., San Jose, CA (US)

(72) Inventors: Abraham Lloyd, San Francisco, CA (US); Mehmet Orun, Philadelphia, PA (US)

(73) Assignee: PeerNova, Inc., San Jose, CA (US)

( * ) Notice: Subject to any disclaimer, the term of this patent is extended or adjusted under 35 U.S.C. 154(b) by 0 days.

(21) Appl. No.: 19/194,381

(22) Filed: Apr. 30, 2025

(65) Prior Publication Data

US 2025/0328547 A1 Oct. 23, 2025

Related U.S. Application Data

(63) Continuation of application No. 19/184,253, filed on Apr. 21, 2025.

(60) Provisional application No. 63/641,366, filed on May 1, 2024, provisional application No. 63/636,553, filed on Apr. 19, 2024.

(51) Int. Cl.
*G06F 16/20* (2019.01)
*G06F 16/23* (2019.01)
*G06F 16/28* (2019.01)

(52) U.S. Cl.
CPC ........ *G06F 16/285* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 9,690,820 | B1 * | 6/2017 | Girulat, Jr. | G06Q 10/0635 |
| 11,429,614 | B2 | 8/2022 | Haile | |
| 2005/0182739 | A1 | 8/2005 | Dasu et al. | |
| 2016/0147852 | A1 | 5/2016 | Effern et al. | |
| 2016/0307173 | A1 | 10/2016 | Chauhan et al. | |
| 2019/0272282 | A1 * | 9/2019 | Mencke | G06Q 10/40 |

OTHER PUBLICATIONS

"Announcing Metrics Explorer: Correlation Analysis in Northbeam", Northbeam, Jan. 6, 2025; Retrieved on Apr. 18, 2025 at https://www.northbeam.io/post/announcing-metrics-explorer-correlation-analysis-in-northbeam.

(Continued)

*Primary Examiner* — Belix M Ortiz Ditren
(74) *Attorney, Agent, or Firm* — Polygon IP, LLP

(57) ABSTRACT

A database system may be implemented in a cloud computing environment. The database system may include a storage system storing a first data set including a first plurality of database records including a first plurality of database values corresponding to a first plurality of database fields and a second data set including a second plurality of database records including a second plurality of database values corresponding to a second plurality of database fields. The database system may include a data source profiler configured to determine data set profiling information for the first plurality of database fields and the second plurality of data fields. The database system may include a data source unifier configured to determine and execute one or more operations to unify the first and second data sets.

20 Claims, 46 Drawing Sheets

(56) References Cited

OTHER PUBLICATIONS

"How to Measure Data Quality KPIs", BizBot Business Admin Tools, Mar. 7, 2025; Retrieved on Apr. 18, 2025 at https://bizbot.com/blog/how-to-measure-data-quality-kpis/.

"Identify Incomplete Records: How to quickly find and fix Missing Field Values", Insycle; Retrieved on Apr. 18, 2025 at https://support.insycle.com/hc/en-us/articles/6586223478679-Identify-Incomplete-Records.

"Splunk Enterprise Metrics", Splunk; Retrieved on Apr. 18, 2025 at https://docs.splunk.com/Documentation/Splunk/9.4.1/Metrics/Overview.

"What is Data Profiling", Ataccama, Dec. 1, 2021; Retrieved on Apr. 18, 2025 at https://www.ataccama.com/blog/what-is-data-profiling.

"What is data profiling?", IBM; Retrieved on Apr. 18, 2025 at https://www.ibm.com/think/topics/data-profiling.

Dunne, Donal, "What is Data Profiling and Why Profile your Data?", Informatica, Oct. 4, 2023; Retrieved on Apr. 18, 2025 at https://www.informatica.com/blogs/what-is-data-profiling-and-why-profile-your-data.html.html.

Gaur, Chandan, "Why Data Quality Matters/Understanding Impact on Business Success", Xenonstack, Oct. 30, 2024; Retrieved on Apr. 18, 2025 at https://www.xenonstack.com/blog/why-data-quality-matters.

Lee, Sarah, "MBA Data: How Key Correlation Fuels Smart Choices", NumberAnalytics, Apr. 12, 2025; Retrieved on Apr. 18, 2025 at https://www.numberanalytics.com/blog/mba-data-key-correlation-fuels-smart-choices.

Nutt, Werner et al., "Incomplete Databases: Missing Records and Missing Values", Lecture Notes in Computer Science, Apr. 2012; Retrieved on Apr. 18, 2025 at https://onesearch.neu.edu/discovery/fulldisplay? docid=cdi_springer_books_10_1007_978_3_642_29023_7_30&context=PC&vid=01NEU_INST:NU&lang=en&search_scope=MyInst_and_CI&adaptor=Primo%20Central&tab=Everything&query=null,contains,3642290221,AND&mode=advanced&offset=0.

Nutt, Werner et al., "Incomplete Databases: Missing Records and Missing Values", Northeastern University Scholar OneSearch, Retrieved on Apr. 18, 2025 at https://onesearch.neu.edu/discovery/fulldisplay?docid=cdi_springer_books_10_1007_978_3_642_29023_7_30&context=PC&vid=01NEU_INST:NU&lang=en&search_scope=MyInst_and_CI&adaptor=Primo%20Central&tab=Everything&query=null,contains,3642290221,AND&mode=advanced&offset=0.

Whitfield, Brennan, "Introduction to the Correlation Matrix", BuiltIn, Nov. 20, 2024; Retrieved on Apr. 18, 2025 at https://builtin.com/data-science/correlation-matrix.

* cited by examiner

900

1600

Profiling Summary
Opportunity – All Fields – Closed Won vs. Lost (PRS-0000)

1802

0% Unpopulated Fields 0 to <10% 10%- 20% 20%- 30% 30%- 50% 50%- 75% 75% to <100% 100% (Always Populated)

☐ Unpopulated Fields (Primary Scenario) (14)

| | Field Result Key | Profiled Field Display Label | Profiling Status Summary | Data Type | Net-Po... | Popul... | Popul... | Distin... | Has De... | Defau... |
|---|---|---|---|---|---|---|---|---|---|---|
| 1 | PRF-0002 | Campaign ID (CampaignId) | Success | Ref. | 0.0000% | 0 | 0.0000% | 0 | ☐ | 0 |
| 2 | PRF-0005 | Contact ID (ContactId) | Success | Ref. | 0.0000% | 0 | 0.0000% | 0 | ☐ | 0 |
| 3 | PRF-0006 | Contract ID (ContractId) | Success | Ref. | 0.0000% | 0 | 0.0000% | 0 | ☐ | 0 |
| 4 | PRF-0010 | Deleted (IsDeleted) | Success (In Progress) | Boo. | 0.0000% | 0 | 0.0000% | 0 | ☑ | 6,662 |
| 5 | PRF-0018 | Has Line Item (HasOpp...) | Success (In Progress) | Boo. | 0.0000% | 0 | 0.0000% | 0 | ☑ | 6,662 |
| 6 | PRF-0019 | Last Activity Date (LastA..) | Success | Date | 0.0000% | 0 | 0.0000% | 0 | ☐ | 0 |
| 7 | PRF-0022 | Last Referenced Date (L...) | Success (Not Required) | Date... | 0.0000% | 0 | 0.0000% | 0 | ☐ | 0 |
| 8 | PRF-0023 | Last Stage Change Date... | Success (Not Required) | Date... | 0.0000% | 0 | 0.0000% | 0 | ☐ | 0 |
| 9 | PRF-0024 | Last Viewed Date (Last...) | Success (Not Required) | Date... | 0.0000% | 0 | 0.0000% | 0 | ☐ | 0 |
| 10 | PRF-0029 | Opportunity History ID... | Success | Ref. | 0.0000% | 0 | 0.0000% | 0 | ☐ | 0 |
| 11 | PRF-0030 | Opportunity History ID... | Success | Ref. | 0.0000% | 0 | 0.0000% | 0 | ☐ | 0 |
| 12 | PRF-0035 | Price Book ID (Priceb...) | Success | Ref. | 0.0000% | 0 | 0.0000% | 0 | ☑ | 0 |
| 13 | PRF-0036 | Private (IsPrivate) | Success (In Progress) | Boo. | 0.0000% | 0 | 0.0000% | 0 | ☑ | 6,662 |
| 14 | PRF-0039 | Quantity (TotalOpport...) | Success (Not Required) | Double | 0.0000% | 0 | 0.0000% | 0 | ☐ | 0 |

1600

Figure 18

Profiling Summary
Opportunity – All Fields – Closed Won vs. Lost (PRS-0000)

Field Utilization Analysis Guidance. Use the tabs below to explore fields based on their populated rate. Fields are grouped by the same usage buckets depicted in the chart above. The Net Population % describes a field's actual utilization (Net Population% = Population % - Default Value Population %).

2002 2004

0% Unpopulated Fields 0 to <10% 10%- 20% 20%- 30% 30%- 50% 50%- 75% 75% to <100% 100% (Always Populated)

☐ Unpopulated Fields (Second Scenario) (20)

2006

| Field Result Key | Profiled Field Display Label | Profiling Status Summary | Data Type | Net-Po... | Popul... | Popul... | Distin... | Has De... | Defau... |
|---|---|---|---|---|---|---|---|---|---|
| 1 PRF-0002 | Campaign ID (CampaignId) | Success | Ref. | 0.0000% | 0 | 0.0000% | 0 | ☐ | 0 |
| 2 PRF-0005 | Contact ID (ContactId) | Success | Ref. | 0.0000% | 0 | 0.0000% | 0 | ☐ | 0 |
| 3 PRF-0006 | Contract ID (ContractId) | Success | Ref. | 0.0000% | 0 | 0.0000% | 0 | ☐ | 0 |
| 4 PRF-0009 | Current Generator(s) (Cur...) | Success | String | 0.0000% | 0 | 0.0000% | 0 | ☐ | 0 |
| 5 PRF-0010 | Deleted (IsDeleted) | Success (In Progress) | Boo. | 0.0000% | 0 | 0.0000% | 0 | ☑ | 7,148 |
| 6 PRF-0011 | Delivery/Installation Status... | Success (Not Required) | Pick... | 0.0000% | 0 | 0.0000% | 0 | ☐ | 0 |
| 7 PRF-0018 | Has Line Item (HasOpp...) | Success (In Progress) | Boo. | 0.0000% | 0 | 0.0000% | 0 | ☑ | 7,148 |
| 8 PRF-0019 | Last Activity Date (LastA..) | Success | Date | 0.0000% | 0 | 0.0000% | 0 | ☐ | 0 |
| 9 PRF-0022 | Last Referenced Date (L...) | Success (Not Required) | Date... | 0.0000% | 0 | 0.0000% | 0 | ☐ | 0 |
| 10 PRF-0024 | Last Stage Change Date... | Success (Not Required) | Date... | 0.0000% | 0 | 0.0000% | 0 | ☐ | 0 |
| 11 PRF-0026 | Last Viewed Date (Last...) | Success | Date... | 0.0000% | 0 | 0.0000% | 0 | ☐ | 0 |
| 12 PRF-0029 | Main Competitor(s) (Mai...) | Success | String | 0.0000% | 0 | 0.0000% | 0 | ☐ | 0 |
| 13 PRF-0030 | Opportunity History ID... | Success | Ref. | 0.0000% | 0 | 0.0000% | 0 | ☐ | 0 |

1600

Figure 20

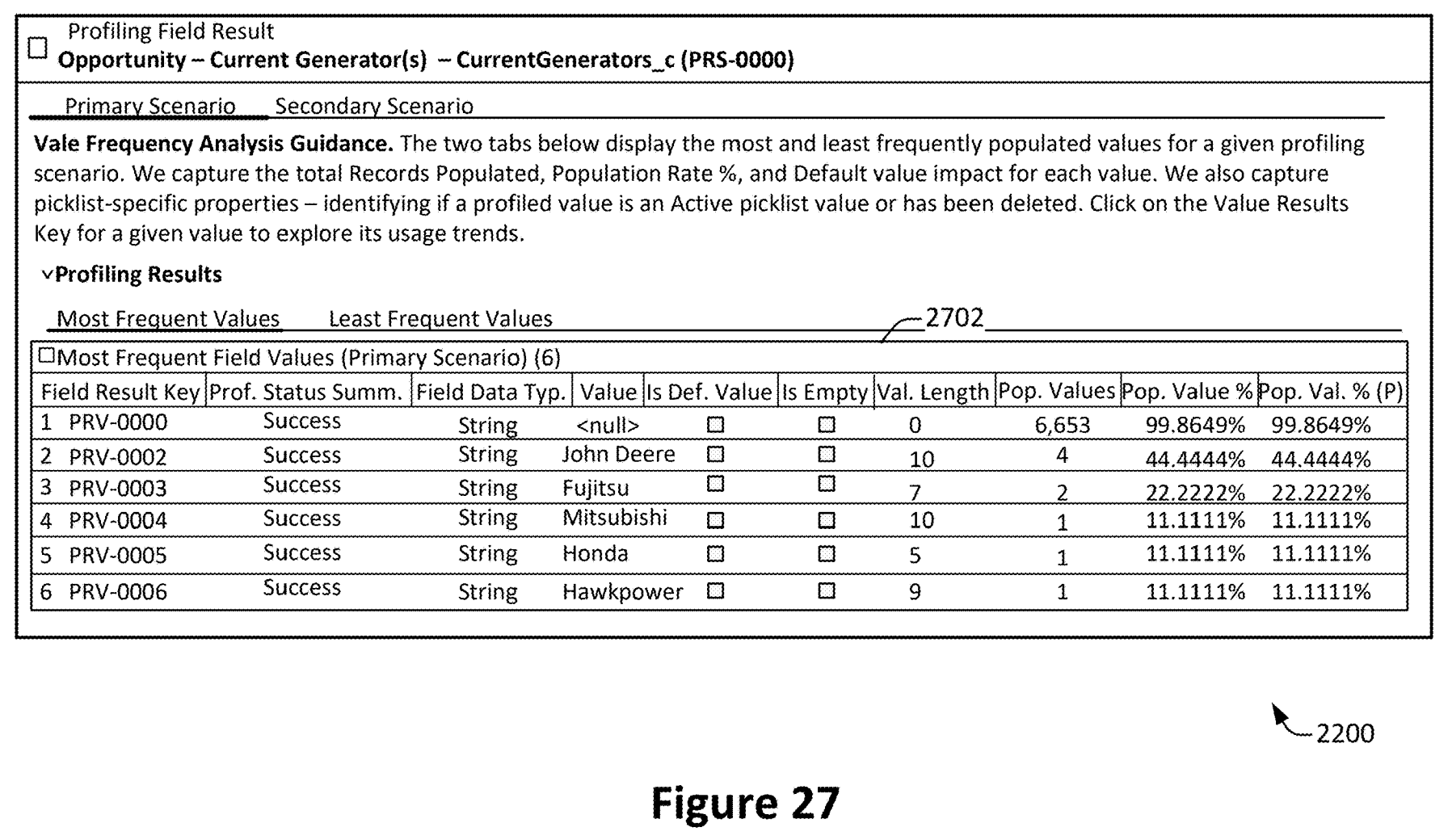

☐ Profiling Field Result
Opportunity – Current Generator(s) – CurrentGenerators_c (PRS-0000)

Primary Scenario  Secondary Scenario

Vale Frequency Analysis Guidance. The two tabs below display the most and least frequently populated values for a given profiling scenario. We capture the total Records Populated, Population Rate %, and Default value impact for each value. We also capture picklist-specific properties – identifying if a profiled value is an Active picklist value or has been deleted. Click on the Value Results Key for a given value to explore its usage trends.

˅Profiling Results

Most Frequent Values  Least Frequent Values

2702

☐Most Frequent Field Values (Primary Scenario) (6)

| Field Result Key | Prof. Status Summ. | Field Data Typ. | Value | Is Def. Value | Is Empty | Val. Length | Pop. Values | Pop. Value % | Pop. Val. % (P) |
|---|---|---|---|---|---|---|---|---|---|
| 1 PRV-0000 | Success | String | <null> | ☐ | ☐ | 0 | 6,653 | 99.8649% | 99.8649% |
| 2 PRV-0002 | Success | String | John Deere | ☐ | ☐ | 10 | 4 | 44.4444% | 44.4444% |
| 3 PRV-0003 | Success | String | Fujitsu | ☐ | ☐ | 7 | 2 | 22.2222% | 22.2222% |
| 4 PRV-0004 | Success | String | Mitsubishi | ☐ | ☐ | 10 | 1 | 11.1111% | 11.1111% |
| 5 PRV-0005 | Success | String | Honda | ☐ | ☐ | 5 | 1 | 11.1111% | 11.1111% |
| 6 PRV-0006 | Success | String | Hawkpower | ☐ | ☐ | 9 | 1 | 11.1111% | 11.1111% |

2200

Figure 27

Figure 29
Profiling Value Result
Opportunity – Current Generator(s) – Acme (PRS-0000)
Profile Field Values Details
Value
Acme
Value Type
TOP
Is Default Value
Is Empty
Value Length
10
Is Null
Comparative Scenario Summary
Total Records (Primary)
6,662
Total Records (Secondary)
7,148
Total Records % (Primary)
48.2404%
Total Records % (Secondary)
51.7596%
Populated Records (Primary)
Populated Records (Secondary)
0
Populated Records % (Primary)
0.1351%
2902
Populated Records % (Secondary)
0.0000%
2904
2900

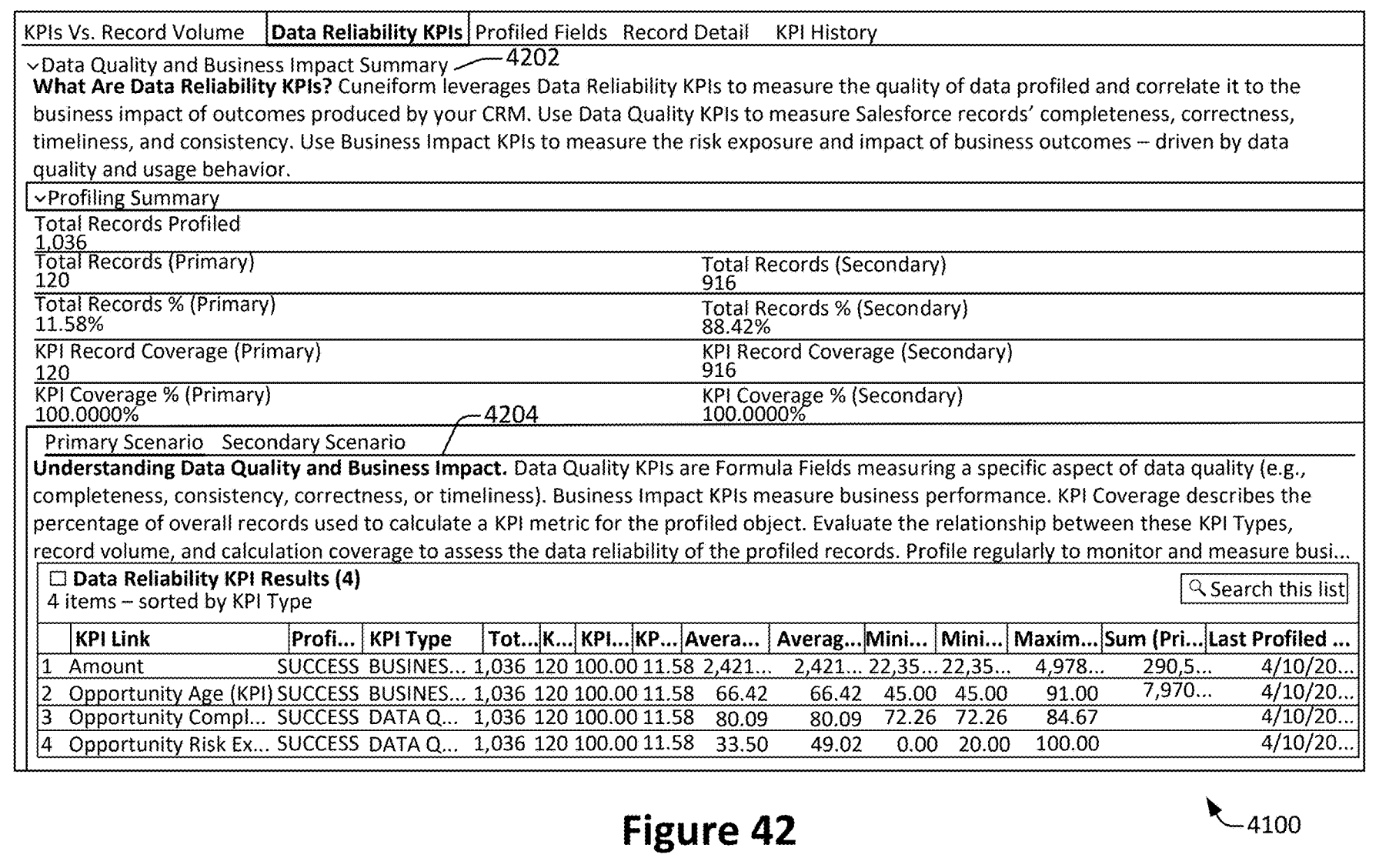

KPIs Vs. Record Volume | Data Reliability KPIs | Profiled Fields | Record Detail | KPI History ⌄Data Quality and Business Impact Summary — 4202

What Are Data Reliability KPIs? Cuneiform leverages Data Reliability KPIs to measure the quality of data profiled and correlate it to the business impact of outcomes produced by your CRM. Use Data Quality KPIs to measure Salesforce records' completeness, correctness, timeliness, and consistency. Use Business Impact KPIs to measure the risk exposure and impact of business outcomes – driven by data quality and usage behavior.

⌄Profiling Summary

| | |
|---|---|
| Total Records Profiled<br>1,036 | |
| Total Records (Primary)<br>120 | Total Records (Secondary)<br>916 |
| Total Records % (Primary)<br>11.58% | Total Records % (Secondary)<br>88.42% |
| KPI Record Coverage (Primary)<br>120 | KPI Record Coverage (Secondary)<br>916 |
| KPI Coverage % (Primary)<br>100.0000% | KPI Coverage % (Secondary)<br>100.0000% |

4204

Primary Scenario | Secondary Scenario

Understanding Data Quality and Business Impact. Data Quality KPIs are Formula Fields measuring a specific aspect of data quality (e.g., completeness, consistency, correctness, or timeliness). Business Impact KPIs measure business performance. KPI Coverage describes the percentage of overall records used to calculate a KPI metric for the profiled object. Evaluate the relationship between these KPI Types, record volume, and calculation coverage to assess the data reliability of the profiled records. Profile regularly to monitor and measure busi...

☐ Data Reliability KPI Results (4)
4 items – sorted by KPI Type

Search this list

| | KPI Link | Profi... | KPI Type | Tot... | K... | KPI... | KP... | Avera... | Averag... | Mini... | Mini... | Maxim... | Sum (Pri... | Last Profiled ... |
|---|---|---|---|---|---|---|---|---|---|---|---|---|---|---|
| 1 | Amount | SUCCESS | BUSINES... | 1,036 | 120 | 100.00 | 11.58 | 2,421... | 2,421... | 22,35... | 22,35... | 4,978... | 290,5... | 4/10/20... |
| 2 | Opportunity Age (KPI) | SUCCESS | BUSINES... | 1,036 | 120 | 100.00 | 11.58 | 66.42 | 66.42 | 45.00 | 45.00 | 91.00 | 7,970... | 4/10/20... |
| 3 | Opportunity Compl... | SUCCESS | DATA Q... | 1,036 | 120 | 100.00 | 11.58 | 80.09 | 80.09 | 72.26 | 72.26 | 84.67 | | 4/10/20... |
| 4 | Opportunity Risk Ex... | SUCCESS | DATA Q... | 1,036 | 120 | 100.00 | 11.58 | 33.50 | 49.02 | 0.00 | 20.00 | 100.00 | | 4/10/20... |

4100

Figure 42

DATA INTEGRATION EVALUATION AND PROFILING IN A DATABASE SYSTEM

CROSS-REFERENCE TO RELATED APPLICATIONS

This application is a continuation of U.S. patent application Ser. No. 19/184,253 by Orun et al, titled "Data Integration Evaluation and Profiling in a Database System", filed Apr. 21, 2025, which claims the benefit under 35 U.S.C. § 119(e) of U.S. Provisional Patent Application 63/636,553 by Orun et al., titled: "Data Integration Evaluation and Profiling in a Database System", filed on Apr. 19, 2024, and of U.S. Provisional Patent Application 63/641,366 by Orun et al., titled: "Data Integration Evaluation and Profiling in a Database System", filed on May 1, 2024, all of which are incorporated herein by reference in their entirety and for all purposes.

FIELD OF TECHNOLOGY

This patent application relates generally to database systems, and more specifically to evaluating and profiling data stored in a database system.

SUMMARY

According to various embodiments, the techniques described herein relate to a database system including: a storage system storing a database record set that includes a plurality of database records of a database record type, the database record type including a plurality of database record fields and an outcome field; a query engine configured to query the plurality of database records upon request; a data profiler configured to: group the plurality of database records into a first outcome value database record group corresponding to a first outcome field value for the outcome field and a second outcome value database record group corresponding to a second outcome field value for the outcome field, and determine a respective plurality of database field population statistic values for each of the first outcome value database record group and the second outcome value database record group, a database field population statistic value of the respective plurality of database field population statistic values characterizing a proportion of database record field values that are populated for a database record field within the respective outcome value database record group; a field evaluator configured to determine a relation between the plurality of database record fields and the first and second outcome field values based on the database field population statistic values, the relation identifying a correlation between a population rate for the database record and the first outcome field value or the second outcome field value; and a policy engine configured to: identify a subset of the plurality of database records having: (1) a third outcome value for the outcome field and (2) an unpopulated database record value for the database record field, and transmit a message to a client machine identifying the subset of the plurality of database records for updating the database record field.

In some embodiments, the techniques described herein relate to a database system, wherein a database record of the plurality of database records includes a plurality of field values for the database record field, the plurality of field values corresponding to different points in time.

In some embodiments, the techniques described herein relate to a database system, further including: an elasticity engine configured to determine an estimate resource usage for the data profiler and to constrain data profiling operations to maintain resource usage below a predetermined threshold.

In some embodiments, the techniques described herein relate to a database system, wherein the field evaluator is configured to determine a field value static for a plurality of database record field values within the first outcome value database record group, the database field population statistic value being selected from the group consisting of: a maximum, a minimum, an average, an average without zeros, and a sum.

In some embodiments, the techniques described herein relate to a database system, wherein the field evaluator is configured to determine a second relation between the plurality of database record fields and the field value statistic, and wherein the policy engine is further configured to identify a second subset of the plurality of database records based on the second relation and to transmit a second message to the client machine including a recommendation to update the database record field for the second subset of the plurality of database records.

In some embodiments, the techniques described herein relate to a database system, the database system further including a semantic classifier configured to apply a pre-trained machine learning model to group database field names by semantic category.

In some embodiments, the techniques described herein relate to a database system, the database system further including: a noise reducer configured to identify a subset of database fields to exclude from data profiling based on one or more predetermined criteria.

In some embodiments, the techniques described herein relate to a database system, wherein the one or more predetermined criteria include a first criteria excluding database fields that are always filled or that are never filled within the first outcome value database record group and the second outcome value database record group.

In some embodiments, the techniques described herein relate to a database system, further including a configuration engine configured to provide a graphical user interface facilitating configuration of the data profiler, the graphical user interface facilitating specification of one or more criteria for selecting the plurality of database record fields, the outcome field, and the plurality of database records.

In some embodiments, the techniques described herein relate to a database system, wherein the data profiler is further configured to determine a net fill rate for the database record field, the net fill rate indicating indicate a number or proportion of field values that have a filled value that is different from a default value.

In some embodiments, the techniques described herein relate to a database system, wherein the data profiler is further configured to determine a distinct value density for the database record field, the distinct value density indicating a percentage of distinct values for the database record field relative to the number of database records in the plurality of database records.

In some embodiments, the techniques described herein relate to a database system, wherein the data profiler is further configured to determine a distinct value count for the database record field, the distinct value count counting distinct values for the database record field within the plurality of database records.

In some embodiments, the techniques described herein relate to a database system, wherein the plurality of database field population statistic values includes a plurality of subsets corresponding to the plurality of database record fields.

In some embodiments, the techniques described herein relate to a database system, wherein the data profiler is further configured to determine usage statistic information characterizing usage of the database record field in one or more on-demand cloud computing applications accessible via the database system.

In some embodiments, the techniques described herein relate to a database system, wherein the database system resides in a shared infrastructure cloud computing environment configured to provide computing services to a plurality of entities via the Internet.

According to various embodiments, the techniques described herein relate to a method implemented in a cloud-accessible database system, the method including: storing in a storage system a database record set that includes a plurality of database records of a database record type, the database record type including a plurality of database record fields and an outcome field; querying the plurality of database records upon request; grouping the plurality of database records into a first outcome value database record group corresponding to a first outcome field value for the outcome field and a second outcome value database record group corresponding to a second outcome field value for the outcome field; determining, via a data profiler, a respective plurality of database field population statistic values for each of the first outcome value database record group and the second outcome value database record group, a database field population statistic value of the respective plurality of database field population statistic values characterizing a proportion of database record field values that are populated for a database record field within the respective outcome value database record group; determining, via a field evaluator, a relation between the plurality of database record fields and the first and second outcome field values based on the database field population statistic values, the relation identifying a correlation between a population rate for the database record and the first outcome field value or the second outcome field value; identifying, via a policy engine, a subset of the plurality of database records having: (1) a third outcome value for the outcome field and (2) an unpopulated database record value for the database record field; and transmitting a message to a client machine identifying the subset of the plurality of database records for updating the database record field.

In some embodiments, the techniques described herein relate to a method, wherein the field evaluator is configured to determine a field value static for a plurality of database record field values within the first outcome value database record group, wherein the field evaluator is configured to determine a second relation between the plurality of database record fields and the field value statistic, and wherein the policy engine is further configured to identify a second subset of the plurality of database records based on the second relation and to transmit a second message to the client machine including a recommendation to update the database record field for the second subset of the plurality of database records, the database field population statistic value being selected from the group consisting of: a maximum, a minimum, an average, an average without zeros, and a sum.

In some embodiments, the techniques described herein relate to a method, wherein a database record of the plurality of database records includes a plurality of field values for the database record field, the plurality of field values corresponding to different points in time, and wherein the plurality of database field population statistic values includes a plurality of subsets corresponding to the plurality of database record fields.

According to various embodiments, the techniques described herein relate to one or more non-transitory computer readable media having instructions stored thereon for performing a method implemented in a cloud-accessible database system, the method including: storing in a storage system a database record set that includes a plurality of database records of a database record type, the database record type including a plurality of database record fields and an outcome field; querying the plurality of database records upon request; grouping the plurality of database records into a first outcome value database record group corresponding to a first outcome field value for the outcome field and a second outcome value database record group corresponding to a second outcome field value for the outcome field; determining, via a data profiler, a respective plurality of database field population statistic values for each of the first outcome value database record group and the second outcome value database record group, a database field population statistic value of the respective plurality of database field population statistic values characterizing a proportion of database record field values that are populated for a database record field within the respective outcome value database record group; determining, via a field evaluator, a relation between the plurality of database record fields and the first and second outcome field values based on the database field population statistic values, the relation identifying a correlation between a population rate for the database record and the first outcome field value or the second outcome field value; identifying, via a policy engine, a subset of the plurality of database records having: (1) a third outcome value for the outcome field and (2) an unpopulated database record value for the database record field; and transmitting a message to a client machine identifying the subset of the plurality of database records for updating the database record field.

In some embodiments, the techniques described herein relate to one or more non-transitory computer readable media, wherein the field evaluator is configured to determine a field value static for a plurality of database record field values within the first outcome value database record group, wherein the field evaluator is configured to determine a second relation between the plurality of database record fields and the field value statistic, and wherein the policy engine is further configured to identify a second subset of the plurality of database records based on the second relation and to transmit a second message to the client machine including a recommendation to update the database record field for the second subset of the plurality of database records, the database field population statistic value being selected from the group consisting of: a maximum, a minimum, an average, an average without zeros, and a sum.

In some embodiments, the techniques described herein relate to a database system including: a storage system storing a first data set including a first plurality of database records including a first plurality of database values corresponding to a first plurality of database fields and a second data set including a second plurality of database records including a second plurality of database values corresponding to a second plurality of database fields; a data source profiler configured to determine data set profiling information for the first plurality of database fields and the second plurality of data fields, the data set profiling information including a plurality of field-level statistics summarizing the first plurality of database values and the second plurality of database values; a data source unifier configured to: (1) determine one or more operations to unify the first data set and the second data set based on the data set profiling information, (2) determine an estimated level of computing resources for executing the one or more operations, (3) determine whether the estimated level of computing resources exceeds a designated threshold, (4) determine a sampling strategy for selecting a subset of first data set and the second data set upon determining that the estimated level of computing resources exceeds the designated threshold, the sampling strategy being determined based on the data set profiling information, (5) selecting the subset based on the sampling strategy, (6) executing the one or more operations on the subset to determine data unification information linking the first data set and the second data set, and (7) storing the data unification information in the storage system.

In some embodiments, the techniques described herein relate to a database system, wherein the one or more operations include merging or linking the first data set with the second data set.

In some embodiments, the techniques described herein relate to a database system, wherein the one or more operations include resolving a plurality of entities referenced in one or more of the first plurality of database fields.

In some embodiments, the techniques described herein relate to a database system, wherein the sampling strategy includes selecting the subset based at least in part on a random number generator.

In some embodiments, the techniques described herein relate to a database system, wherein the sampling strategy includes selecting all database records that satisfy one or more identified characteristics.

In some embodiments, the techniques described herein relate to a database system, wherein the one or more identified characteristics includes a database record group value associated with a database field of the plurality of database record fields, the subset including all database records having a database value matching the database record group value for the database field.

In some embodiments, the techniques described herein relate to a database system, wherein the sampling strategy includes selecting all database fields that satisfy one or more identified characteristics.

In some embodiments, the techniques described herein relate to a database system, wherein the one or more identified characteristics include a first criteria excluding database fields that are always filled or that are never filled.

In some embodiments, the techniques described herein relate to a database system, wherein a field-level statistic of the plurality of field-level statistics characterizes a proportion of database field values that are populated for a corresponding database field.

In some embodiments, the techniques described herein relate to a database system, further including: a field evaluator configured to determine a relation between the plurality of database fields and one or more outcome field values based on the plurality of field-level statistics, the relation identifying a correlation between a population rate for the database fields and the one or more outcome field values.

In some embodiments, the techniques described herein relate to a database system, wherein the database system resides in a shared infrastructure cloud computing environment configured to provide computing services to a plurality of entities via the Internet.

In some embodiments, the techniques described herein relate to a database system, wherein the estimated level of computing resources corresponds to a number of credits within the shared infrastructure cloud computing environment.

In some embodiments, the techniques described herein relate to a database system, further including a configuration engine configured to provide a graphical user interface facilitating configuration of the data source profiler, the graphical user interface facilitating specification of the sampling strategy.

In some embodiments, the techniques described herein relate to a database system, wherein the data profiler is further configured to determine a net fill rate for a database field of the plurality of database fields, the net fill rate indicating indicate a number or proportion of corresponding database field values that have a filled value that is different from a default value.

In some embodiments, the techniques described herein relate to a database system, wherein the data profiler is further configured to determine a distinct value density for a database field of the plurality of database fields, the distinct value density indicating a percentage of distinct values for the database field relative to the number of database records in the first plurality of database records.

In some embodiments, the techniques described herein relate to a method implemented in a cloud-accessible database system, the method including: accessing from a storage system a first data set including a first plurality of database records including a first plurality of database values corresponding to a first plurality of database fields and a second data set including a second plurality of database records including a second plurality of database values corresponding to a second plurality of database fields; determining data set profiling information for the first plurality of database fields and the second plurality of data fields via a data source profiler, the data set profiling information including a plurality of field-level statistics summarizing the first plurality of database values and the second plurality of database values; determining one or more operations to unify the first data set and the second data set based on the data set profiling information; determining an estimated level of computing resources for executing the one or more operations; determining whether the estimated level of computing resources exceeds a designated threshold; determining a sampling strategy for selecting a subset of first data set and the second data set upon determining that the estimated level of computing resources exceeds the designated threshold, the sampling strategy being determined based on the data set profiling information; selecting the subset based on the sampling strategy; executing the one or more operations on the subset to determine data unification information linking the first data set and the second data set; and storing the data unification information in the storage system.

In some embodiments, the techniques described herein relate to a method, wherein the sampling strategy includes selecting all database records that satisfy one or more identified characteristics including a database record group value associated with a database field of the plurality of database record fields, the subset including all database records having a database value matching the database record group value for the database field.

In some embodiments, the techniques described herein relate to one or more non-transitory computer readable media having instructions stored thereon for performing a method implemented in a cloud-accessible database system, the method including: accessing from a storage system a first data set including a first plurality of database records including a first plurality of database values corresponding to a first plurality of database fields and a second data set including a second plurality of database records including a second plurality of database values corresponding to a second plurality of database fields; determining data set profiling information for the first plurality of database fields and the second plurality of data fields via a data source profiler, the data set profiling information including a plurality of field-level statistics summarizing the first plurality of database values and the second plurality of database values; determining one or more operations to unify the first data set and the second data set based on the data set profiling information; determining an estimated level of computing resources for executing the one or more operations; determining whether the estimated level of computing resources exceeds a designated threshold; determining a sampling strategy for selecting a subset of first data set and the second data set upon determining that the estimated level of computing resources exceeds the designated threshold, the sampling strategy being determined based on the data set profiling information; selecting the subset based on the sampling strategy; executing the one or more operations on the subset to determine data unification information linking the first data set and the second data set; and storing the data unification information in the storage system.

In some embodiments, the techniques described herein relate to one or more non-transitory computer readable media, wherein the sampling strategy includes selecting all database records that satisfy one or more identified characteristics including a database record group value associated with a database field of the plurality of database record fields, the subset including all database records having a database value matching the database record group value for the database field.

These and other embodiments are described further below with reference to the figures.

BACKGROUND

Many companies rely on data stored in cloud-hosted database systems. However, many applications involving such data include disparate data sources having various combinations of fields. These fields may or may not be populated or useful for a particular application, and the data stored in the disparate data sources may or may not include overlapping or duplicative information. Resolving such disintegration is a precursor to performing tasks such as data querying, data transformation, identity resolution, and the like.

As a particular example, applications in machine learning and artificial intelligence depend on access to reliable and comprehensive data. Training such models on unreliable data can yield spurious results. Even for well-trained models, performing inference on unreliable data can lead to inaccurate outcomes. Data completeness, reliability, and integrity are particularly important when using large language models, which may generate text reflecting hallucinated facts or manufactured data in the absence of reliable data included in the input prompt. Accordingly, improved techniques for data integration evaluation and profiling are desired.

BRIEF DESCRIPTION OF THE DRAWINGS

The included drawings are for illustrative purposes and serve only to provide examples of possible structures and operations for the disclosed inventive systems, apparatus, methods, and computer program products for data integration evaluation and profiling in a database system. These drawings in no way limit any changes in form and detail that may be made by one skilled in the art without departing from the spirit and scope of the disclosed implementations.

FIGS. 16-34 illustrate user interfaces generated in accordance with one or more embodiments.

FIGS. 38-46 illustrate user interfaces generated in accordance with one or more embodiments.

DETAILED DESCRIPTION

Introduction

Figure 1:
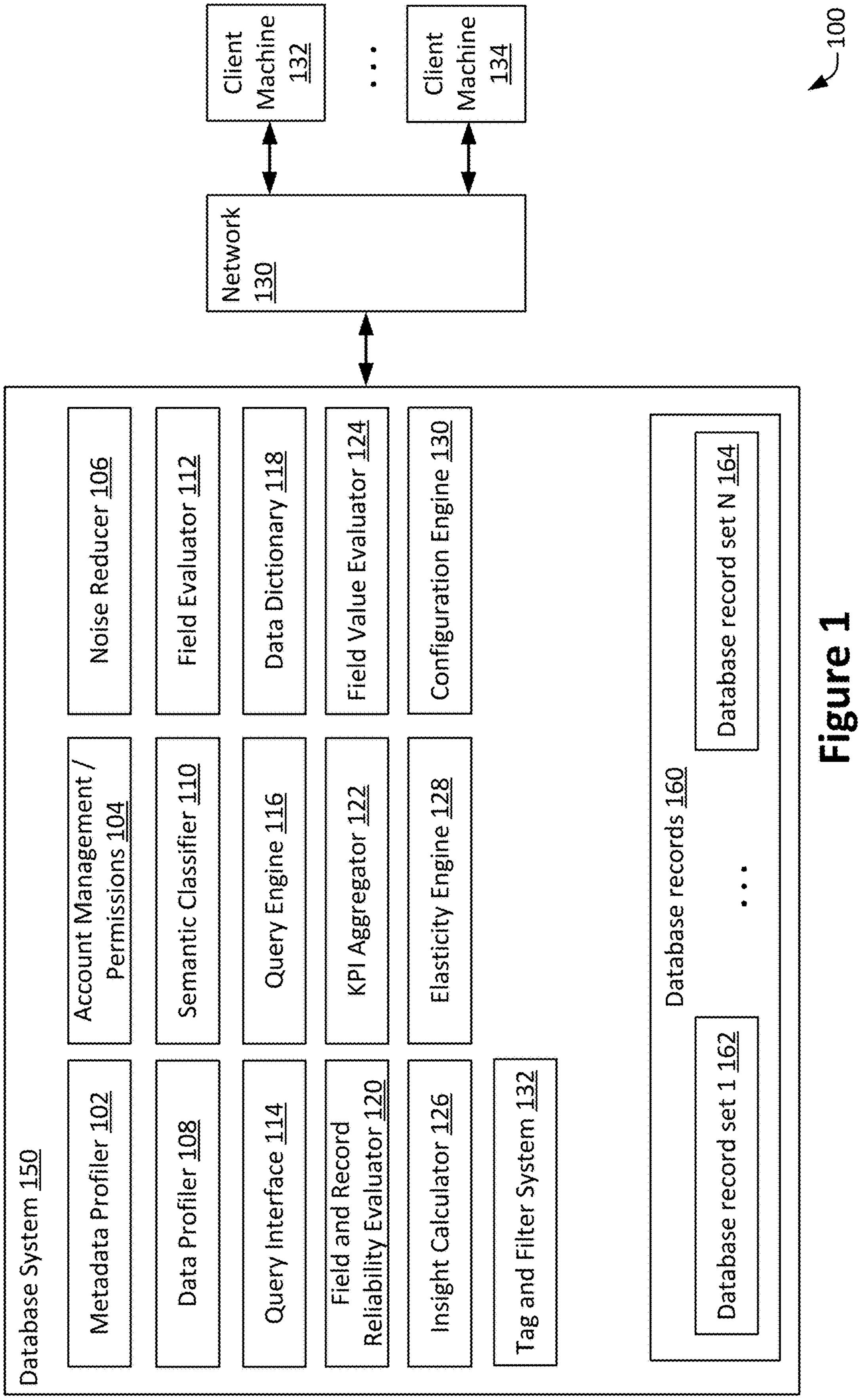
FIG. 1 illustrates a computing environment that includes a database system configured in accordance with one or more embodiments.

Conventional approaches for unifying data involve manual spreadsheets to identify which data fields may be available in different sources. Often, an analysist must perform manual research, interviews, and/or database queries to understand field data content and guide decision making. Such processes are time consuming and error prone. Moreover, such processes fail to address considerations such as: (1) whether data replication is allowed or instead source level filtering is needed to ensure that sensitive data is not copied, (2) what computing resources are needed to accomplish a data unification task based on existing record volume, (3) whether data sampling is needed to accomplish a data unification task, and (4) which fields and rows may be used to perform tasks such as deliberate sampling, identity resolution, and the like.

Techniques and mechanisms described herein provide for a database system that provides approaches to data unification tasks that address these technical challenges. According to various embodiments, data profiling and metadata profiling information may be determined for various data sources. A proposed course of action for a data unification task may then be determined based on the data profiling and metadata profiling information. A level of computing resources for executing the course of action may be estimated. If indicated, a sampling strategy for sampling data from the various data sources may be determined. The data unification task may then be performed based on the proposed course of action and, optionally, the sampling strategy.

Techniques and mechanisms described herein are broadly applicable to data profiling applications. As used herein, the term "data profiling" refers to analytical techniques to analyze data in one or more database tables to evaluate the data completeness, consistency, and uniqueness. For example, column profiling is a data profiling technique that involves evaluating individual data attributes (e.g., database record fields) to determine characteristics such as data types, patterns, frequency distributions, and potential null values. As another example, cross-column profiling is a data profiling technique that involves investigating relationships and correlations between two or more columns, which helps to identify relationships such as redundancies and dependencies. These and other data profiling techniques may facilitate the identification of characteristics such as field fill rates, distinct value counts, data type, and/or data content (e.g. a field may contain social security numbers) inferences.

Although data profiling is helpful for understanding certain types of characteristics of data records in a database system, conventional data profiling techniques do not facilitate the identification of data fields that matter for particular values stored in fields. As one example, a database table may include a field that stores information identifying an outcome. For instance, the outcome field may indicate whether an opportunity represented by the database object was converted to a sale, whether a customer service interaction represented by a database object was favorably resolved, whether a customer account represented by a database object was retained or closed, or any other type of outcome. Conventional data profiling techniques do not facilitate identifying which fields tend to be related to outcome values in the sense that the filling of those fields tends to lead to particular outcome values stored in the outcome fields (e.g., a successful outcome).

This failure in conventional data profiling techniques is due in significant part to a variety of technical problems. For instance, many database systems include many different records, fields, and values, including many records having missing values for various fields. The relationships between the fields may be complex. For instance, a field that may initially seem to be relevant may instead be deterministically related to a different field that in fact matters much more. Moreover, an outcome field may include values that are organized categorically (e.g., success or failure), ordinally (e.g., a set of stages or phases in a process), or continuously (e.g., a numerical value realized for a deal). This variation significantly complicates efforts to provide an automated approach to profiling the data.

Most conventional approaches to addressing complex relationships between data values (e.g., prediction models) are geared toward predicting outcome values based on income values, and not based on determining when and under what conditions the presence or absence of data affects the outcome values. Such conventional techniques are inapplicable for the purpose of identifying the fields for which the presence or absence of data affects the outcome values. Complicating matters further, field values in a database, including outcome values, may be filled and/or change over time. Accordingly, analysis of a data set using simple and conventional statistical techniques (e.g., a Chi-squared test) would fail to capture the dynamic and time-varying nature of the changes to the data. Additionally, predicting outcome values based on data reliability and availability is not as simple as examining fill predictor fill rates, since in a database system data fields may sometimes be filled with default values, uninformative values, or other unhelpful information.

Thus, conventional data profiling techniques do not address the technical challenges involved in monitoring complex data stored in a modern database system as the data changes over time, for the purpose of identifying the fields the filling of which is predictive or indicative of particular outcome values stored in the database system. In contrast to these conventional techniques, techniques and mechanisms described herein provide for a database monitoring system that can identify database fields that matter to outcome values. According to various embodiments, the system monitoring system can identify a field for which whether a field value is effectively captured is an indication of whether an outcome value is achieved. As one example, the system can identify a field for which whether a field value is effectively captured predicts a successful business outcome value (e.g., a sales opportunity is won, a support case is closed within a window specified by a service level agreement, etc.).

As used herein, the term "outcome field" may be a designated field within a database object. The field may represent a measurable business key performance indicator (KPI) or outcome, such as hallucination risk or lead completion percentage.

Database Architecture

FIG. 1 illustrates a computing environment 100 that includes a database system 150 configured in accordance with one or more embodiments. The computing environment 100 includes one or more client machines 132 and 134 in communication with the database system 150 via a network 130. The database system includes a metadata profiler 102, an account management and permissions module 104, a noise reducer 106, a data profiler 108, a semantic classifier 110, a field evaluator 112, a query interface 114, a query engine 116, a data dictionary 118, a field and record reliability evaluator 120, a key performance indicator (KPI) aggregator 122, a field value evaluator 124, an insight calculator 126, an elasticity engine 128, configuration engine 130, a tag and filter system 132, and database records 160. The database records 160 may include one or more database record sets such as the record sets 162 through 164.

According to various embodiments, data profiling techniques and mechanisms described herein may be integrated within the database system 150, as shown in FIG. 1. In this way, the data profiling techniques and mechanisms may operate natively and in real-time or near real-time to capture continuous or near-continuous updates made to the database records 160. Moreover, the data profiling techniques and mechanisms may operate on data in place, providing improved security relative to techniques that require exporting data to an external storage location outside of the database system.

According to various embodiments, the database system 150 may be any network-accessible data system. For instance, the database system 150 may be located within a cloud computing environment such as that provided by companies such as Amazon, Microsoft, Salesforce, Google, and the like. Alternatively, the database system 150 may be located in a privately controlled network-accessible environment.

In some embodiments, the database records 160 may include any types of records stored for any suitable purpose. In a cloud computing environment, the database records 160 may include records stored for a variety of different entities. The database records 160 may be logically divided into different record sets for the purpose of analysis. Additional details regarding the configuration of such record sets are discussed with respect to FIG. 3, FIG. 4, and FIG. 5.

In some implementations, access to the database records 160 may be governed by the query interface 114. The query interface 114 may receive query requests and execute the requests via the query engine 116. The query engine 116 may perform operations such as query optimization, caching, and execution against the database records 160. Query results may then be returned via the query interface 114. The query interface 114 may be utilized by any of a variety of systems and devices to query the database records 160. For instance, the database records 160 may be queried by the client machines 132 through 134, one or more application services, other components within the database system 150, or any other suitable device or system.

According to various embodiments, the client machines 132 and 134 may be any computing devices (e.g., desktop computers, laptop computers, tablets, mobile computing devices) in communication with the database system 150 via the network 130. The network 130 may include various public and/or private components as well as any suitable devices for routing and transmitting traffic between the client machines and the database system 150. For instance, the network 130 may include the Internet.

According to various embodiments, the metadata profiler 102 may analyze various information related to a database record set to determine relevant metadata attributes for fields included in records within the database records inside the database record sets. For instance, the metadata profiler 102 may analyze one or more data sources such as the data dictionary 118, one or more data validation rules pertaining to a database record set, properties associated with database record fields, permissions information stored in the account management and permissions module 104, and/or any other suitable sources of information.

In some embodiments, the account management and permissions module 104 may manage access to data stored in the database records 160. In some embodiments, the account management and permissions module 104 may authenticate client machines to user accounts. For instance, a client machine may be authenticated to a user account by providing suitable authentication information, such as a username, a password, a two-factor authentication, biometric identification, and/or other such information.

According to various embodiments, different user accounts may be authorized to access different database record sets, database records, and/or fields within records. Such permissions may be managed by the account management and permissions module 104. For instance, when a request is received from a client machine to access a record or to perform data profiling analysis, the request may be evaluated by the account management and permissions module 104 to identify the database record sets, database records, and/or fields accessible to the account to which the client machine is authenticated. Then, the response provided to the client machine may be limited to those data elements that the user account is authorized to access.

According to various embodiments, the noise reducer 106 may be configured to identify and remove data fields from a relational database dataset that provide insufficient information. As a simple example, the noise reducer 106 may identify remove fields from a dataset that are always filled or fields that are never filled. As another example, the noise reducer may identify and remove fields that are entirely dependent on the values stored in other fields. As yet another example, the noise reducer may remove from a dataset one or more fields that are filled more frequently for a dispreferred outcome (e.g., an unsuccessful outcome in a service or opportunity database record).

In some embodiments, the data profiler 108 may determine various characteristics of data fields in a database record set for various outcome values. For instance, database records may be grouped by database record outcome value, and then the database record set fields may be analyzed according to properties such as fill rate and distinct value count and density within these groups. The data profiling information may then be used to identify which fields are predictive of particular database outcome values.

In some embodiments, the semantic classifier 110 may perform one or more types of semantic analysis on the database fields. For example, the semantic classifier may apply a pretrained machine learning model to group database field names by semantic category. As another example, the semantic classifier may identify one or more synonyms for fields. As yet another example, the semantic classifier may perform clustering analysis on the database field names. In this way, fields that are identified as relevant may then be grouped together into logical units.

According to various embodiments, the field evaluator 112 may identify one or more fields to include in a relation. The relation may link fields with particular outcome values. Such linkages may be used to provide data quality recommendations for improving performance metrics. Additional details regarding operations performed by the field evaluator are discussed with respect to the method 1400 shown in FIG. 14.

In some implementations, the data dictionary 118 may store metadata information characterizing the information stored in the database system 150. For instance, the data dictionary 118 may store object definitions that link record types with the fields included in the record types. As one example, the data dictionary 118 may include a definition for a Case object that identifies a set of fields (e.g., creation date, status, owner, etc.) included in the Case object, along with other metadata such as the data types associated with those fields.

In some embodiments, such as within a dynamic schema database, the data dictionary 118 may store a relation indicating which fields are stored in which elements of a data record. For example, a single database table may store both Case objects and Opportunity objects. A particular data field in a Case object may store a value such as Case Status, while the same field in an Opportunity object may store a different value, such as a Close Date.

According to various embodiments, the field and record reliability evaluator 120 identifies field reliability information, for instance for large language models. For example, the field and record reliability evaluator 120 identifies which database fields of a database object are referenced in prompt templates used to construct prompts to send to large language models for completion. Those database fields are then evaluated for reliability, which may involve determining characteristics such as the percentage of fields filled with non-default values, distinct density, and the like.

In some embodiments, the field and record reliability evaluator 120 may evaluate reliability information on the field level, the record level, or the dataset level. For example, the field and record reliability evaluator 120 may determine that a specific subset of database records is not suitable for use in prompt generation since the requisite field or fields are not filled with reliable data. As another example, the field and record reliability evaluator 120 may identify particular fields as problematic because they are systematically unreliable despite being referenced in prompt templates.

In some embodiments, the KPI aggregator 122 performs data profiling on one or more KPI field. A KPI field may be defined at the record-level or at the field-level, and may serve as metadata providing isight as to one or more characteristics of the database record or database field. For instance, a KPI field may identify the time required to resolve a request associated with a database record, an overall quality metric for a database record, or another such value. The particular content of the KPI field may depend on the type of database object and/or database field and the information stored therein. Data profiling on the KPI field may involve determining values such as minimum, maximum, average, average without zeros, sum, or other such statistics.

In some embodiments, the field value evaluator 124 may determine various statistics and associated insights for database fields within a database object. For example, the field value evaluator 124 may determine a set of top-X values, a set of bottom-X values, a value frequency of populated fields, a word count for a text field, a length of a text field, and/or other types of field-related statistics. As another example, the field value evaluator 124 may determine a minimum, maximum, average, average without zeros, sum, or other such statistic based on an input value such as word count, length, or the like.

According to various embodiments, the insight calculator 126 determines insights and classifications based on other values computed by the database system 150. For example, the insight calculator 126 may determine and provide recommendations as to database fields and/or subsets of records for which data reliability improvement is likely to yield significant gains in terms of database record outcome values, large language model prompt applicability, or other such considerations.

In some implementations, the elasticity engine 128 facilitates efficient usage of database resources in the course of executing other elements of the database system, such as the metadata profiler 102, the insight calculator 126, the semantic classifier 110, and the like. For example, the elasticity engine 128 may determine an allocation of resources across different application instances associated with a computing services environment hosting the database system 150. As another example, the elasticity engine 128 may determine when to analyze all data in a record set or when to analyze a sample of data in the record set.

In particular embodiments, the elasticity engine 128 facilitates the configuration of a maximum number of concurrent profiling jobs. The number of concurrent jobs may be specifically limited based on request type. For example, a long-running request may be created when the number of implicated records exceeds a designated threshold, and such requests may have a different concurrency limit than short-running requests. The execution time of profiling requests may be monitored and cross-referenced against existing record volume thresholds to dynamically determine the threshold. Alternatively, or additionally, concurrency thresholds may be dynamically throttled based on request volume, system constraints, and other such considerations.

In some embodiments, the configuration engine 130 facilitates management of profiling characteristics. The configuration engine 130 may facilitate the specification of one or more configuration profiles that allow users to specify, for instance, how many top-X and/or bottom-X values to retrieve, how many API retries to employ, and other such parameters. Users can tailor configuration profiles for different profiling scenarios, and then select a specific profile to drive product behavior. The configuration engine 130 may also provide a graphical user interface facilitating configuration of the data profiler.

According to various embodiments, the tag and filter system 132 facilitates organization and selection of fields. As another example, groups of fields can be tagged and labeled, and then those tags can be used to identify fields during profiling to drive specific behavior. Such filtering can be used, for instance, to separate system fields from custom fields. Such filtering can also be used to identify exceptional fields that must be processed different, such as fields that can be profiled for metadata but that cannot be aggregated due to one or more constraints. Filtering can also be used to hide database objects, object types, and fields that cannot be aggregated. For instance, objects and fields can be identified by their file extension, Object API Name, or Field API Name. Such entries allow for streamlining and control of the objects and fields exposed to users.

Figure 2:
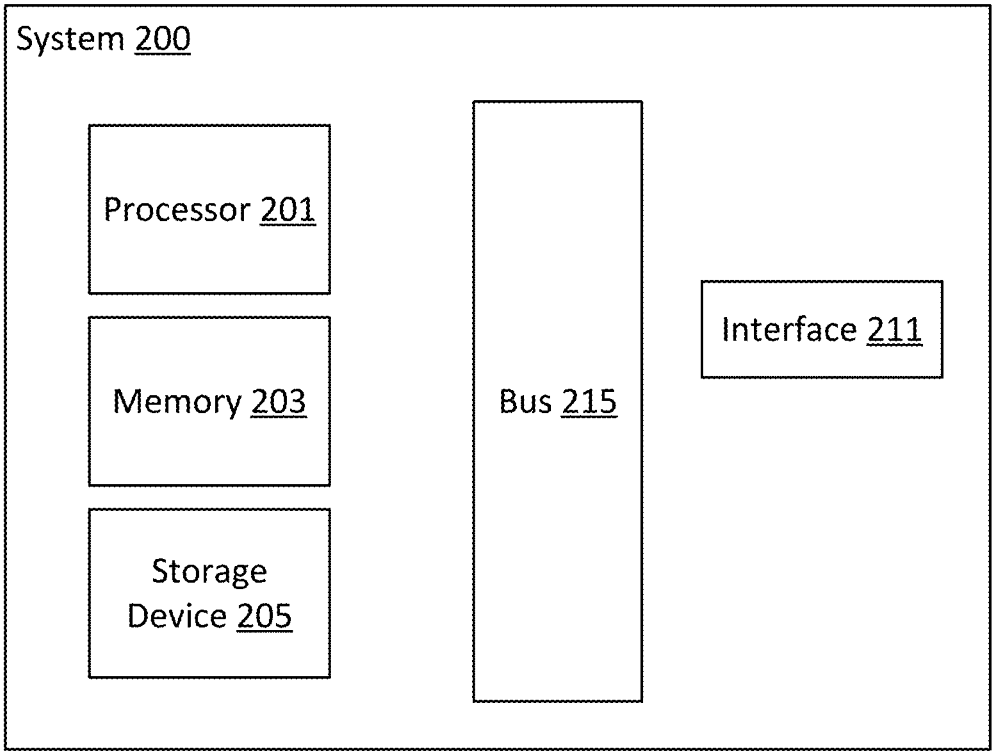
FIG. 2 illustrates one example of a computing device.

FIG. 2 illustrates one example of a computing device 200. According to various embodiments, a computing device 200 suitable for implementing embodiments described herein includes a processor 201, a memory module 203, a storage device 205, an interface 211, and a bus 215 (e.g., a PCI bus or other interconnection fabric.) Computing device 200 may operate as variety of devices such as an application server, a database server, a client machine, one or more components of the database system 150, or any other device or service described herein. Although a particular configuration is described, a variety of alternative configurations are possible. The processor 201 may perform operations such as those described herein for data profiling. Instructions for performing such operations may be embodied in the memory 203, on one or more non-transitory computer readable media, or on some other storage device. Various specially configured devices can also be used in place of or in addition to the processor 201. The interface 211 may be configured to send and receive data packets over a network. These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

Figure 3:
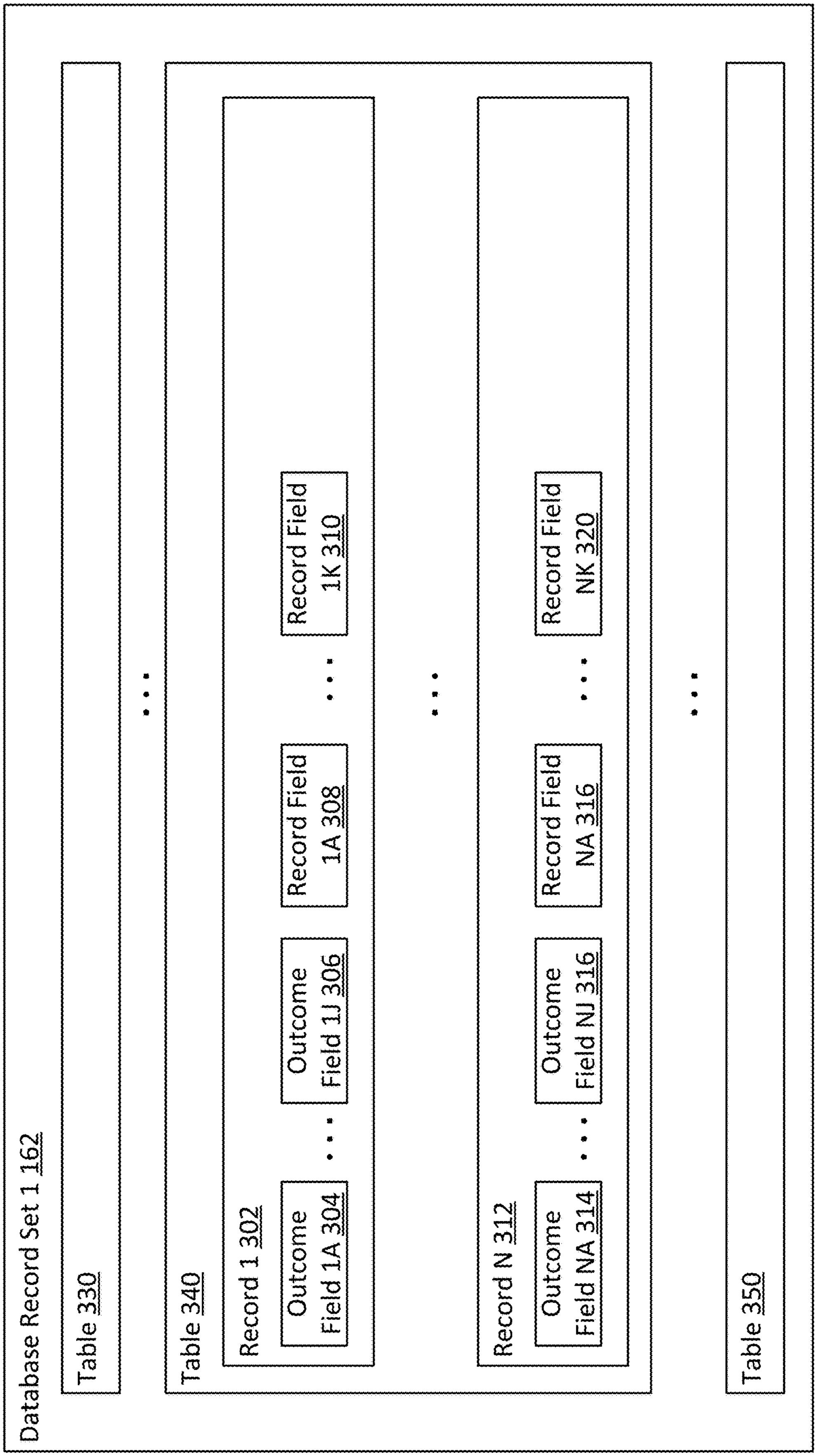
FIG. 3 illustrates additional details regarding a database record set, configured in accordance with one or more embodiments.

FIG. 3 illustrates additional details regarding the database record set 1 162, configured in accordance with one or more embodiments. A database record set may include one or more data tables. For example, the database record set 1 162 includes the tables 330, 340, and 350. A database record set table may include records of a particular record type (e.g., Sales records, Opportunity records, Service records).

A database record table may include some number of records. For instance, the table 340 includes the records 1 302 through N 312. A record may include some number of outcome fields as well as some number of record fields. For instance, the record 1 302 includes the outcome fields 304 through 306 and the record fields 308 through 310, while the record N 312 includes the outcome fields 314 through 316 and the record fields 316 through 320. Additional details regarding database records are discussed with respect to FIG. 4.

In some embodiments, an outcome field may refer to a field storing an outcome value to predict, such as the outcome of a sales opportunity or a service interaction. In contrast, a record field may store a value that may be used to predict an outcome field. For instance, the presence or absence of a value in a record field corresponding to a mailing address may predict a successful service interaction. However, the division between outcome and record fields may be somewhat arbitrary, and a field that is a record field in some contexts may be an outcome field in other contexts.

According to various embodiments, the database record set table may or may not correspond to a distinct table in a database system. For instance, in a dynamic schema database system, the same database table may store records of different types, with the relation between storage location and field definition being reflected in a data dictionary.

In some embodiments, the database record set 162 may include all records of an object within a designated time window. Different database objects may correspond to different time windows. For instance, a data set Sales object may include records selected from a 4-year window in time reaching back from the present, while a data set for a Service object may include records selected from a 2-year window in time reaching back from the present. In some embodiments, one or more additional filtering criteria may be applied to allow the system to focus only on fields that are relevant to specific outcomes, even when the object is shared across different contexts.

Figure 4:
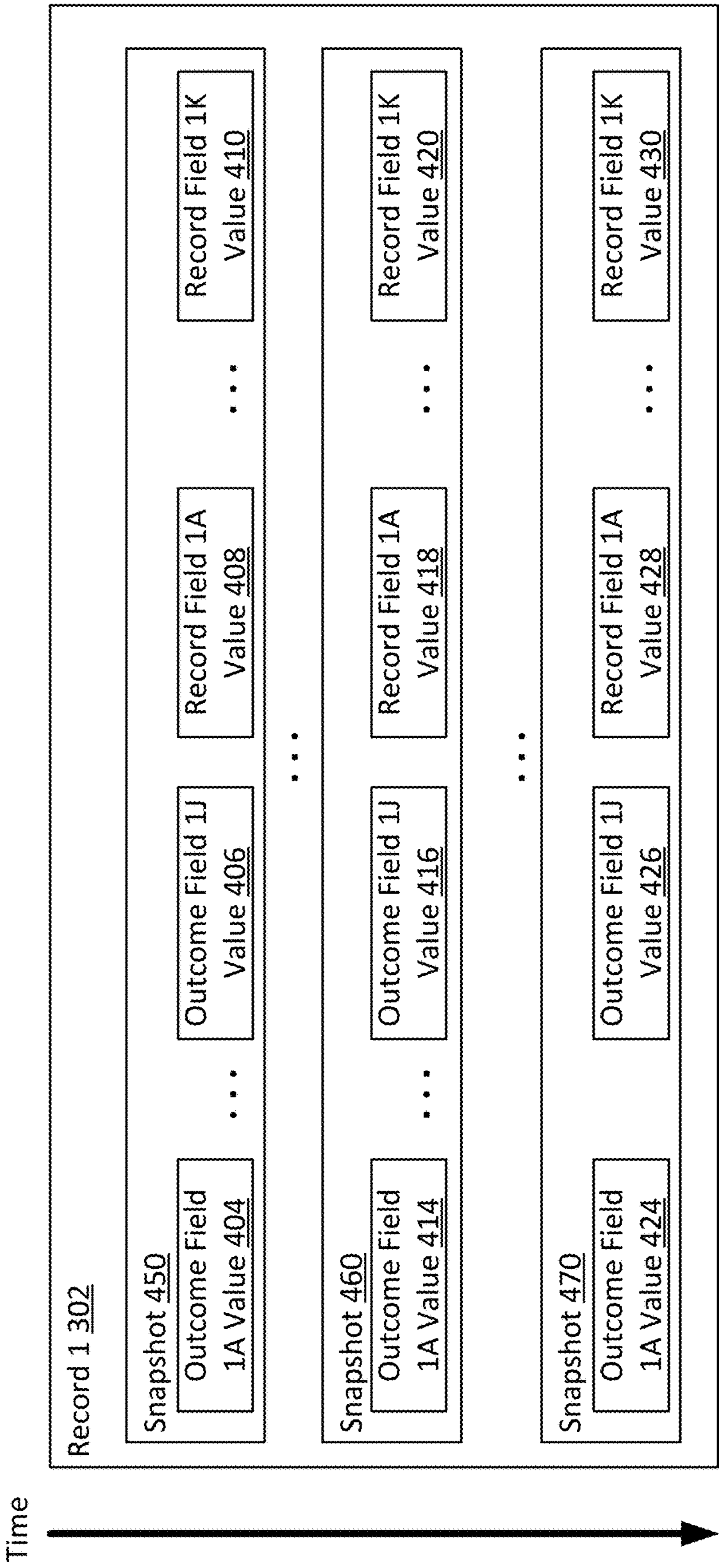
FIG. 4 illustrates a more detailed view of a record, configured in accordance with various embodiments.

FIG. 4 illustrates a more detailed view of a record 302, configured in accordance with various embodiments. As is shown in FIG. 4, the values stored in a record may change over time. For instance, the record 302 includes values over time, for instance in snapshots 450, 460, and 470. For example, the snapshot 450 includes the values 404 through 406 and 408 through 410. As another example, the snapshot 460 includes the values 414 through 416 and 418 through 420.

According to various embodiments, time may be conceptualized in various ways for the purpose of FIG. 4. For example, a snapshot may correspond to a timestamp. As another example, a snapshot may correspond to a particular value of an outcome field. For instance, different values may be captured as an outcome value for an outcome field changes throughout a process of updating a database record. As yet another example, a snapshot may correspond to a database commit in which one or more values in the record 302 are updated.

Figure 5:
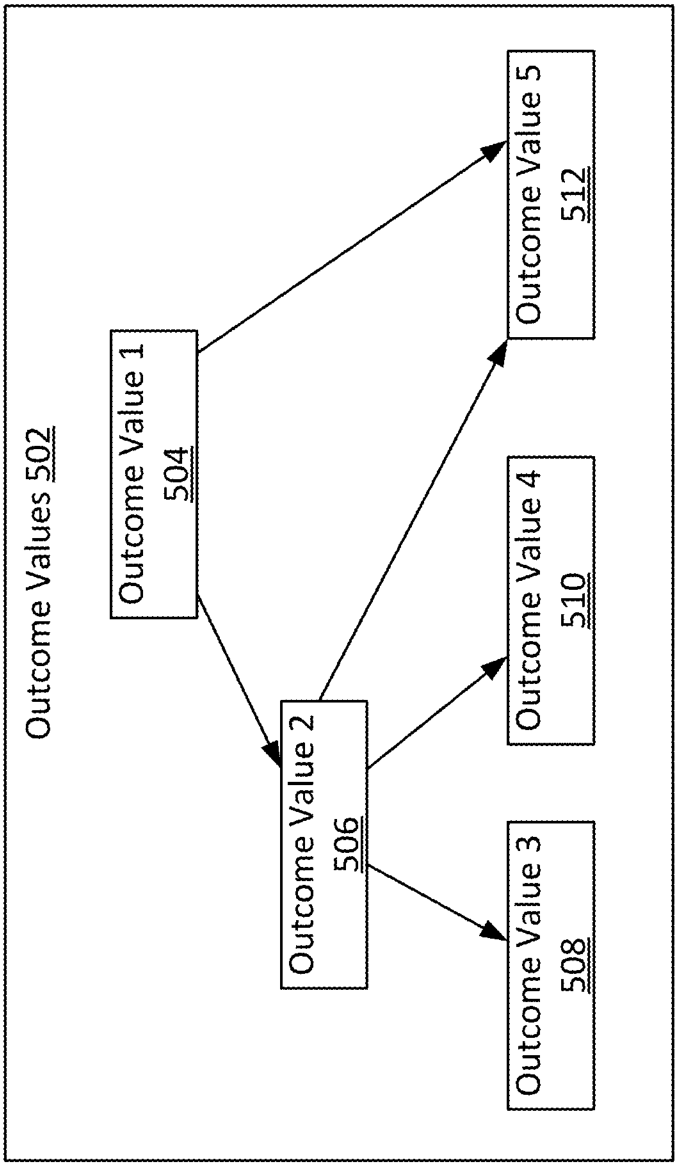
FIG. 5 shows an arrangement of possible outcome values, configured in accordance with one or more embodiments.

FIG. 5 shows an arrangement of possible outcome values 502, configured in accordance with one or more embodiments. The possible outcome values 502 are shown as an example for the purpose of illustration. In practice, however, various combinations and numbers of outcome values are possible.

For example, suppose for the purpose of illustration that the outcome values 502 correspond with those in a Service Case database record corresponds with a customer service issue, and are organized as follows:

- Outcome Value 1 504 corresponds to a value of "New Case" and indicates a newly opened record that has not yet been evaluated.
- Outcome Value 2 506 corresponds to a value of "Evaluated" and indicates a record for a case that is being addressed by a service agent.
- Outcome Value 3 508 corresponds to a value of "Resolved within SLA" and indicates a record for a case that was successfully resolved within the allotted time. In this example, the term SLA refers to a service level agreement.
- Outcome Value 4 510 corresponds to a value of "Resolved outside SLA" and indicates a record for a case that was successfully resolved but not within the allotted time.
- Outcome Value 5 512 corresponds to a value of "Failed" and indicates a record for a case that was not resolved successfully.

According to various embodiments, techniques and mechanisms described herein may be used to identify which field values are predictive of which outcome values. For example, one field may be entirely blank upon the creation of a new case database record, and typically may be unfilled until after the case database record is evaluated. The filling of such a field would therefore not be predictive of a move from outcome value 1 504 to outcome value 2 506. However, in this example, the same field may tend to be filled for records that are classified as "Resolved within SLA" but tend not to be filled for records that are "Resolved outside SLA." Additional details regarding the determination and capture of such information are discussed throughout the application.

Figure 6:
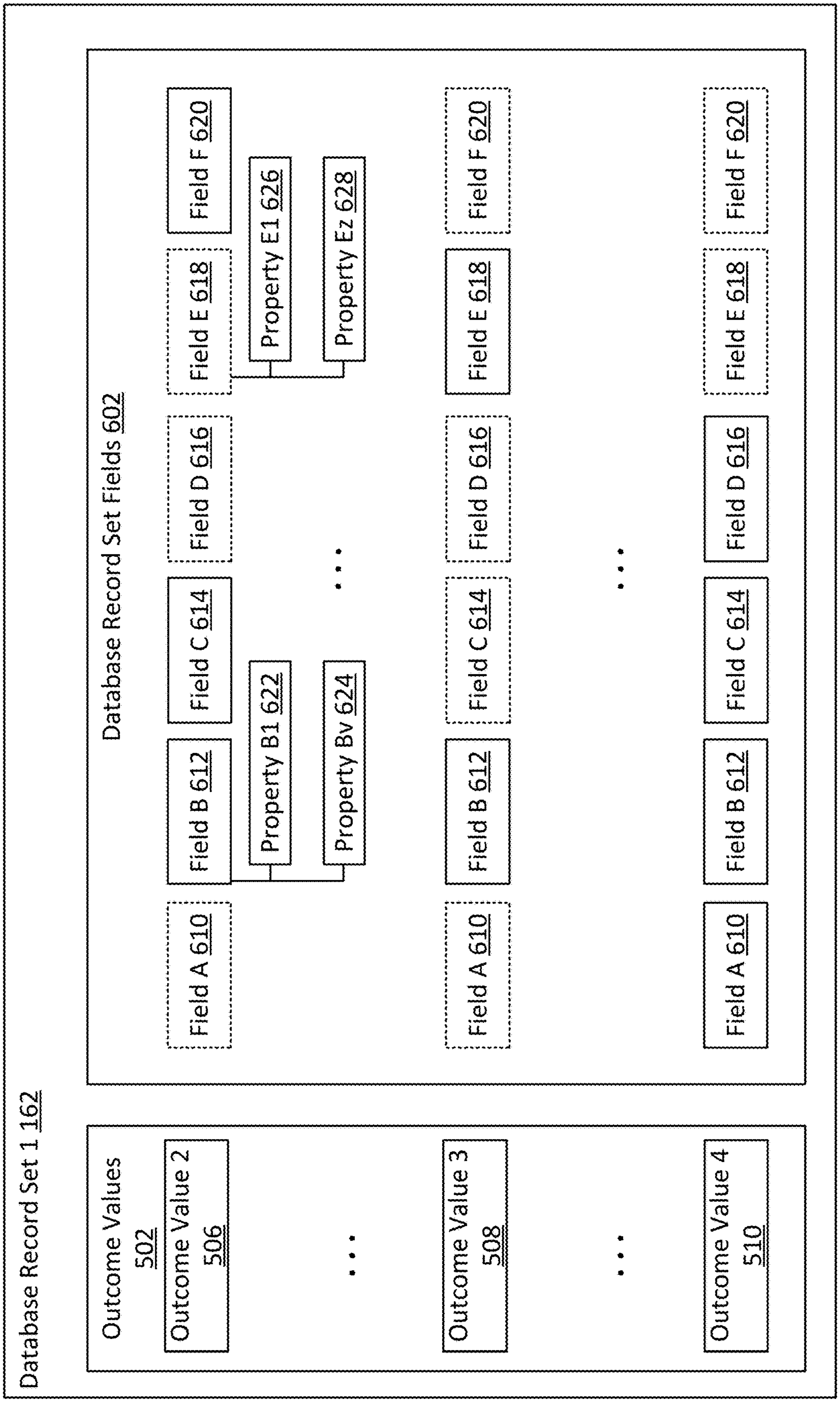
FIG. 6 illustrates additional details regarding the database record set, configured in accordance with one or more embodiments.

FIG. 6 illustrates additional details regarding the database record set 162, configured in accordance with one or more embodiments. In FIG. 6, examples of the fields associated with records in a database record set are shown at 610, 612, 614, 616, 618, and 620. In practice, a database record type may include many such fields. However, for the purpose of illustration, only six are shown in FIG. 6.

According to various embodiments, data profiling may be used to identify the fields that are important for predicting different outcome values. In FIG. 6, the outcome value 2 506 is predicted in significant part by the presence of the fields B 612, C 614, and F 620. The outcome value 3 508 is predicted in significant part by the presence of the field B 612 and E 618. The outcome value 4 510 is predicted in significant part by the field A 610, B 612, C 614, and D 616.

According to various embodiments, various characteristics of fields and the data stored in fields may lead to their being identified as predictive or not for different outcome values. For example, it may be the case that Opportunity database objects that have a filled value for a "mailing address" field are more likely to be converted from "Lead" into "Converted" in the outcome value. However, the system may impose a requirement that all Opportunity database objects having an outcome value of "Converted" must have a filled value for mailing address, meaning that whether the "mailing address" field is filled is then a poor predictor for moving from Converted to Account.

In some embodiments, a field may be associated with a property. For instance, the field B 612 is associated with the properties B1 622 through Bv 624, while the field E 618 is associated with the property E1 626 through Ez 628. Properties may be used to facilitate the determination of which fields are predictive of which outcome values. For example, a property for a field may include a default value. In such a configuration, the data profiling analysis may indicate that whether or not the field is filled is a poor predictor of an outcome value because people tend not to replace default values, leading to poor accuracy and poor predictive power.

Data Profiling

Figure 7:
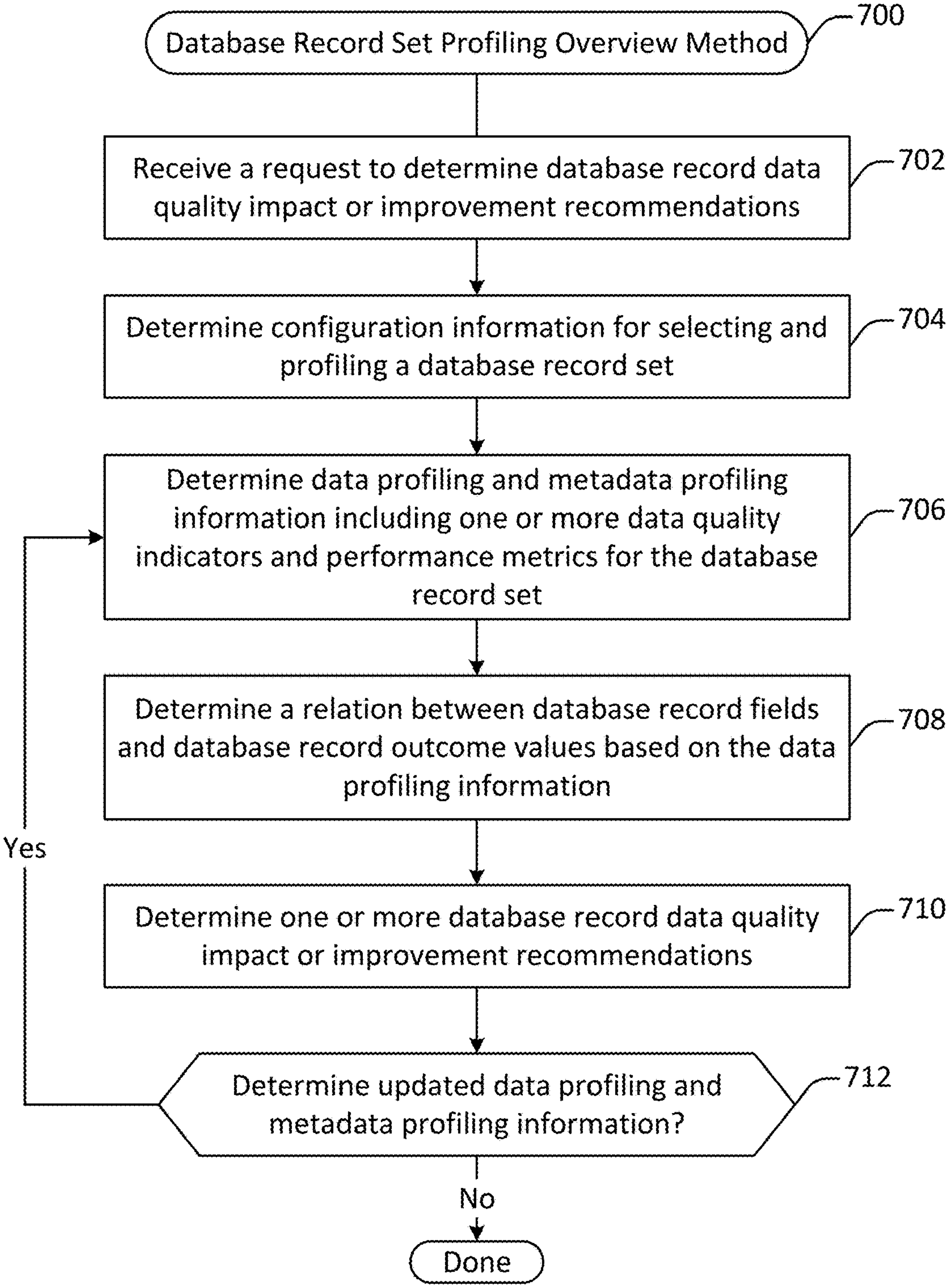
FIG. 7 illustrates an overview method for determining database record set outcome value prediction model, performed in accordance with one or more embodiments.

FIG. 7 illustrates an overview method 700 for determining database record set outcome value prediction model, performed in accordance with one or more embodiments. According to various embodiments, the method 700 may be performed at a database system such as the database system 150 shown in FIG. 1. For instance, the method 700 may be performed as a native application implemented within the database system 150.

A request to determine database record data quality impact or improvement recommendations 702. In some embodiments, the request may be received at the database system. The request may be generated by a systems administrator. Alternatively, the request may be generated automatically based on the detection of a triggering condition. For instance, a database record set may be analyzed periodically or upon detection of an outcome quality level that surpasses a designated threshold.

Configuration information for selecting and profiling a database record set is determined at 704. According to various embodiments, the configuration information may include parameters such as one or more database objects to profile, one or more fields within the selected one or more database objects, one or more outcomes, and/or other such information. Additional details regarding the determination of such configuration information are discussed with respect to the method 800 shown in FIG. 8.

Profiling information including one or more data quality indicators and performance metrics for a database record set is determined at 705. In some embodiments, the data quality indicators may include characteristics such as field fill rates, field distinct value counts, field distinct value densities, and other such information. The performance metrics may include one or more context-specific outcome measures, such as a percentage of Sales Opportunity database records that were won, a dollar amount of Sales Opportunity database records that were won, a percentage of Service records that were resolved within the time allotted by a service level agreement, or other such key performance indicators (KPIs). Additional details regarding the determination of data profiling information are discussed with respect to the methods 1400 and 1500 shown in FIG. 14 and FIG. 15.

A relation between database record fields and database record outcome values is determined at 708 based on the data profiling information. According to various embodiments, some or all of the data quality indicators and the performance metrics may be determined for particular outcome values. For instance, a database record set may include potentially many different records exhibiting various outcome values. These records may be grouped by their outcome values and then analyzed separately to facilitate the identification of fields that may be predictive of particular outcome values. An example of such a relation is shown in FIG. 6, where the presence of values in particular database record fields is identified as being predictive of particular outcome values. Additional details regarding the determination of such relations are discussed with respect to the method 900 shown in FIG. 9.

One or more database record quality impact or improvement recommendations are determined at 710. According to various embodiments, the database record quality recommendations may be determined based on the relation determined at 708 in view of the data quality indicators and performance metrics determined at 704. For instance, the system may determine that the presence of a value for field X is highly predictive of a positive outcome Y but that the field X has a relatively low fill rate for database records for which a positive outcome Y is possible but has not yet been realized. Based on such a determination, the system may recommend that additional focus be paid to identifying accurate information for field X.

A determination is made at 712 as to whether to determine updated data profiling information. In some embodiments, updated data profiling information may be determined periodically or upon request. The particular cadence at which updated data profiling information is determined may depend in part upon database record set characteristics such as the number and frequency of updates to the database record set in a period of time. Additional data profiling information may continue to be collected until a termination condition is detected, for instance when performance indicators and/or data quality rise above a designated threshold or when successive recommendations do not yield significant further improvements in performance indicators.

In some implementations, the determination of updated data profiling information may be used to determine, in a probabilistically causal sense, whether the database record set data quality recommendations determined at 708 led to an increase in data quality. That is, after the implementation of the recommendations, additional data quality indicators and performance metrics may be determined. If both data quality indicators associated with the database record data quality recommendations and associated performance metrics increased, then a determination may be made that the improvement in data quality for the identified records likely caused the improved outcome values represented by the increased performance metrics.

Figure 8:
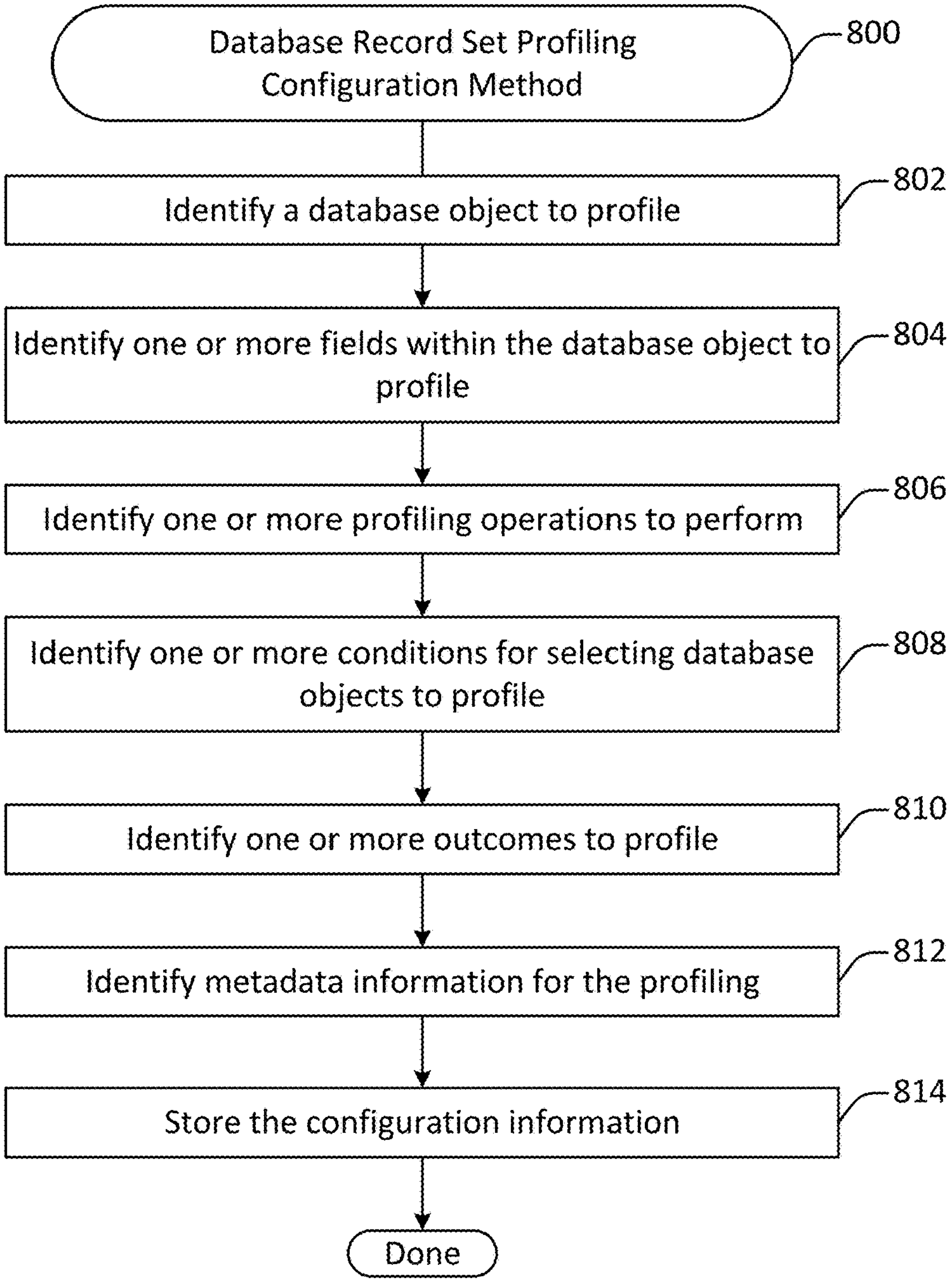
FIG. 8 illustrates a method for determining configuration information for database record set profiling, performed in accordance with one or more embodiments.

FIG. 8 illustrates a method 800 for determining configuration information for database record set profiling, performed in accordance with one or more embodiments. In some embodiments, the method 800 may be initiated as discussed with respect to the operation 704 shown in FIG. 7.

At 802, a database object to profile is identified. In some embodiments, the database object may be selected via a user interface. FIG. 9 through FIG. 13 illustrate examples of user interfaces, generated in accordance with one or more embodiments. The user interfaces shown in these figures represent examples of user interfaces that may be generated, for instance, in the course of executing one or more of the methods shown in FIG. 9 through FIG. 12.

Figure 9:
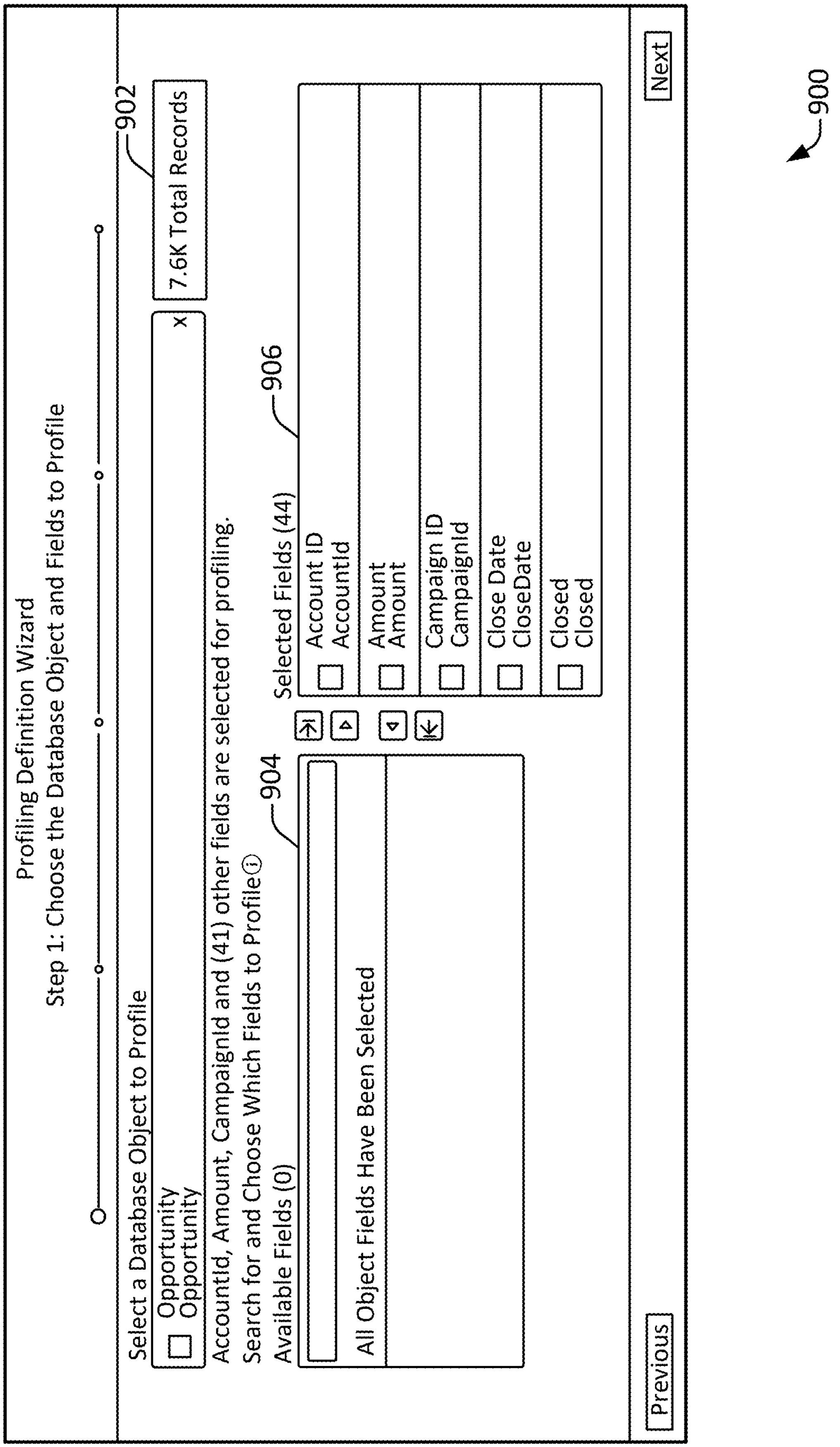
FIGS. 9-13 illustrate user interfaces generated in accordance with one or more embodiments.
Figure 10:
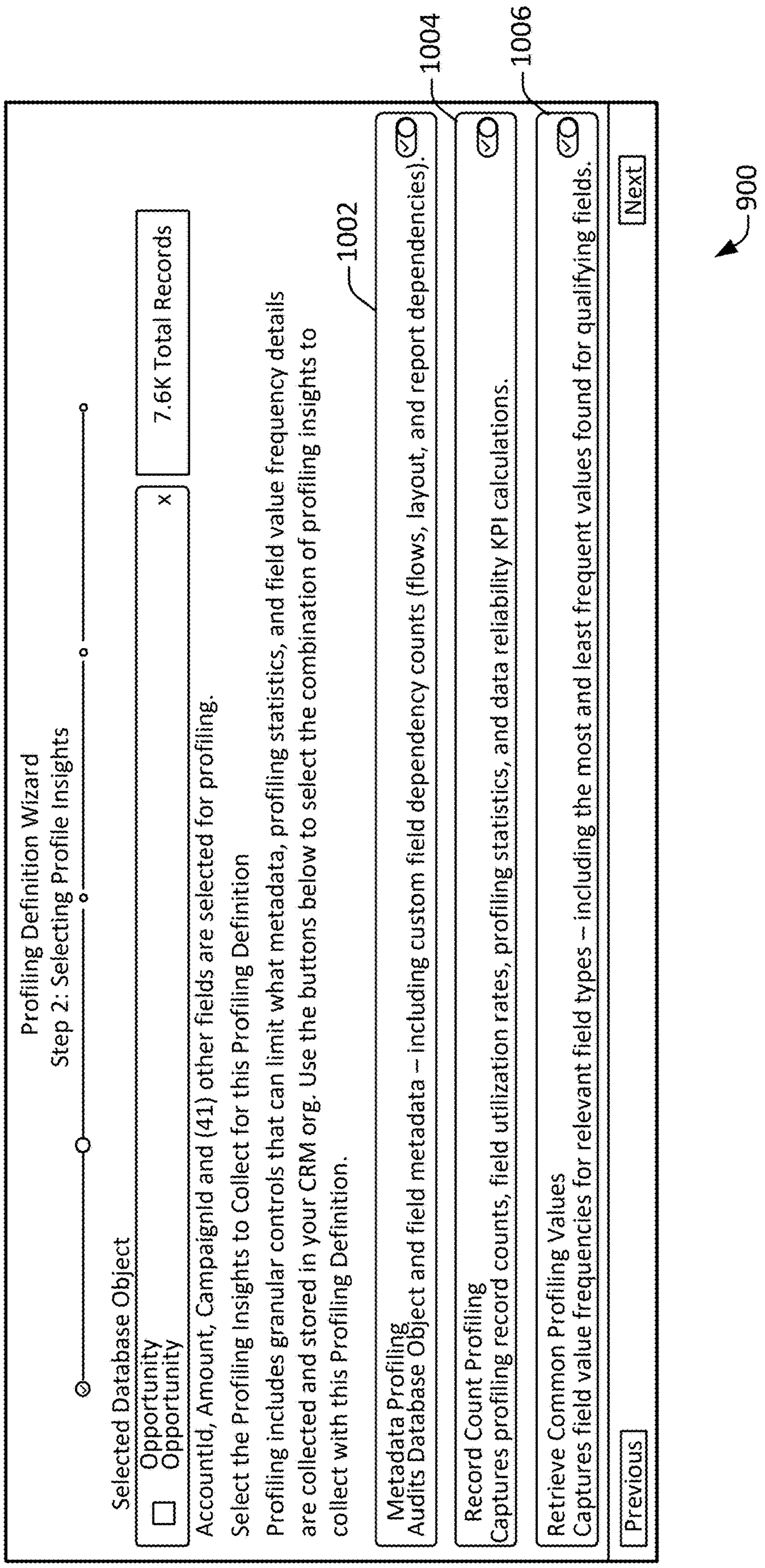
Figure 11:
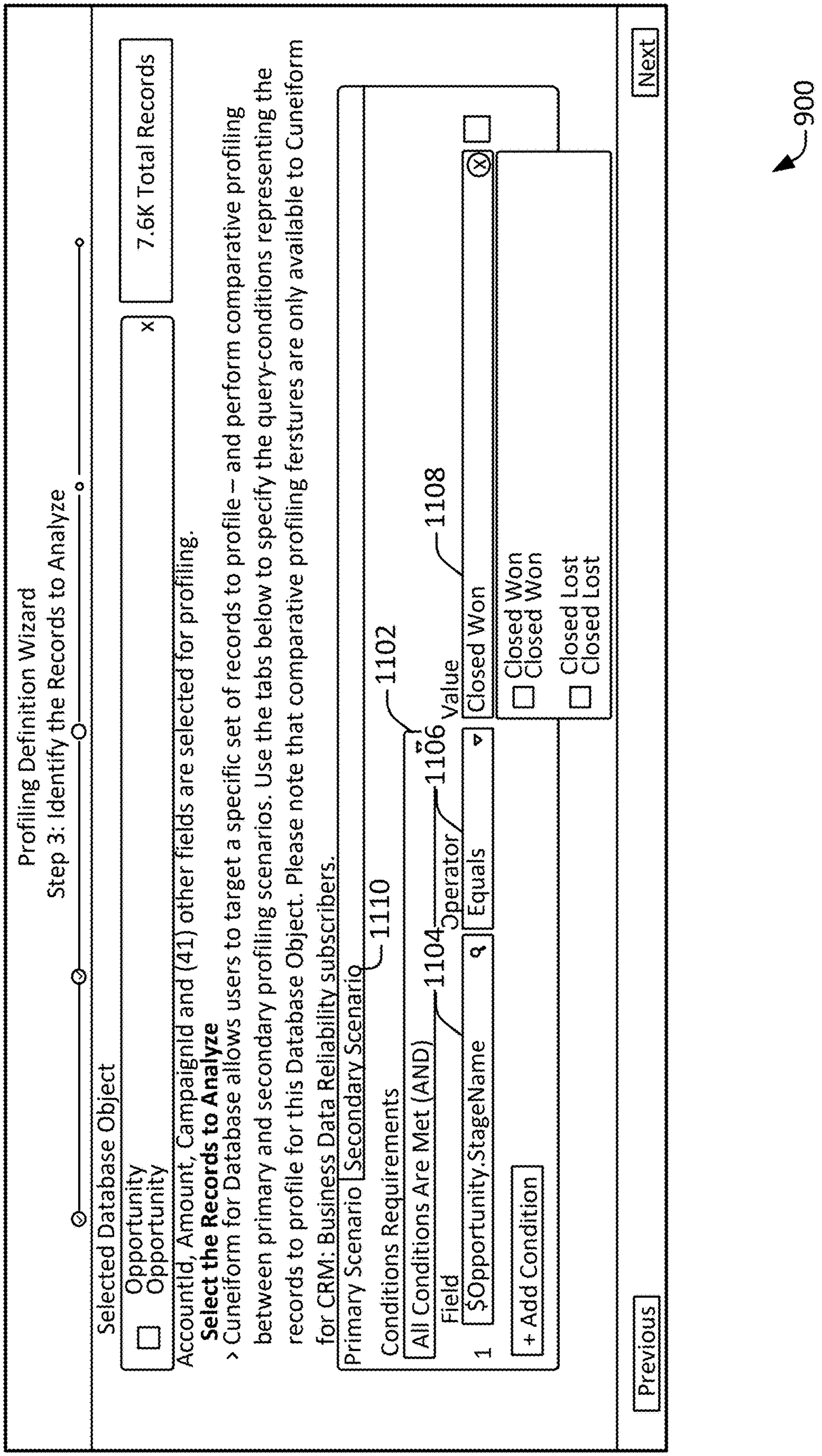
Figure 12:
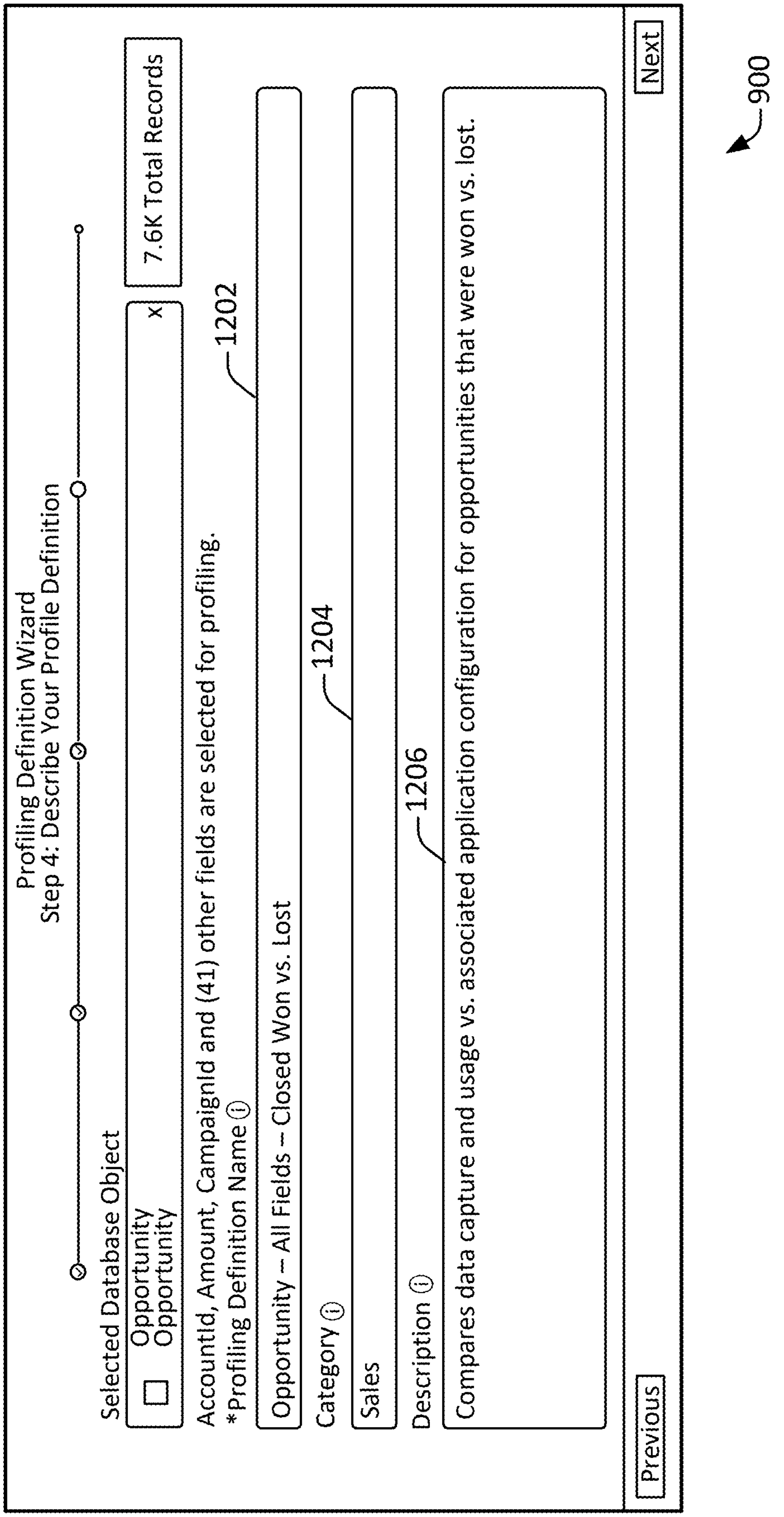
Figure 13:
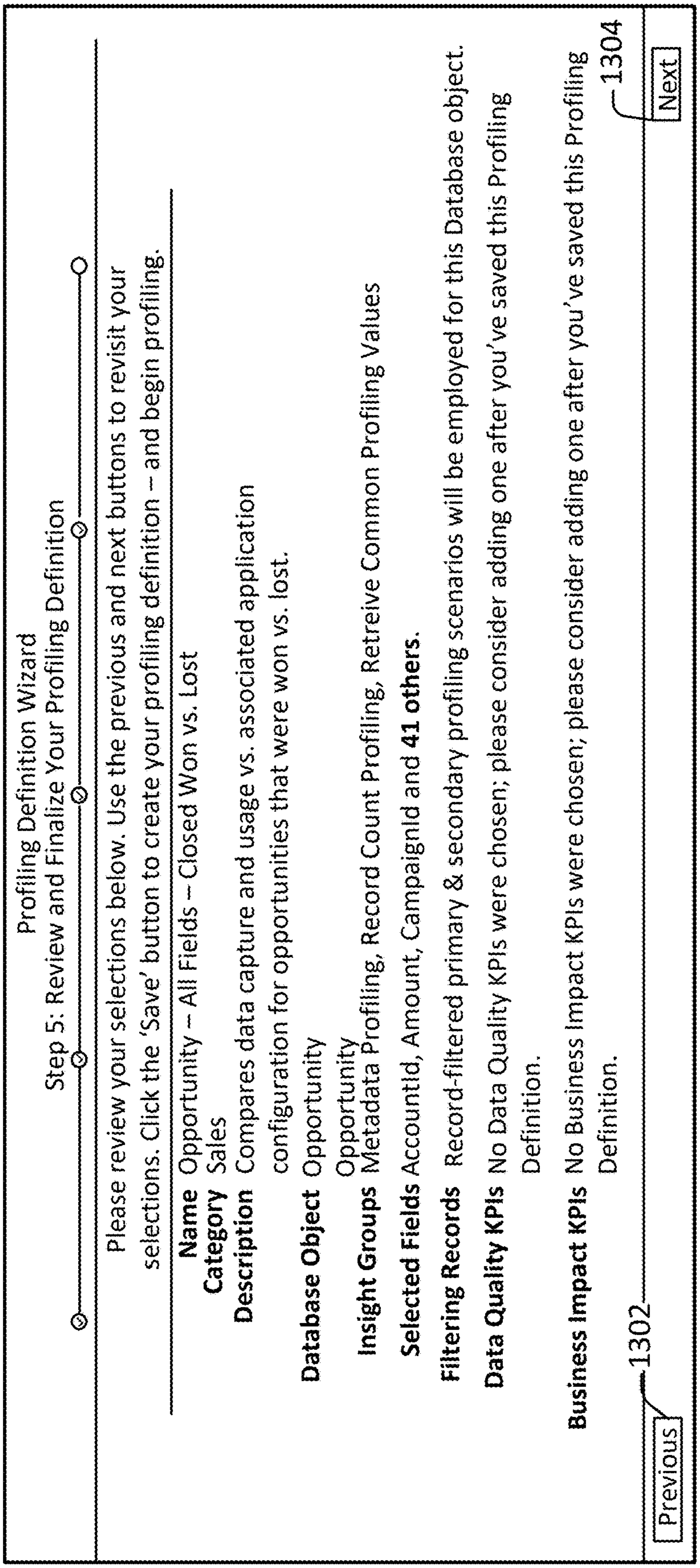

A profiling definition wizard is shown at 900 in FIG. 9. In some implementations, the profiling definition wizard 900 may be used to specify configuration information for performing database dataset profiling. At 902, user input for selecting a database object is received. In FIG. 9, the database object being selected is an Opportunity object.

Returning to FIG. 8, one or more fields within the database object to profile are identified at 804. As shown in FIG. 9, fields with the database object may be selected for or excluded from profiling. In some embodiments, for instance as shown at 902, the database record set has 7,600 total records of the type Opportunity. Fields included in Opportunity objects may be selected at 904 and moved to the Selected Fields list at 906.

One or more profiling operations to perform are identified at 806. For example, in FIG. 10, the profiling definition wizard 900 facilitates the selection of the types of profiling operations to be performed. According to various embodiments, examples of the types of profiling operations that may be selected include metadata profiling 1002, record count profiling 1004, and retrieving common profiling values at 1006.

One or more conditions for selecting database records to profile are identified at 806. According to various embodiments, the one or more conditions may specify selection criteria such as fields and associated field values, which may be used to determine a database query for object selection. For example, In FIG. 11, one or more conditions are identified for selecting the Opportunity database records to include in the record set. In some embodiments, as shown at 1102, the user interfaces allows for the specification of logical conditions, such as requiring that all conditions are met (i.e., AND), requiring that at least one condition is met (i.e., OR), or custom condition logic. An example of a condition is shown below, including the database field at 1104, the operator at 1106, and the value at 1108. For instance, condition 1 would be treated as True for a database record if the value of the StageName field for that record were equal to Close Won.

In some embodiments, the one or more conditions for selecting the database records to profile may facilitate the specification of a secondary scenario, or more than one alternative scenarios. The secondary or alternative scenarios may be used as a basis of comparison to compare outcomes, for instance for two different subjects of database records corresponding to the selected database object.

For example, at 1110, the profiling definition wizard 900 allows for the specification of a secondary scenario. In some embodiments, the secondary scenario includes another set of conditions for selecting a different database record set. If the secondary scenario is specified, then the system can perform comparative profiling between the primary and secondary profiling scenarios.

At 810, one or more outcomes to profile are identified. According to various embodiments, an outcome field may represent a measurable key performance indicator or business outcome. In some cases, such a value may be manually specified. For instance, an Opportunity object may be associated with an outcome field that indicates whether or not the opportunity associated with the object was successfully converted. Alternatively, an outcome field may be associated with a value determined dynamically based on other information. For instance, an outcome such as hallucination risk or lead completion percentage may be computed as a formula based on other database fields within the database object.

In some embodiments, database records may be grouped based on values in the outcome field to define a "surface area"—a quantifiable segment of data—that is directly tied to a specific result. Such a definition allows for measuring the volume of data affected by a particular outcome, such as how much data is associated with high hallucination risk. Such outcome-driven grouping allows for the prioritization of data quality remediation efforts based on the perceived importance of the associated outcome. It moves beyond general data segmentation to focus on data quality issues that have a direct, measurable impact on critical business metrics.

In some embodiments, configuration information determined at 704 may include one or more key performance indicators (KPI) for the database records. A key performance indicator may store information indicative of business impact, data quality, data reliability, and/or other such metadata values for a database record. For instance, a KPI may be a custom database field associated with a database object. Such KPIs may then be profiled at 704 along with other elements of a database object. Additional details regarding the configuration and profiling of KPIs are also discussed with respect to FIG. 38 through FIG. 46.

Metadata information for the profiling is identified at 812. For example, in FIG. 12, the profiling definition wizard 900 facilitates the specification of metadata information for the database profiling information. For instance, information such as a profiling definition name 1202, data category 1204, and profiling description 1206 can be specified.

The configuration is stored at 812. In some embodiments, the configuration information may be stored within one or more configuration profiles within the database system. For example, the profiling definition wizard 900 facilitates the review and storage of the data profiling configuration in FIG. 13. For instance, the user can provide user input at 1302 to continue editing the configuration information, or finalize and store the configuration information at 1304.

According to various embodiments, the profiling definition wizard 900 may allow for the specification of additional information not shown in FIG. 9 through FIG. 13. For example, the profiling definition wizard 900 may facilitate the configuration of thresholds for parameters such as sparsely populated fields, distinct density, and/or dominant value frequency.

According to various embodiments, the profiling configured as discussed with respect to the method 800 shown in FIG. 8 provides for the determination of correlations of field population statistics and outcomes using a layered approach. For example, low-level profiling statistics provide foundational metrics describing data shape such as record count, fill rate, null frequency, and distinct counts. Then, profiling insights such as duplicate rate and distinct density may be derived from low-level statistics. Outcome statistics may then be created on top of profiling insights and low-level statistics to represent the relevance or context of the data's shape concerning the outcome field, such as lead completion percentage as a measure of key field completeness for Lead database objects. The system then correlates these outcome statistics (e.g., business relevance and context) and profiling statistics (e.g., data shape) with actual business statistics (e.g., those describing business performance such as lead conversion rate, lead response time, etc.). The correlations establish factual relationships between the shape of the data, its business context, and its actual business performance. Such an approach dramatically shortens the time needed to evaluate data shape and performance, allowing users to prioritize efforts, estimate performance impacts, and project ROI for data remediation.

According to various embodiments, the relationships, correlations, and other information and statistics determined based on the profiling configuration information may be used to inform user decisions. For instance, the identified correlations and the analysis of profiling statistics within outcome-based groups may be used used to inform user decisions and strategies for data processing, remediation, and ingestion, rather than automatically generating specific, record-level update recommendations. By inspecting the profiling statistics of data groupings with specific outcome statistic scores, for instance by analyzing the data shape within a group of records exhibiting low Lead Completiom, users gain insights to understand the root causes of data quality issues impacting that outcome. Similarly, analyzing the profiling statistics of high-performing, high-completeness data segments provides a model to inform how additional data should be brought into the system to ensure sustainable, positive business results.

According to various embodiments, the relationships, correlations, and other information and statistics determined based on the profiling configuration information may provide a significant reduction in time-to-decision and time-to-value for improving data reliability. The layered approach of correlating profiling, outcome, and business statistics provides a grounded, factual basis for instrumenting data effectively and for creating a common language that bridges operational business context (via outcome fields and statistics) with technical data details (via profiling statistics). Such an approach reduces time to action, increasing the ROI derived from improved business outcomes, and substantially reduces the investment required to establish and maintain data reliability.

Figure 14:
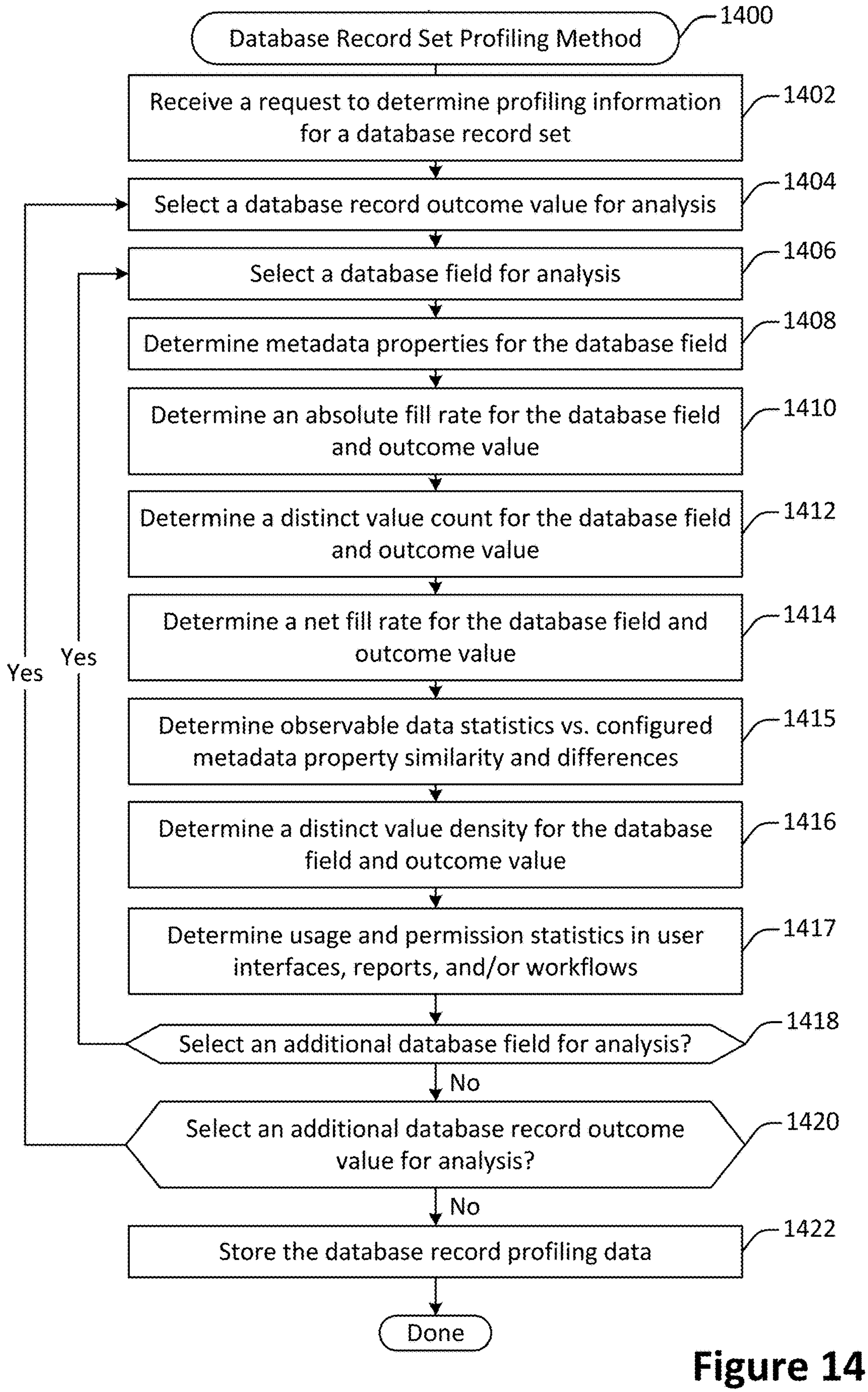
FIG. 14 illustrates a method for determining database record set profiling information, performed in accordance with one or more embodiments.

FIG. 14 illustrates a method 1400 for determining database record set profiling information, performed in accordance with one or more embodiments. The method 1400 may be performed at a database system such as the database system 150 shown in FIG. 1. The method 1400 may be performed in order to determine information for the purpose of identifying a relation between database record fields and database record outcome values.

A request to determine profiling information for a database record set is received at 1404. In some embodiments, the request may be generated as discussed with respect to the operations 702 and 704 shown in FIG. 7. The request may identify the database record set for which the profiling information is to be determined.

A database record outcome value is selected for analysis at 1404. A database field is selected for analysis at 1406. In some embodiments, database records in the database record set may be grouped by outcome value. In some configurations, a database record set may include a single outcome field having a distinct set of outcome values. Alternatively, a database record set may include more than one outcome field. In such a situation, database records may be analyzed based on individual outcome values and/or groupings of outcome values. The database fields may be analyzed in parallel or in any suitable sequence.

Metadata properties are identified for the database field at 1408. According to various embodiments, the metadata properties may include an analysis of one or more properties related to the database field. For example, a property may include a permissions list identifying one or more types of database accounts permitted to access the database field. As another example, a property may include one or more validation rules applied to the database field. As yet another example, a property may include a data type, a level of precision, the existence of help text, the use of a field in a workflow, a frequency with which the field is viewed, the existence of a default value for a field, whether a field is a formula field computed based on other fields, and/or any other type of metadata information.

An absolute fill rate is determined at 1410 for the database field and outcome value. In some embodiments, the absolute fill rate may indicate a number or proportion of fields that have a filled value as opposed to an empty value. For instance, a database record may initially be created with a null value for a field, and that null value may or may not be replaced with a different value over time.

A distinct value count is determined at 1412 for the database field and outcome value at. In some embodiments, the distinct value count may indicate the number of distinct values for the field. For example, a field for “state” in the context of a United States address may be limited to values corresponding to actual states and territories of the United States.

A net fill rate is determined at 1414 for the database field and outcome value. In some embodiments, the net fill rate may indicate a number or proportion of fields that have a filled value that is different from a default value.

A distinct value density is determined at 1416 for the database field and outcome value. According to various embodiments, a distinct value density may indicate the percentage of distinct values relative to the overall record volume within the data set. For example, the distinct value density may be calculated as the number of distinct values in proportion to the number of filled values for a field.

According to various embodiments, one or more of the operations 1410-814 may be omitted, for instance based on the metadata properties determined at 1408. For example, if the metadata profile for a field indicates that it does not have a default value, then the determination of a net fill rate may be omitted.

Observable data statistics vs. configured metadata property similarity and differences are determined at 1415. According to various embodiments, determining such differences may involve determining, for instance, that a picklist included 5 active values but that the dataset captures only 3 of the active picklist values and one additional value. Such a finding may indicate a data reliability or adoption risk.

One or more usage and/or permission statistics in one or more user interfaces, reports, and/or workflows are determined at 1416. According to various embodiments, the usage and/or permission statistics may identify the accounts that accessed and/or had permission to access the database field. For example, a field that is not accessible to and/or not accessed by the database accounts that rely on the database object may be unlikely to impact whether the database record outcome value is reached. Such usage and/or permission information may be analyzed, together or separately, for user interfaces, reports, and/or workflows generated by or accessible via the database system. Such usage and/or permission information may be accessible as metadata for a field, logging information, configuration information, or other such data stored in the database system.

A determination is made at 1418 as to whether to select an additional database field for analysis. A determination is made at 1420 as to whether to select an additional database record outcome value for analysis. According to various embodiments, additional database record set fields and outcome values may continue to be selected for analysis until all values have been analyzed. In some configurations, one or more of the operations shown in FIG. 14 may be performed in parallel.

The database record profiling data is stored at 1422. In some embodiments, the profiling data may be stored in the database system 150. The profiling data may be stored to facilitate analysis, for instance as discussed with respect to the method 900 shown in FIG. 9.

Figure 15:
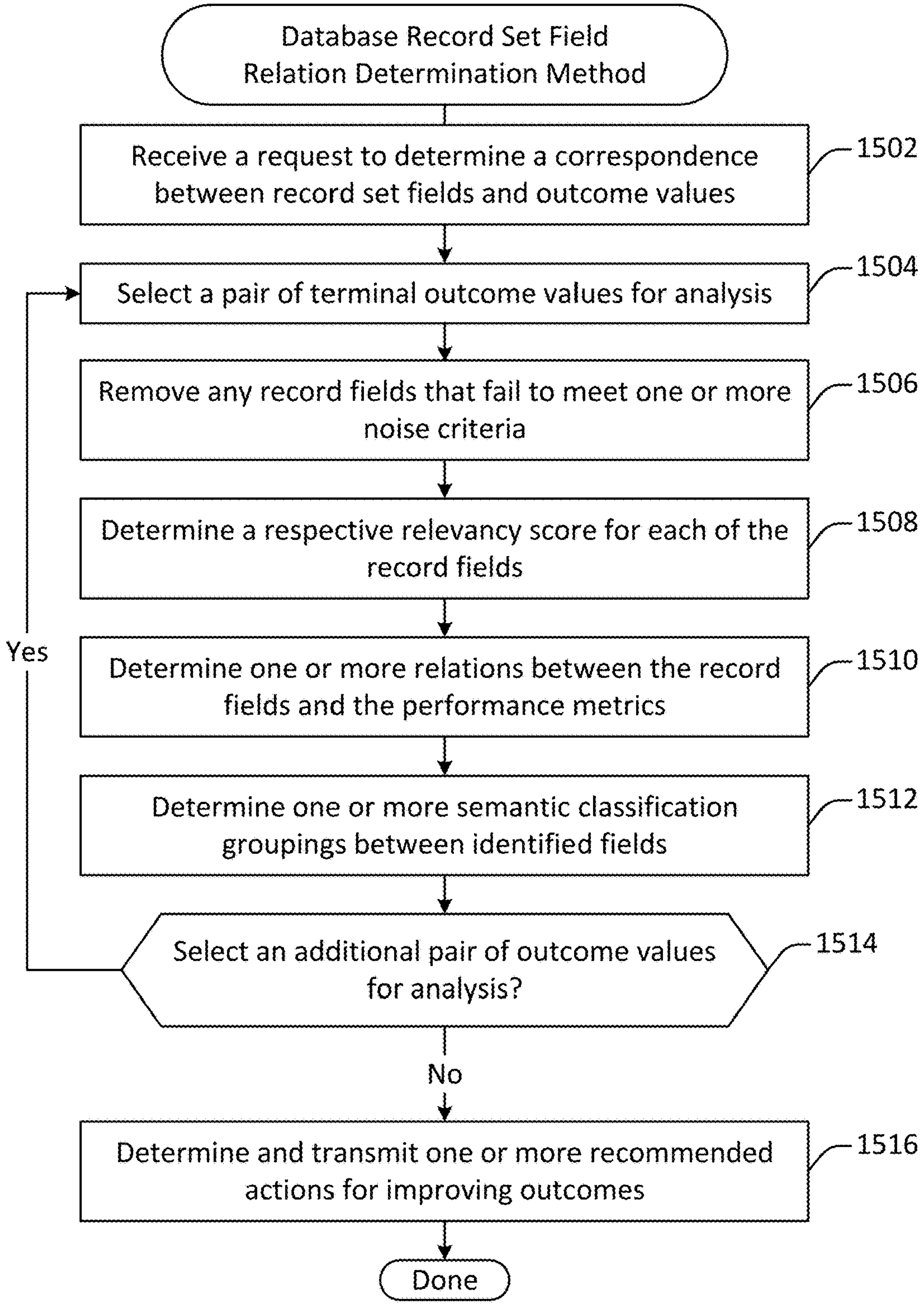
FIG. 15 illustrates a method for determining a database record set field relation, performed in accordance with one or more embodiments.

FIG. 15 illustrates a method 1500 for determining a database record set field relation, performed in accordance with one or more embodiments. The method 1500 may be performed at a database system such as the database system 150 shown in FIG. 1. The method 1500 may be used to identify differences between pairs of outcomes that indicate the data that is typically captured for successful and unsuccessful outcomes. For example, the method 1500 may be used to determine that Opportunity database records with a signed NDA have a higher chance of success than Opportunity database records without a signed NDA recorded. As another example, the method 1500 may be used to determine that Opportunity database records with Lead Source value "Acme LeadGen" have a higher rate of failure than other Opportunity records.

A request to determine a relation between record set fields and outcome values is received at 1502. In some embodiments, the request may be generated as discussed with respect to operation 706 shown in FIG. 7.

A pair of terminal outcome values and record fields are selected for analysis at 1504. According to various embodiments, the terminal outcome values may be values from the set of outcome values associated with the record set that indicate a later stage in a process for the database records among the outcome values that have not yet been analyzed. For example, in the example shown in FIG. 5, the outcome values 3 508 and 4 510 may be initially selected for comparison. In subsequent iterations, earlier pairs of values in the process may be selected, such as outcome value 2 506 and outcome value 5 512. In this way, the analysis may proceed in a "Right to Left" fashion, where Right corresponds to outcomes that are further along in the process and Left corresponds to outcomes that are earlier in the process. For instance, the initial pair of outcomes analyzed for a Sales Opportunity database record type may correspond to "Closed-Won" and "Closed-Lost" opportunities, while the next pair of outcomes analyzed may correspond to "Closed-Won" vs. "Open" opportunities, followed finally by an analysis of "Leads" that were converted with "Closed Won" vs. "Closed Lost" outcomes to apply the insights to unconverted Leads.

At 1506, any record fields that fail to meet one or more noise criteria are removed from the initial set. According to various embodiments, various types of noise criteria may be employed. For example, a field may be removed if it is always or almost always populated for records exhibiting either of the selected terminal outcome values. As another example, a field may be removed if it is always populated only when one of the two terminal outcome values is achieved. As yet another example, a field may be removed if it is entirely dependent on the values stored in other fields. As still another example, a field may be removed if it is filled more frequently for a dispreferred outcome (e.g., an unsuccessful outcome in a service or opportunity record).

At 1508, a respective relevancy score is determined for each of the record fields. According to various embodiments, the relevancy score may be determined by combining any or all of the information determined as discussed herein. The precise calculation for determining the relevancy score may be user-configurable. However, as one example, the relevancy score may be calculated by first determining the difference in population rate (i.e., the percentage of records for which the field is populated) between the preferred and dispreferred outcome values in the pair of outcome values. Then, the relevancy score may be calculated as a function of the distinct density and field metadata. For instance, the relevancy score may indicate a correlation between field fill rate and outcome value.

As one example, if a field is a reference ID to another object, the field fill rate may indicate relevance as a set of related factors. For example, an Account ID field on an opportunity record may always be populated, and is not an indication of success. However, a Billing Contact ID field that is more frequently populated in the late stages of opportunity records that lead to Closed-Won outcomes may be a leading indicator of a successful outcome. As another example, formula fields are based on other fields. Assessing formula fields can help determine additional fields that are relevant through secondary relationships.

At 1510, one or more relations are determined between the record fields and the performance metrics. In some embodiments, the relations may identify the record fields whose population is most likely to be relevant to the determination of a preferred outcome over a dispreferred outcome. The determination may be made at least in part by selecting all fields that were not removed at 1506 and that have a relevancy score over a designated threshold. The designated threshold may be user configurable.

At 1512, one or more types of semantic analysis are optionally performed on the database fields. For example, a pretrained machine learning model may be applied to group database field names for relevant fields by semantic category. As another example, clustering analysis, synonym replacement, or other types of natural language processing techniques may be performed on the database field names. In this way, fields that are identified as relevant may then be grouped together into logical units. For example, a Legal Readiness key performance indicator may include fields such as Non-Disclosure Agreement (NDA) Sent, NDA Signed, Professional Service Agreement (PSA) Sent, PSA Signed, Statement of Work Sent, and the like. As another example, a Business Contract Completeness key performance indicator may include fields such as Contact name, Contact Info, Number of Decision-Makers Captured, and the like. As yet another example, an Account Billing Address Completeness key performance indicator may include fields such as Country, State, Street, Email, Phone, and the like.

At 1514, a determination is made as to whether to select an additional pair of outcome values for analysis. In some embodiments, additional pairs of outcome values for analysis may continue to be selected until all viable pairs for the database record type have been analyzed. As discussed with respect to the operation 1504, the outcome values may be analyzed in reverse order, from terminal values when the database record is finalized to initial values when the database record is opened.

At 1516, one or more recommended actions for improving outcomes are determined and transmitted. In some embodiments, the recommended actions may include data quality key performance indicators defined as formulas based on the relations determined at 1510 and the relevancy scores determined at 1508. For example, database records having unresolved (i.e., non-terminal) outcome values (e.g., Open Opportunity database records) may be evaluated against the relevancy scores and relations to provide suggestions as to which fields may have a greater impact on successful conversion of these database records. For instance, if the filling of the NDA Signed field was more strongly correlated with a positive outcome than filling the PSA Signed field, then records having a non-terminal outcome value and that are missing a value for the NDA Signed field may be flagged with a recommendation that an effort be made to secure a signed NDA and update the database records.

In some embodiments, the efficacy of such recommendations may be evaluated during subsequent iterations of the methods shown in FIG. 7, FIG. 14, and FIG. 15, with the efficacy information being used to refine the recommendation. Efficacy may be evaluated with one or more key performance indicators (e.g., Opportunity Amount, Time to Close, etc.), allowing data quality risk to be correlated with practical impact to guide prioritization and correction actions.

FIG. 16 through FIG. 29 illustrate examples of user interfaces generated in accordance with one or more embodiments. The user interfaces shown in these figures illustrate profiling information generated as discussed, for instance, with respect to FIG. 14 and FIG. 15.

Figure 16:
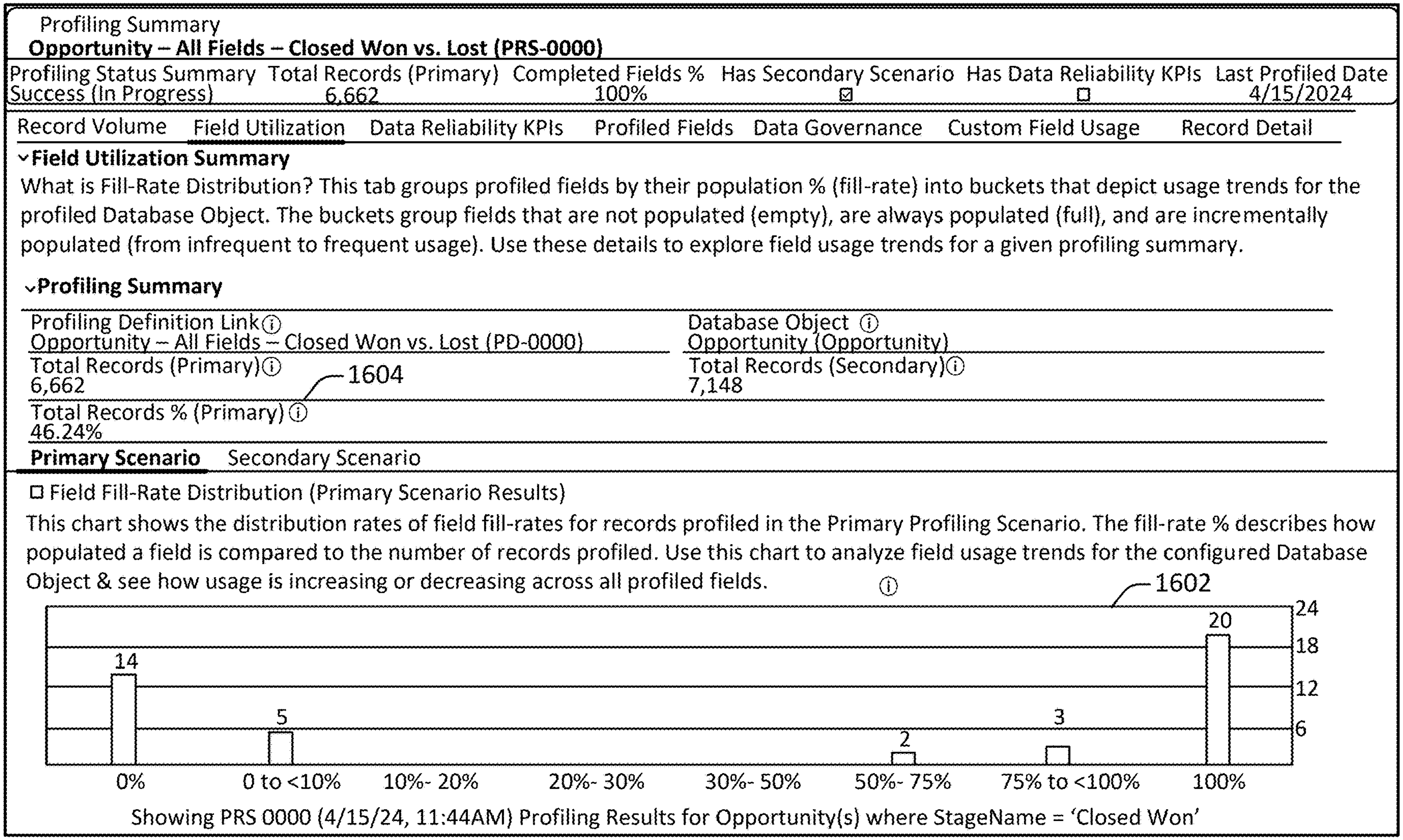

A profiling summary interface 1600 is shown in FIG. 16. The profiling summary interface 1600 includes various information determined by profiling, such as a fill rate distribution 1602 showing the distribution rates of field fill-rates for records profiled in the primary profiling scenario. The profiling summary interface 1600 also shows the number of records in the primary scenario.

Figure 17:
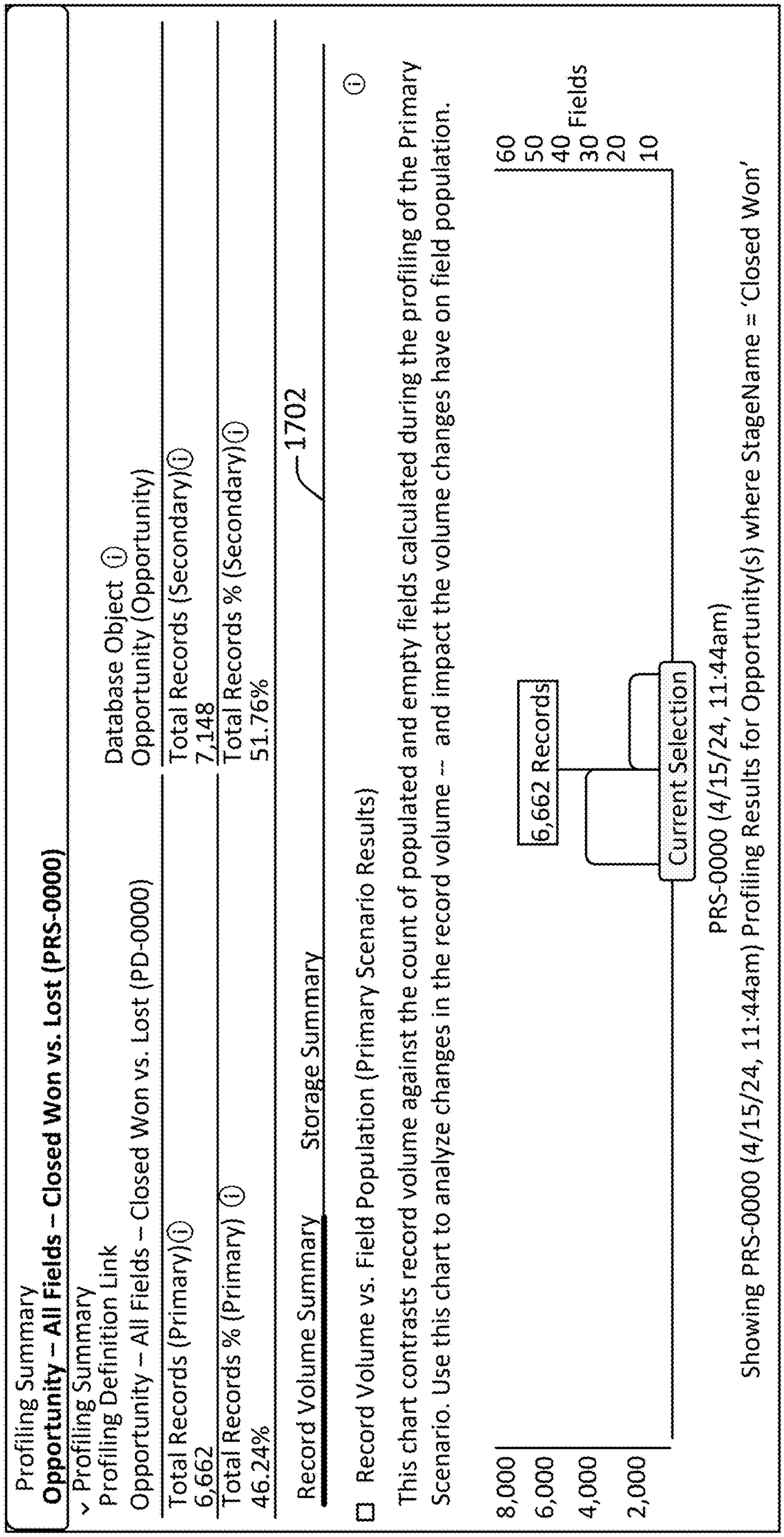

In FIG. 17, the profiling summary interface 1600 includes a record volume summary that shows a plot of the number of records in the primary scenario as well as the number of populated and empty fields.

In FIG. 18, the profiling summary interface 1600 includes a table 1802 of field-level profiling information, such as the distinct density for each field, the profiling status for the field, the data type for each field, and other such information.

Figure 19:
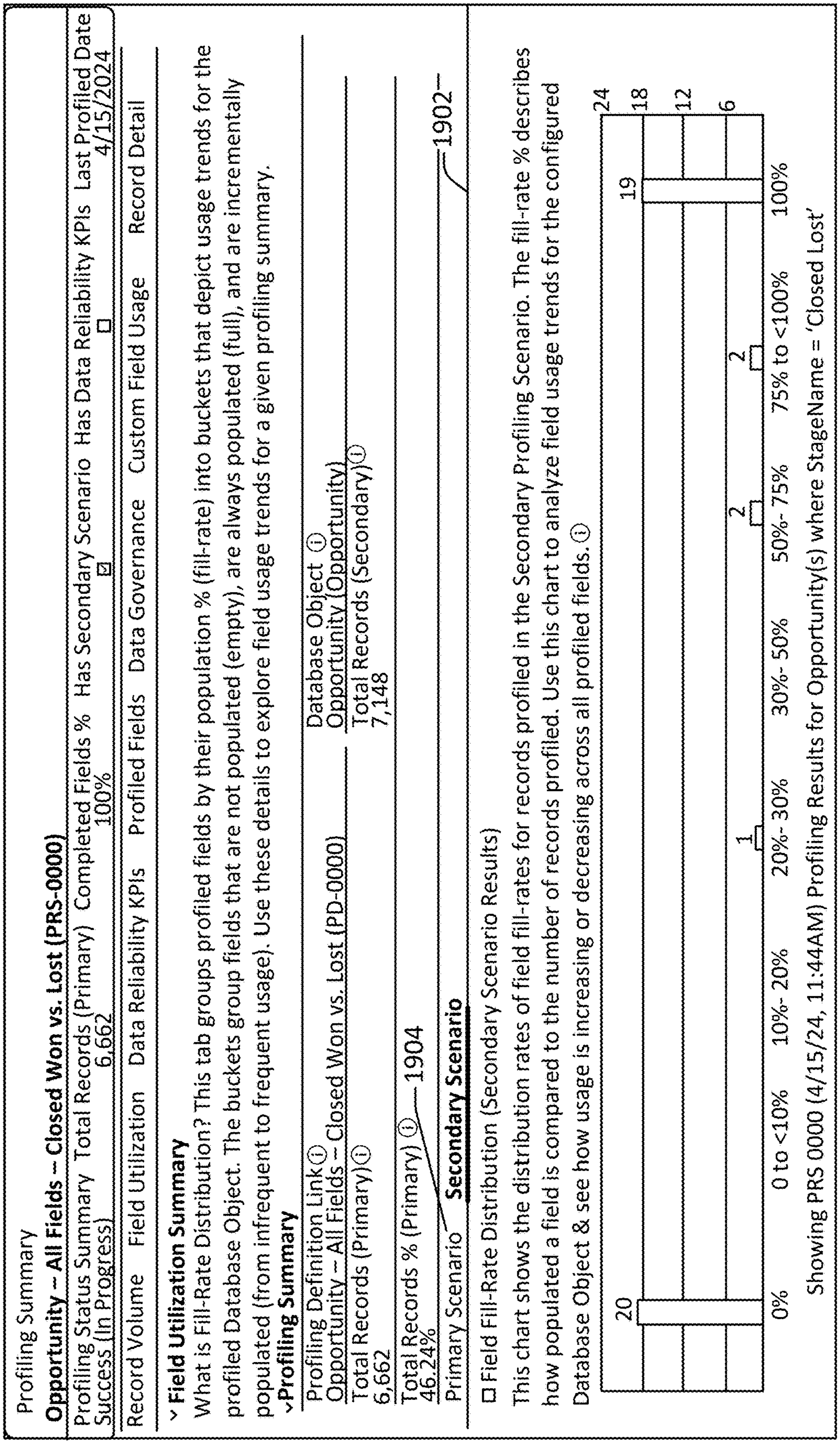

In FIG. 19, the profiling summary interface 1600 includes a fill rate distribution for the second scenario at 1902. The two fill rate distributions can be compared and contrasted by toggling the scenario at 1904.

In FIG. 20, the profiling summary interface 1600 includes a table 2006 of profiling values by field. The tabs 2002 through 2004 can be used to explore the fields based on their population rate.

Figure 21:
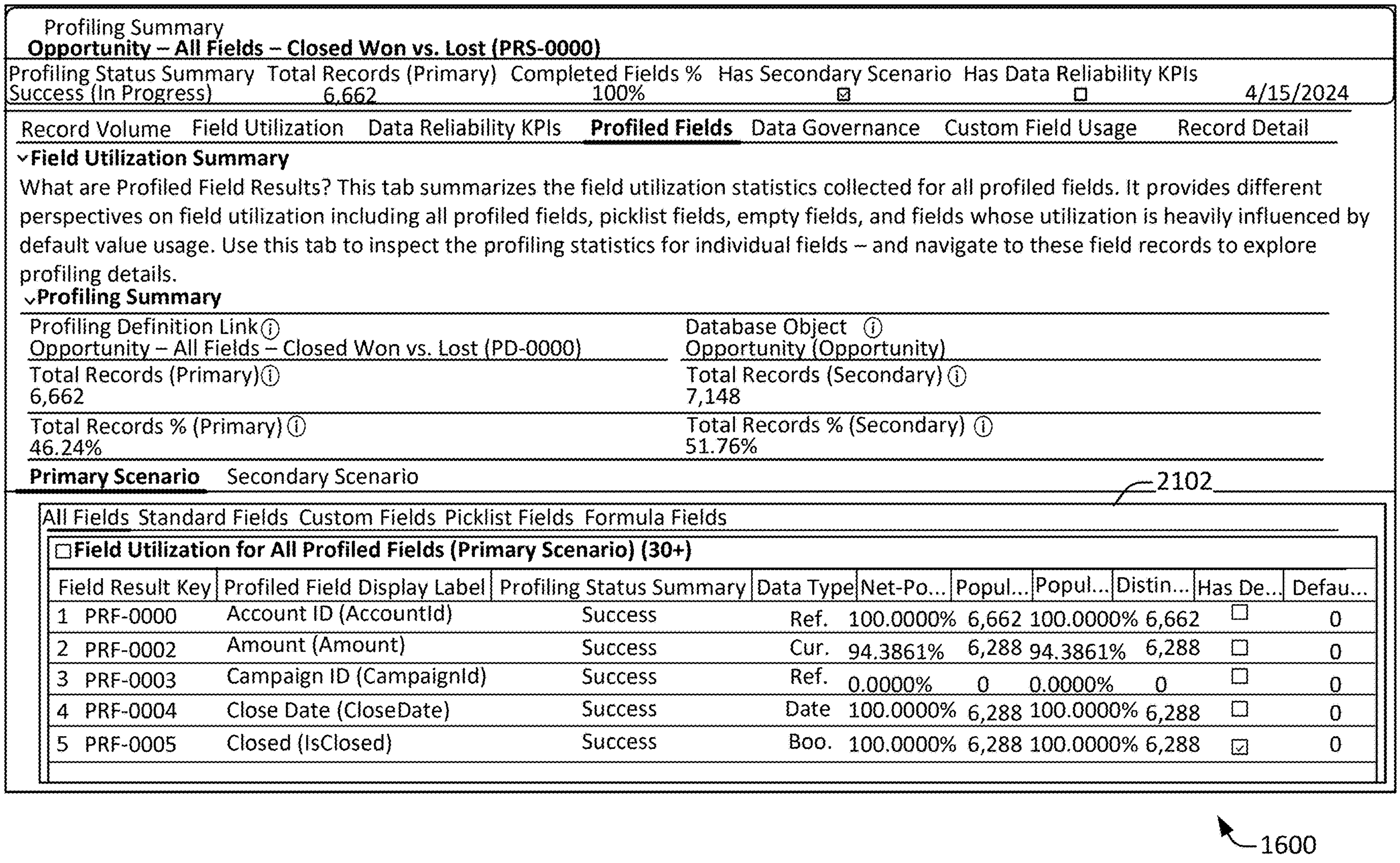

In FIG. 21, the profiling summary interface 1600 includes a table 2102 summarizing the field utilization statistics collected for profiled fields. For instance, the table 2102 provides different perspectives on field utilization including all profiled fields, picklist fields, empty fields, and fields whose utilization is heavily influenced by default value usage. The view can be used to inspect the profiling statistics for individual fields, and navigate to these field records to explore profiling details.

Figure 22:
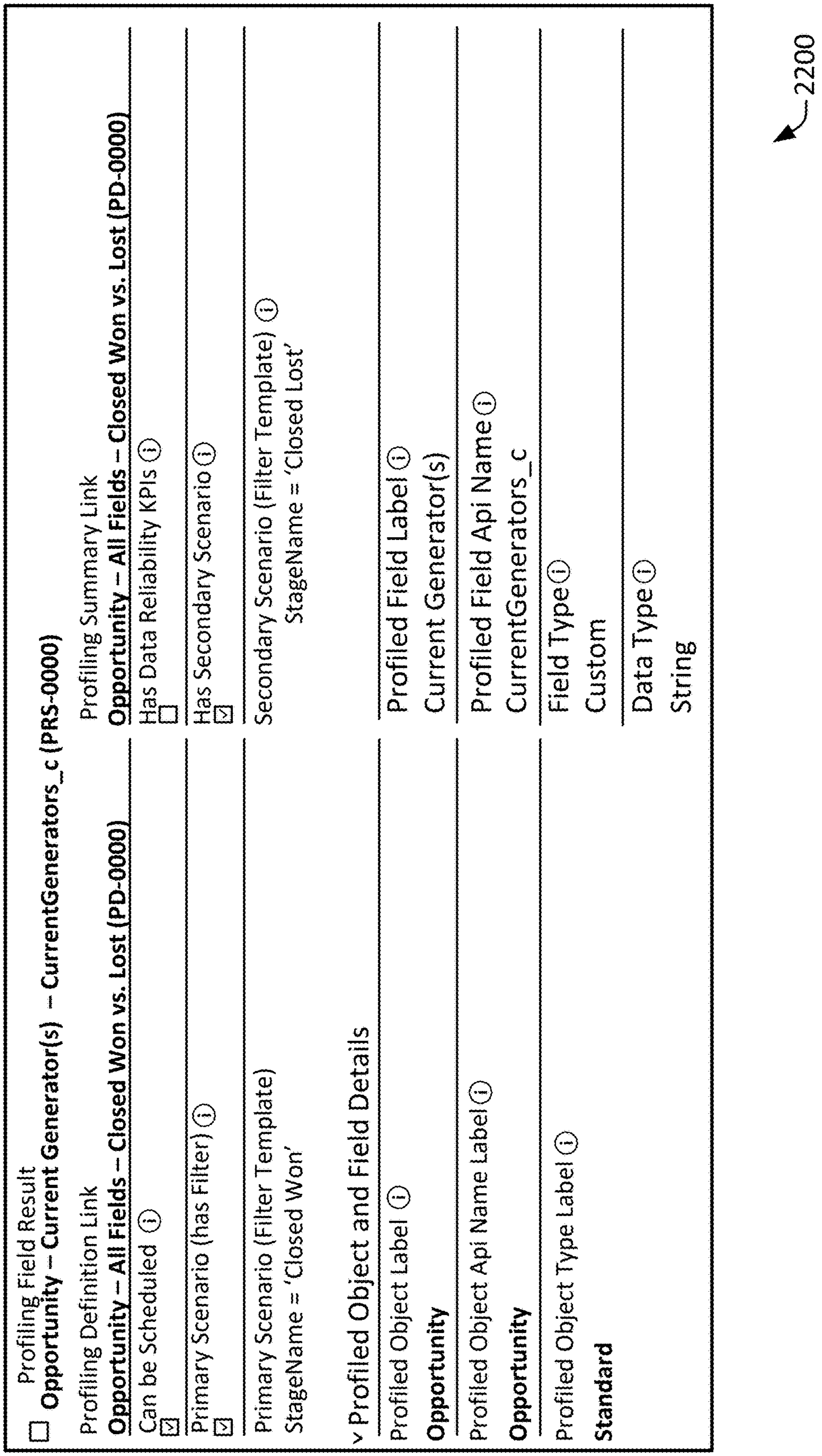

FIG. 22 illustrates a profiling field result interface 2200. The profiling field result interface 2200 provides an overview of the profiling results determined by comparing the primary and secondary scenarios, for instance for a particular field, as discussed with respect to the method 1500 shown in FIG. 15.

Figure 23:
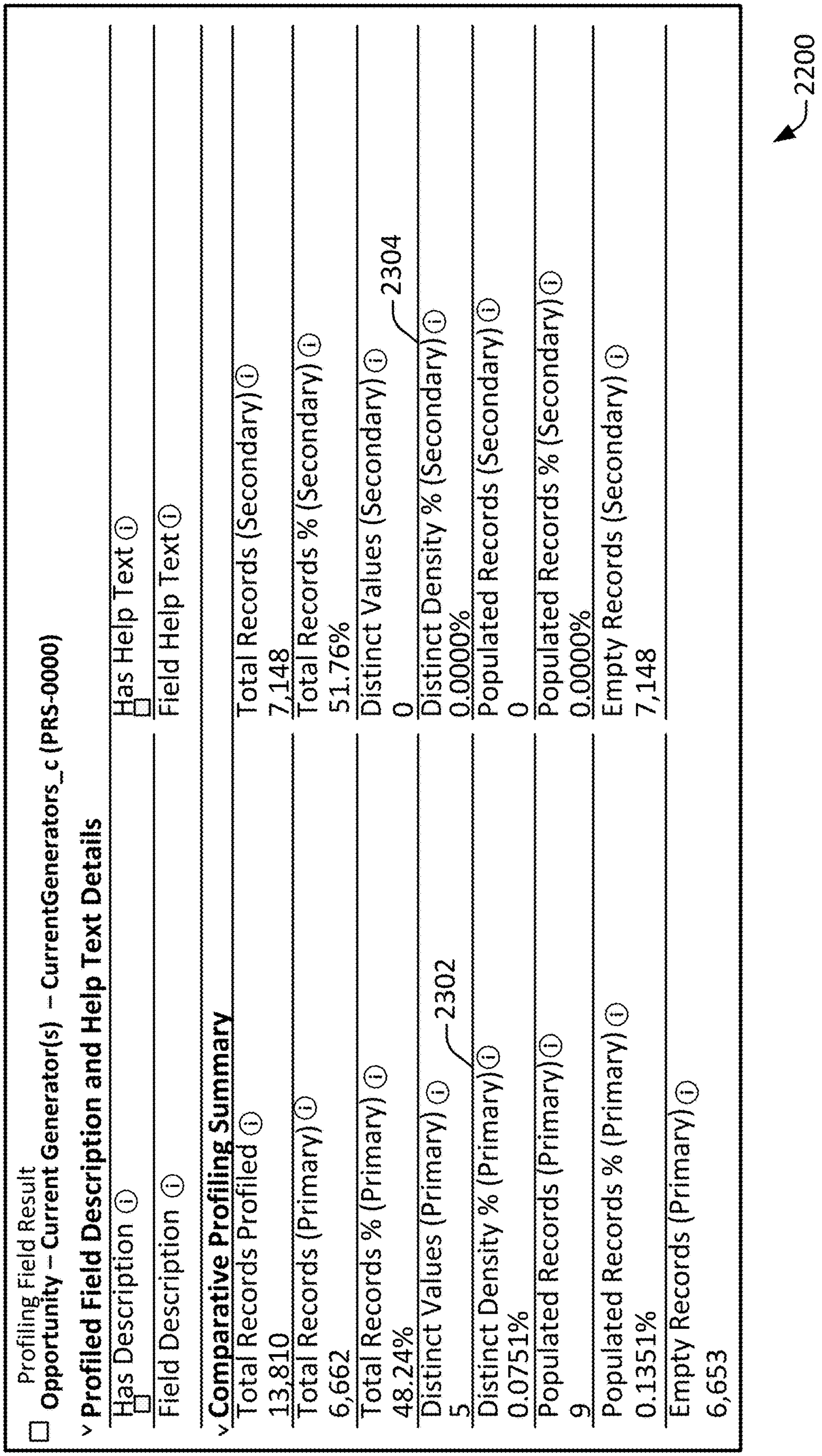

FIG. 23 includes a view of the profiling field result interface 2200 that includes comparative profiling information for a database field within the profiled Opportunity database object. For instance, the density of distinct values in the primary scenario is shown at 2302, while the density of distinct values in the secondary scenario is shown at 2304.

Figure 24:
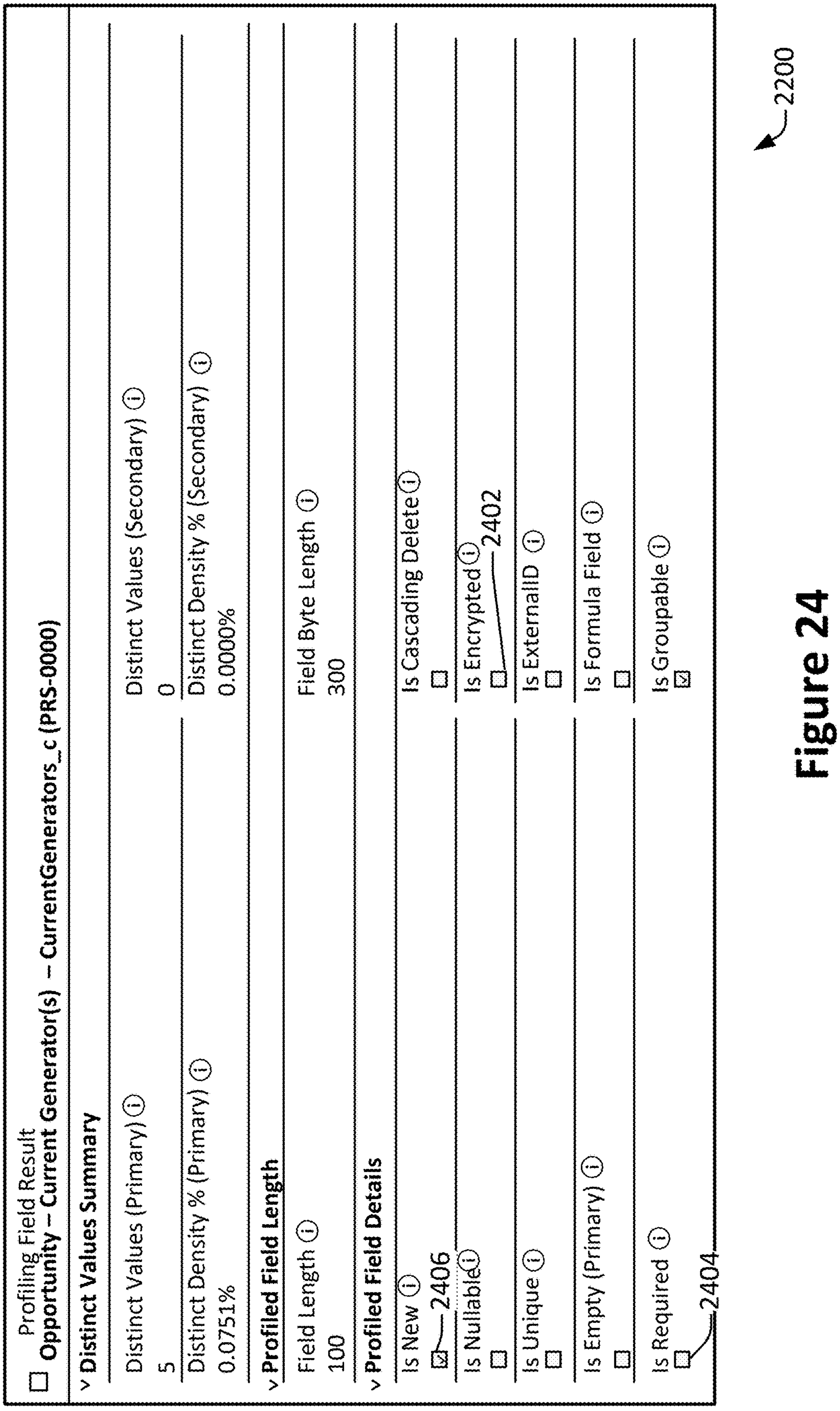
Figure 25:
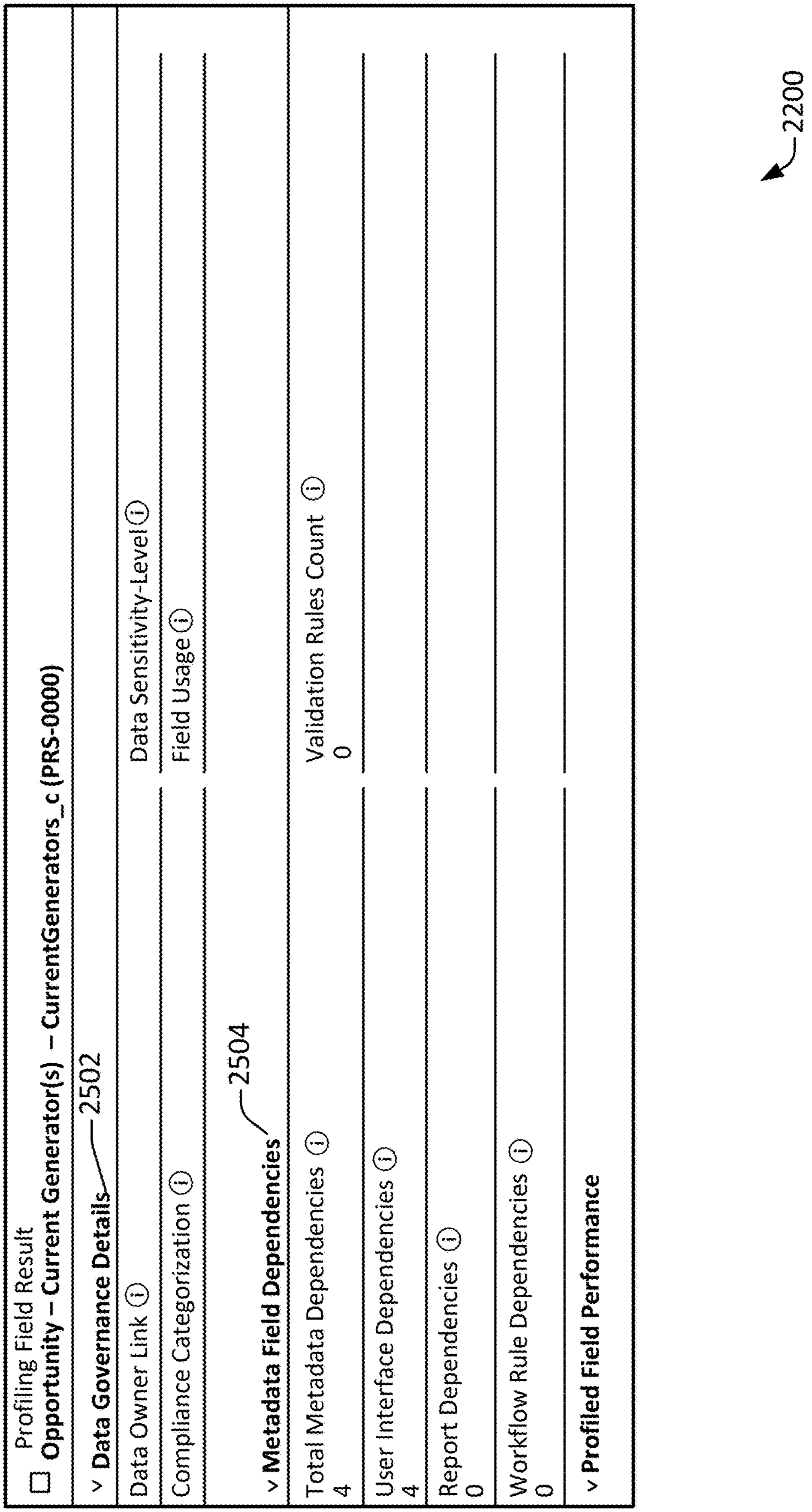

Metadata for the selected field is shown in FIG. 24, including characteristics such as whether the field is encrypted at 2402, whether the field is required at 2404, and whether the field is new at 2406. Additional metadata is shown in FIG. 25, such as data governance details 2502 and metadata field dependencies 2504.

Figure 26:
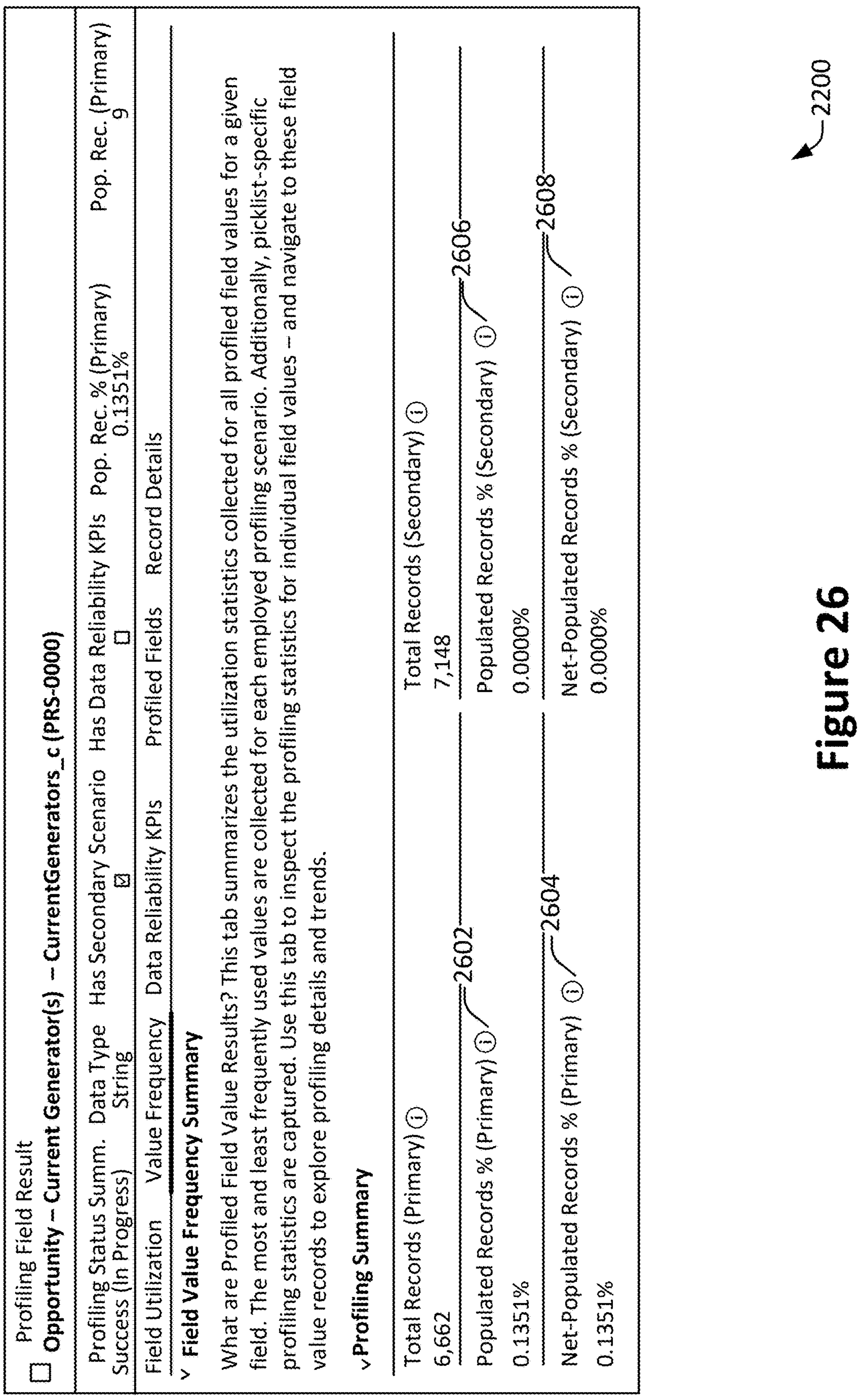

Field value frequency information is shown in FIG. 26. The field value frequency information summarizes the utilization statistics collected for all profiled field values for a given field. For instance, the most and least frequently used values may be collected for each employed profiling scenario. Additionally, picklist-specific profiling statistics can be captured. This view can be used to inspect the profiling statistics for individual field values—and navigate to these field value records to explore profiling details and trends. For example, percentages of populated records and net-populated records for the primary and secondary scenarios are shown at 2602, 2604, 2606, and 2608 respectively.

FIG. 27 illustrates a table showing value frequency analysis. Value frequency analysis displays the most and least frequently populated values for a given profiling scenario. The system captures the total Records Populated, Population Rate percentage, and Default value impact for each value. The system also captures picklist-specific properties, for instance identifying if a profiled value is an active picklist value or has been deleted.

Figure 28:
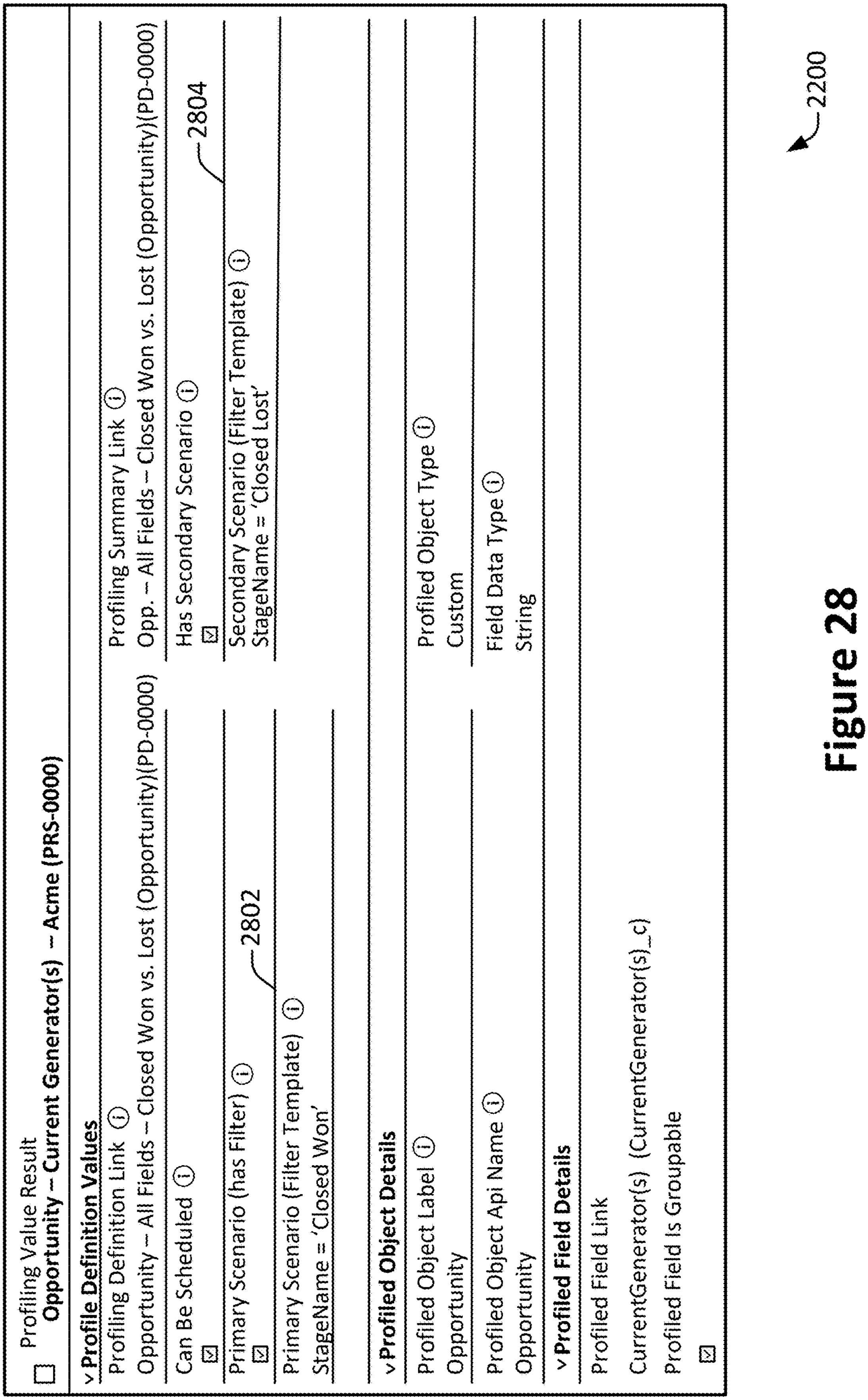
Figure 29:

FIG. 28 illustrates metadata information for the profiling value result. For instance, the metadata information includes outcome values for the primary and secondary scenario at 2802 and 2804. Additional metadata information is shown in FIG. 29, such as the percentages of populated records in the first 2902 and second 2904 scenarios.

Figure 30:
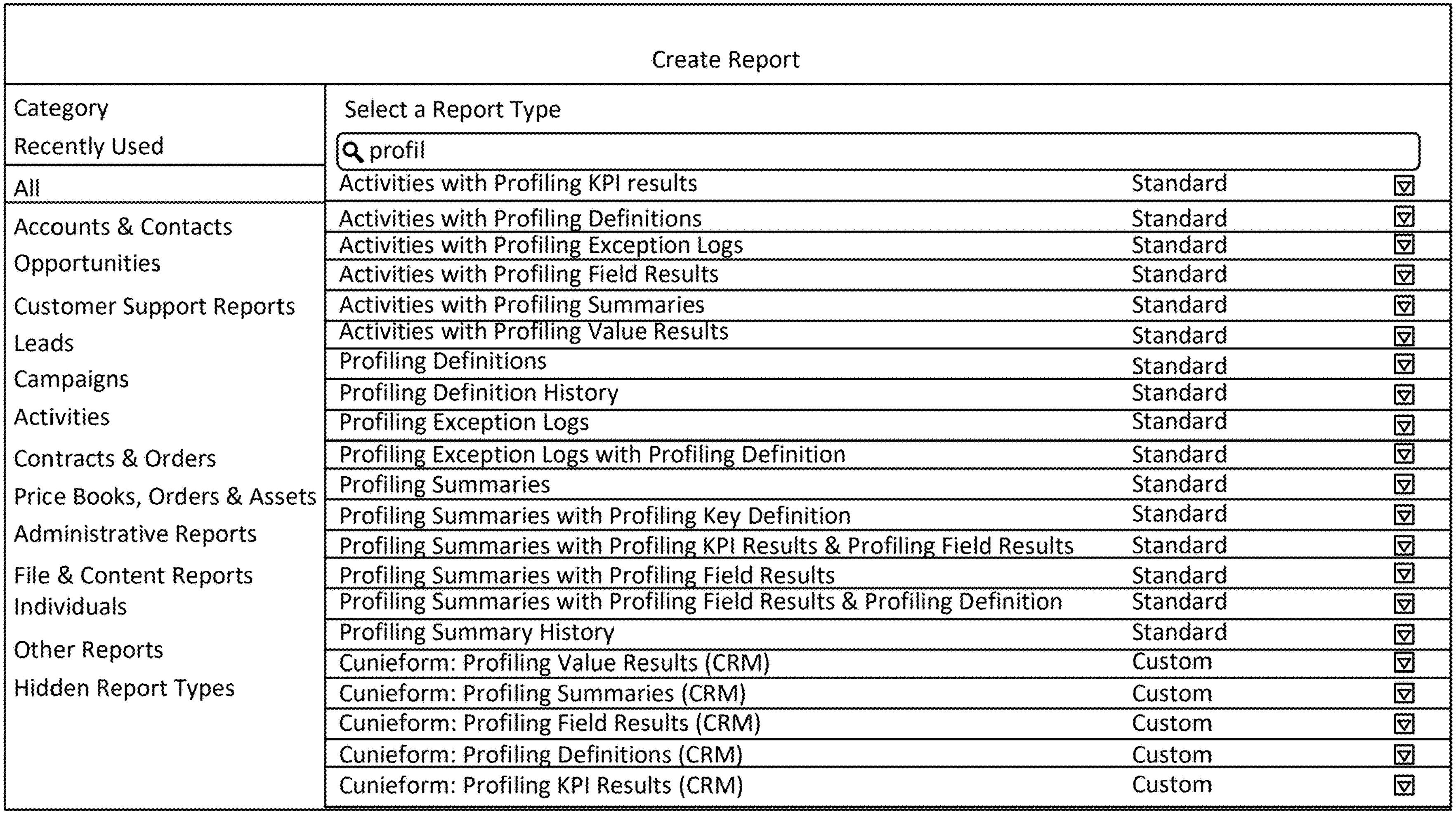
Figure 31:
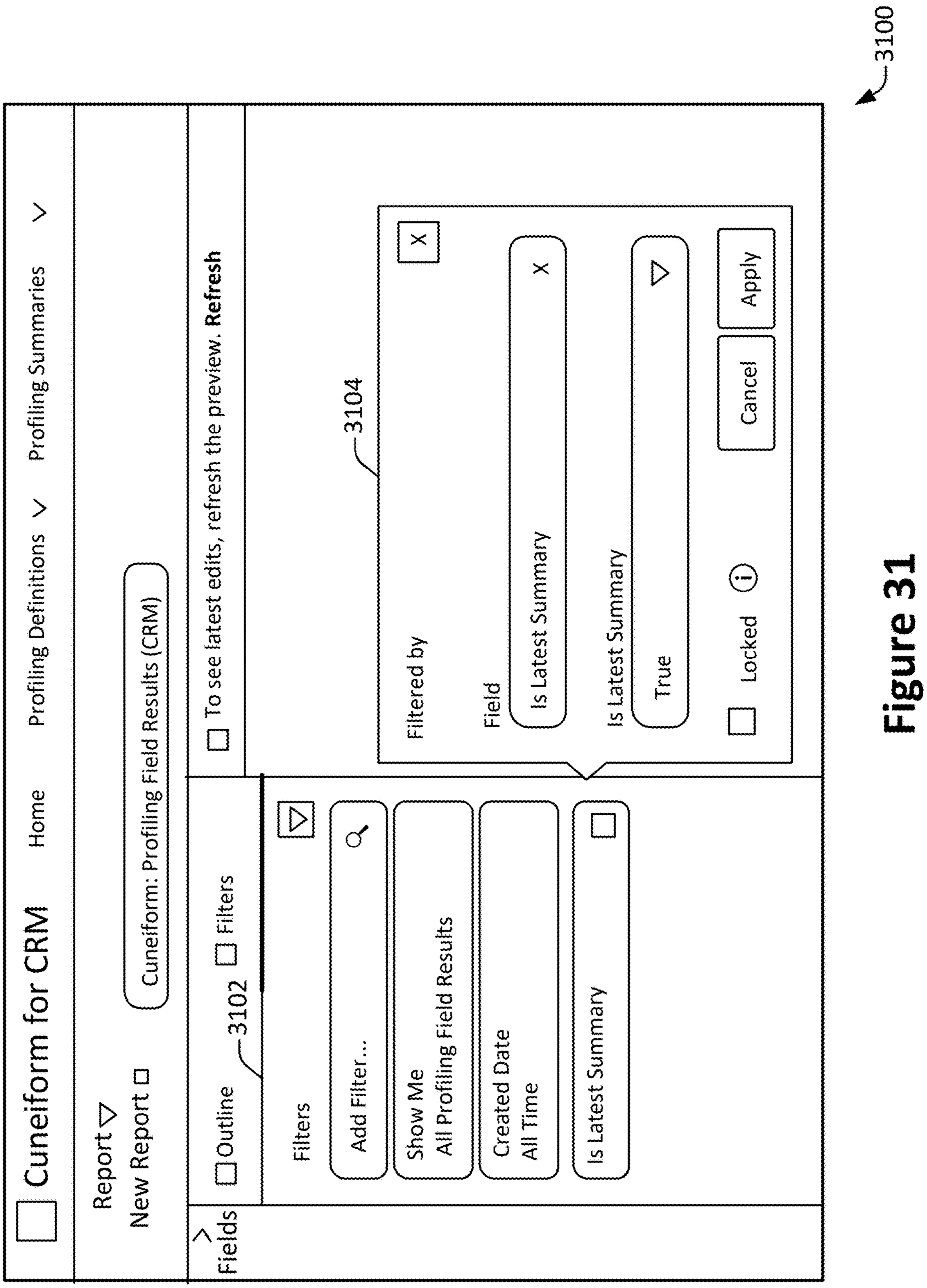

According to various embodiments, the profiling information can be used to create reports. For example, FIG. 30 shows a selection interface 3000 for selecting from among various types of reports from the profiling information. FIG. 31 illustrates a report creation interface 3100 for configuring report parameters. For example, one or more filters for determining the report can be selected at 3102. As another example, an example interface for configuring a filter is shown at 3104.

Figure 32:
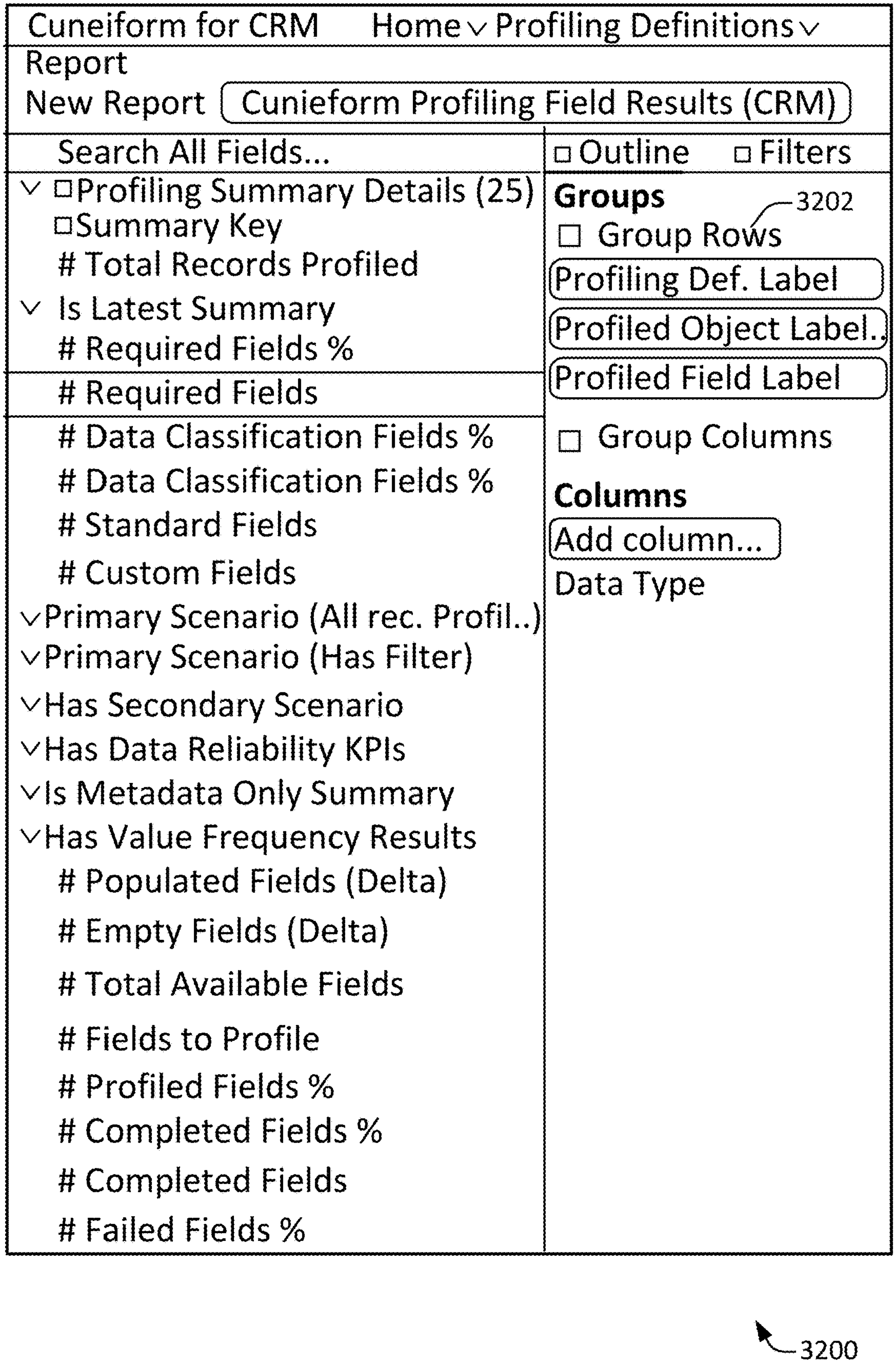
Figure 33:
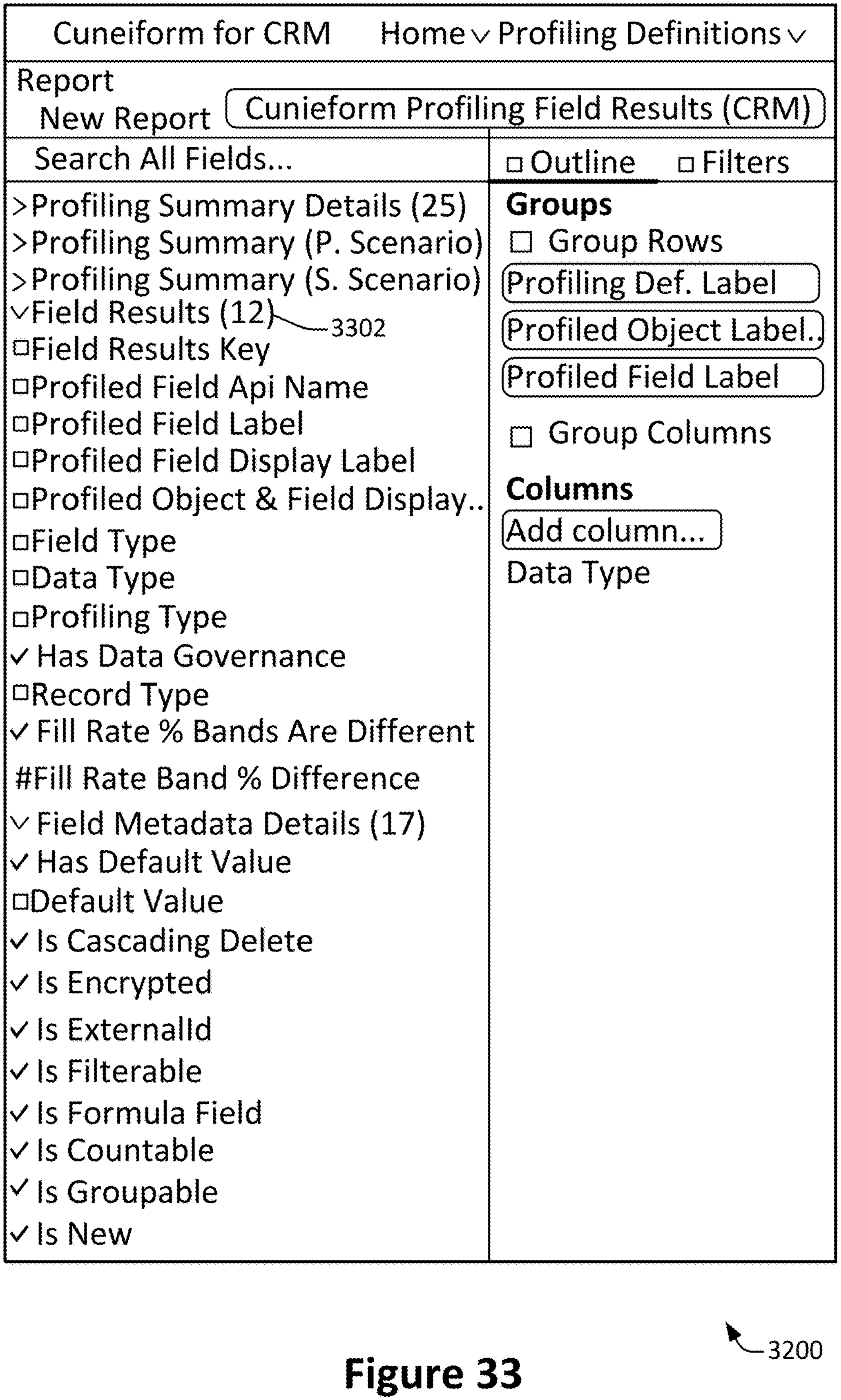
Figure 34:
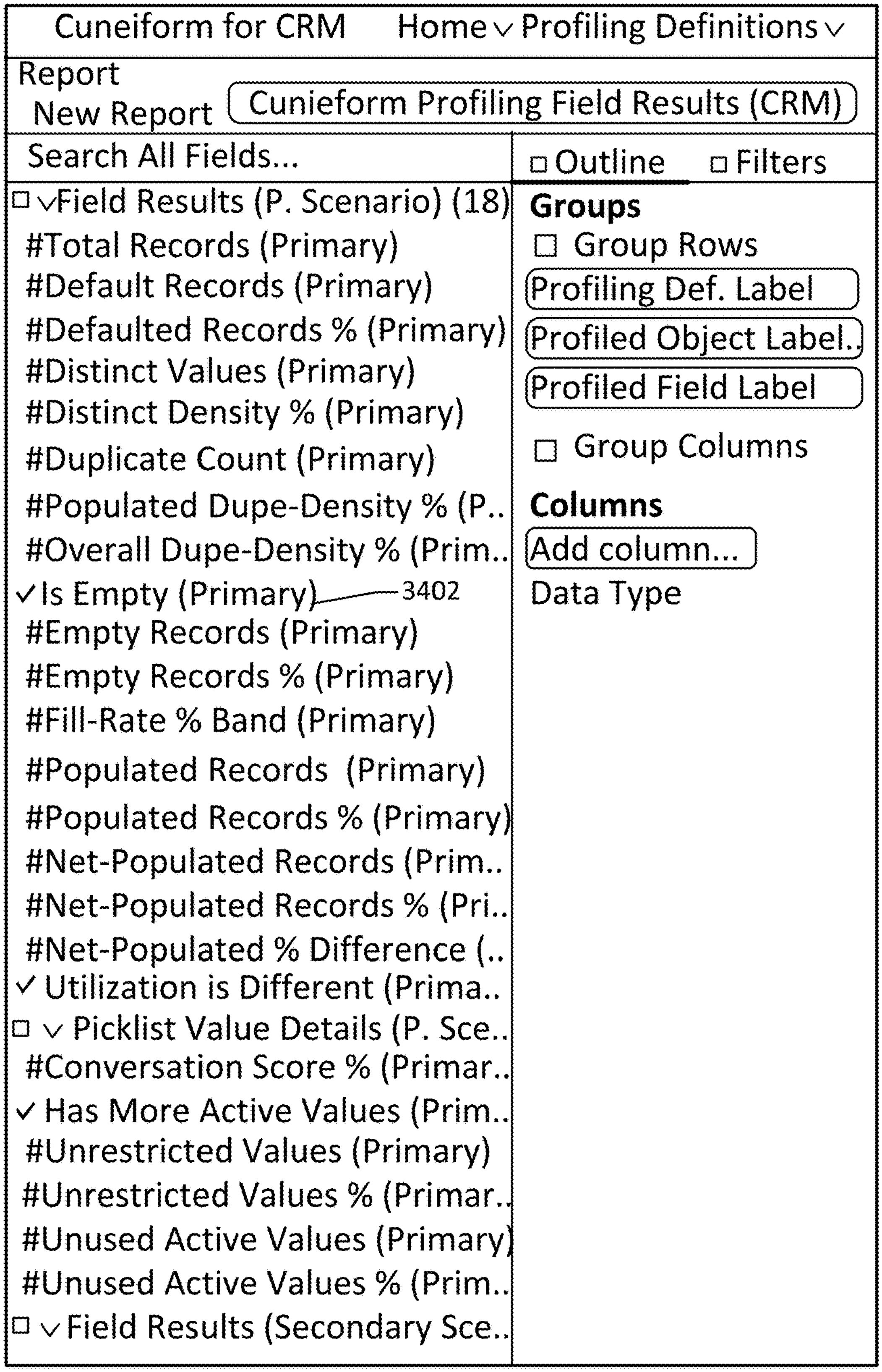

FIG. 32 illustrates a report navigation interface 3200. According to various embodiments, the report navigation interface 3200 facilitates various navigational and configuration operations for one or more reports. For instance, at 3202, elements of a report can be grouped by rows and/or columns. The report navigation interface 3200 provides a wide range of configurable characteristics. For example, in FIG. 33, the field results 3302 are selected, allowing for filtering by attributes such as field type and data type. As another example, in FIG. 34, the records can be filtered based on emptiness characteristics such as fill-rate percentage band, populated records percentage, and the like.

Key Performance Indicator Configuration and Profiling

FIGS. 38-46 illustrate user interfaces generated in accordance with one or more embodiments. In particular, FIGS. 38-46 illustrate user interfaces facilitating configuration and selection of KPI fields, which may serve as outcomes as discussed herein. Thus, the user interfaces illustrated in FIGS. 38-46 may be generated in accordance with the operation 810 shown in FIG. 8.

As discussed herein, information regarding quality and reliability of database fields and/or business outcomes may be tracked as one or more KPI values, which may be stored in other database fields within a database object and which may be defined as formulae or other composite values referencing one or more primary database fields. Profiling may facilitate the identification of relationships between KPI values and data characteristics such as reliability and completeness.

Figure 38:
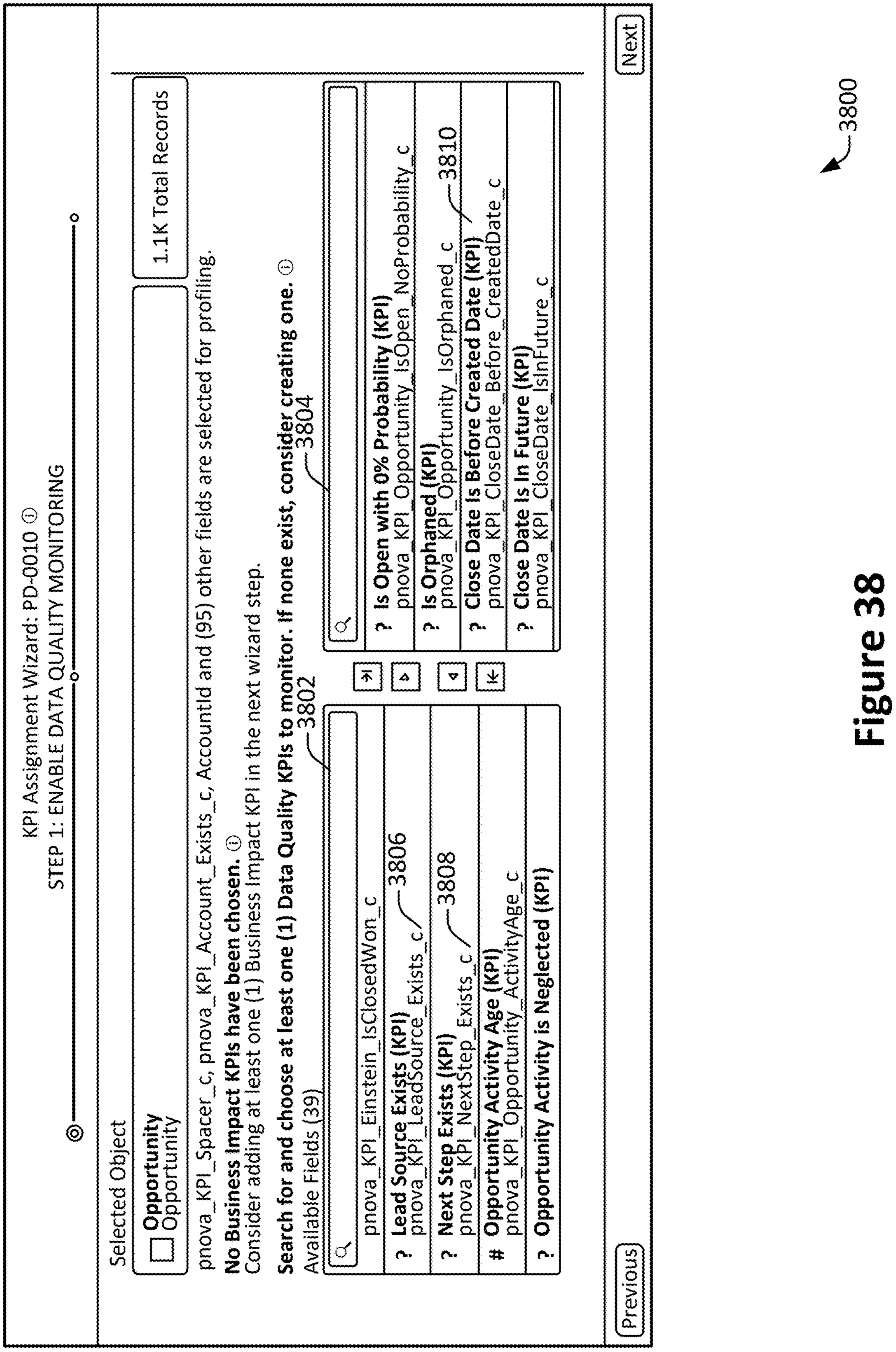
Figure 39:
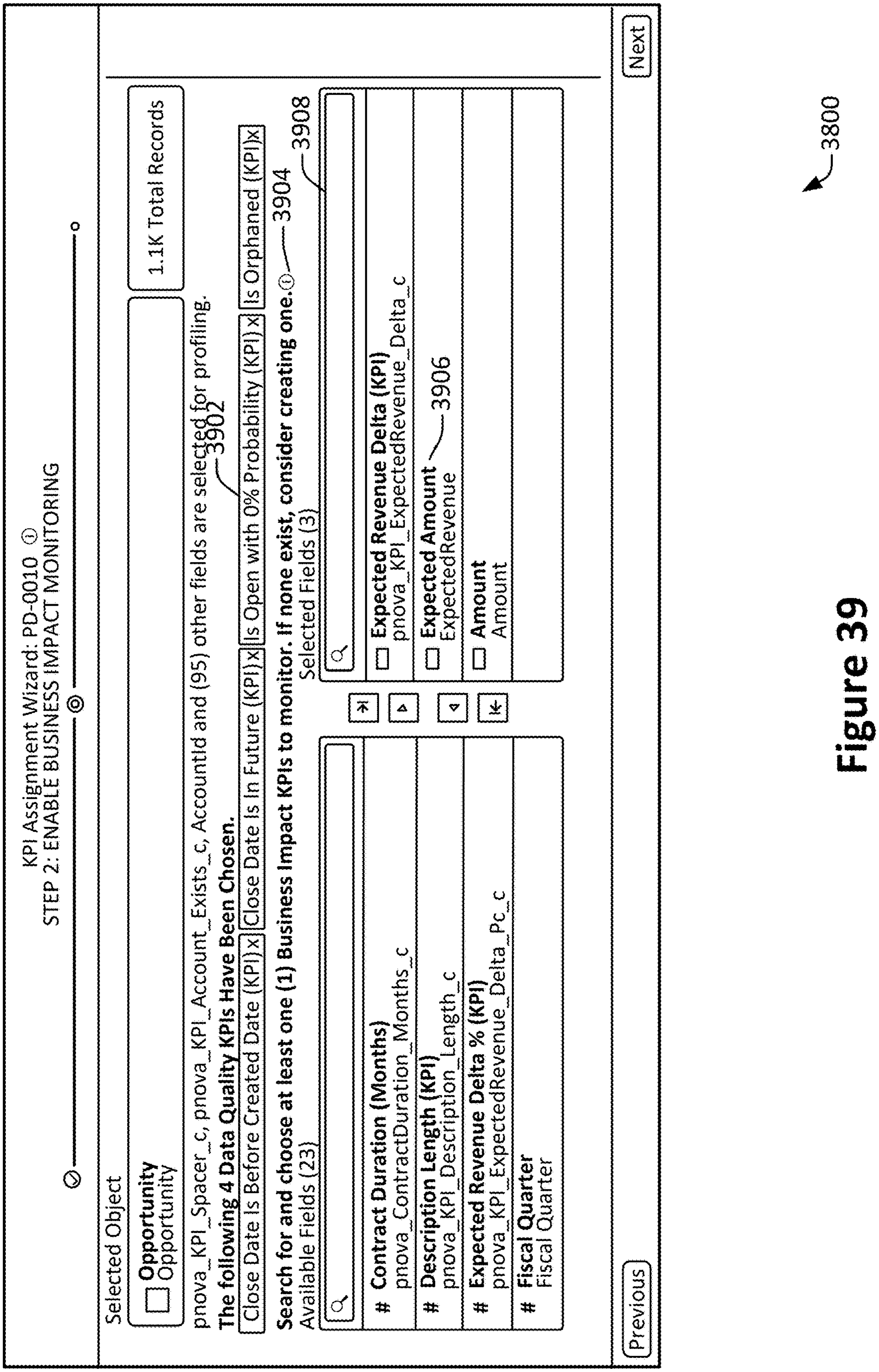

FIG. 38 illustrates a KPI assignment wizard user interface 3800. According to various embodiments, the report navigation interface 3800 may facilitate the selection and configuration of KPIs for profiling. At 3802, one or more KPIs may be selected for profiling.

As discussed herein, various types of KPIs may be defined and/or configured in accordance with one or more embodiments. At 3806, a Lead Source Exists KPI field indicates whether a Lead Source field within the Opportunity database object has been filled. At 3808, a Next Step Exists KPI field indicates whether a Next Step field within the Opportunity database object as been field. At 3810, a Close Date Is Before Created Date KPI indicates whether the Close Date field for the Opportunity predates the Created Date field.

FIG. 38 shows an additional view of the KPI assignment wizard user interface 3800. In FIG. 38, various data quality KPIs have been selected at 3902, while a recommendation has been made at 3904 that one or more business impact KPIs be selected. Examples of such business impact KPIs, such as Expected Amount 3906 indicating an expected revenue associated with the opportunity object, are shown at 3908.

Figure 40:
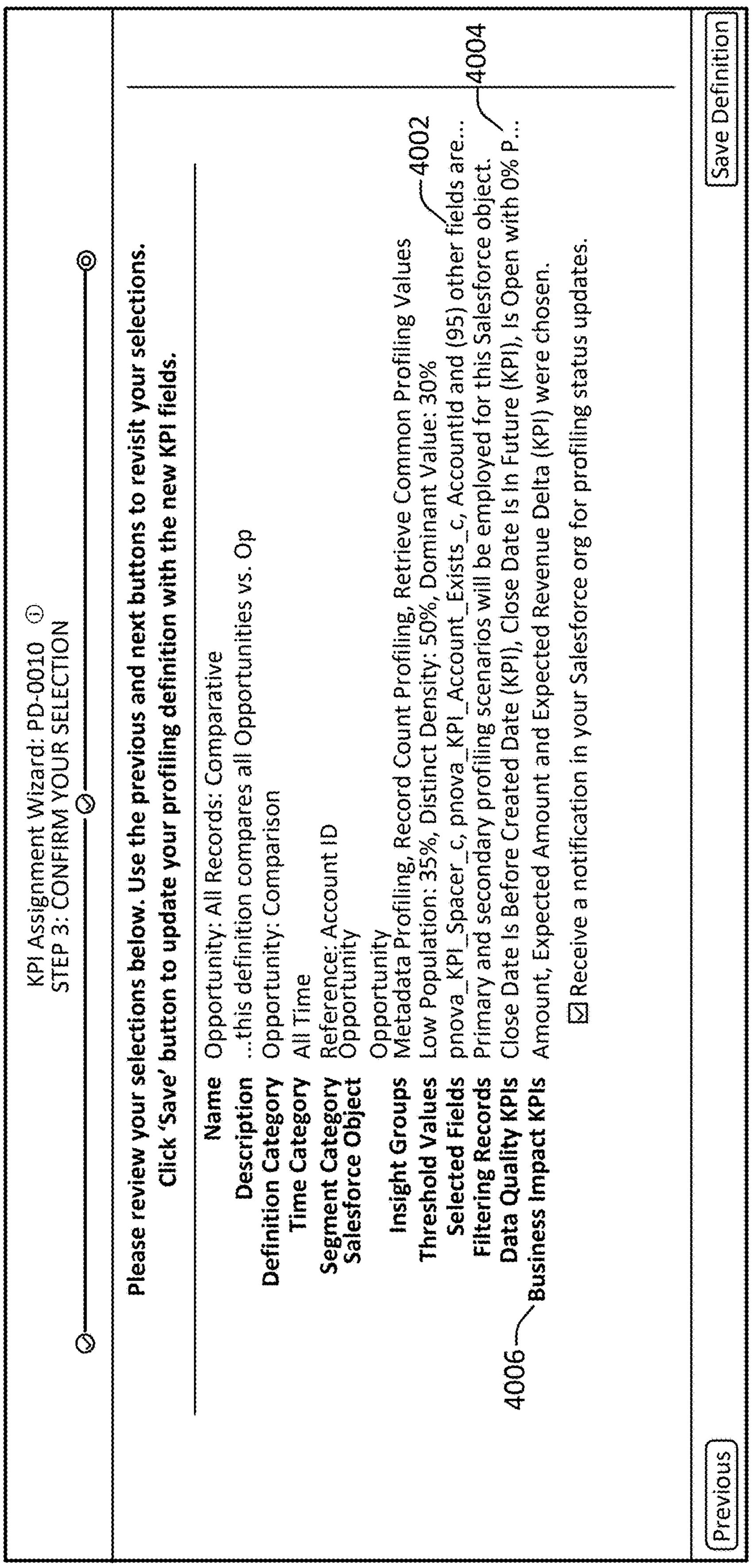

A summary of the configured KPI fields is shown in FIG. 40. The summary includes, for instance, the selected fields at 4002, the selected data quality KPIs at 4004, and the selected business impact KPIs at 4006.

Figure 41:
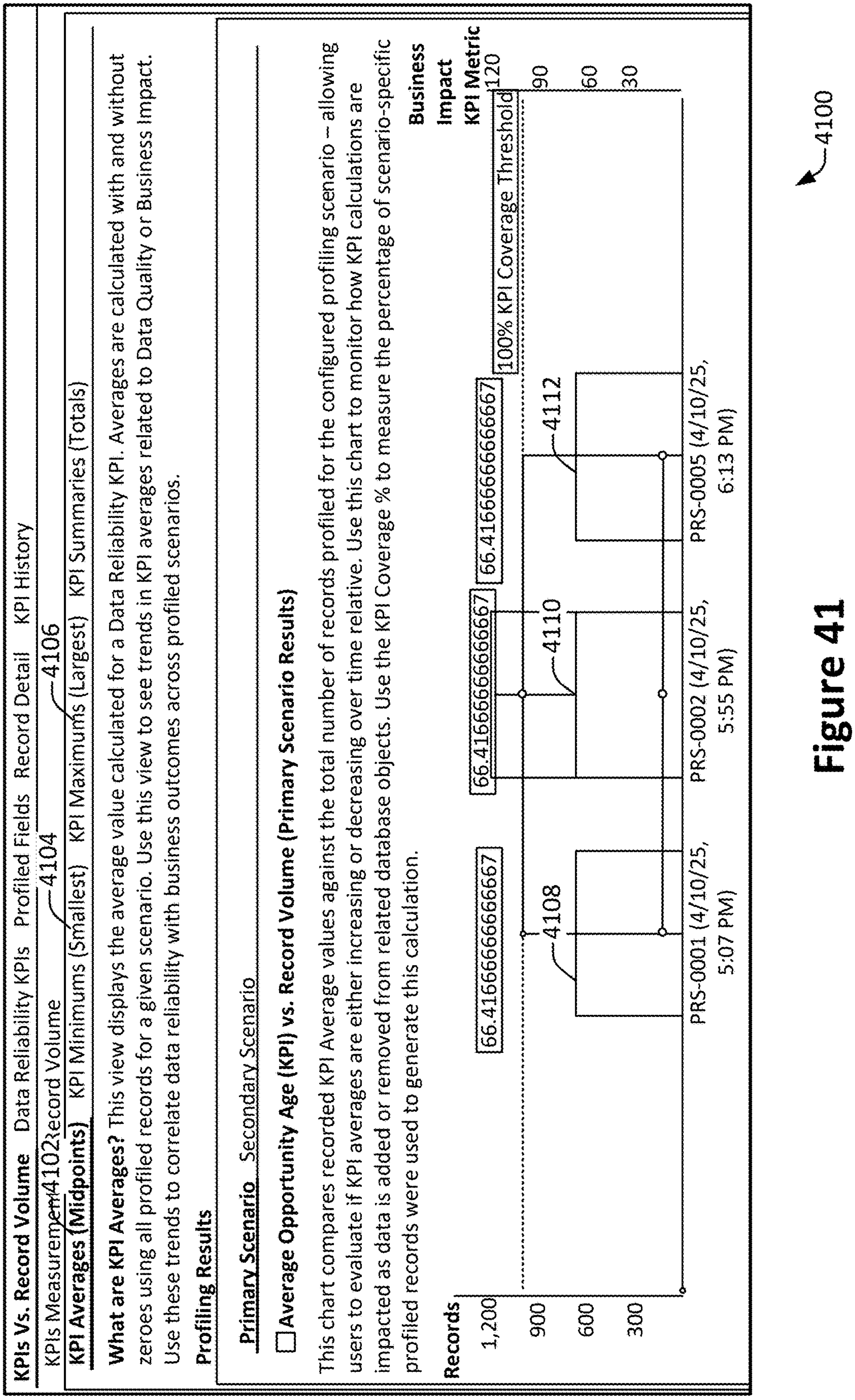

FIG. 41 illustrates a KPI profiling report user interface 4100, configured in accordance with one or more embodiments. This view displays the average value calculated for a data reliability KPI. In this example, averages are calculated with and without zeroes using all profiled records for a given scenario. This view can be used to view trends in KPI averages related to data quality or business impact. For example, the Average Opportunity Age KPI is plotted at first 4108, second 4110, and third 4112 points in time. The plotted values shown in FIG. 41 are the KPI averages 4102. However, alternatively, the KPI minimums 4104 or KPI maximums 4106 may be displayed instead.

FIG. 42 illustrates a different view of the KPI profiling report user interface 4100, in which a data quality and business impact summary section 4202 presents a summary of the profile results. A table of the KPI profiling results for the primary scenario is shown at 4204, with the secondary scenario being similarly selectable.

Figure 43:
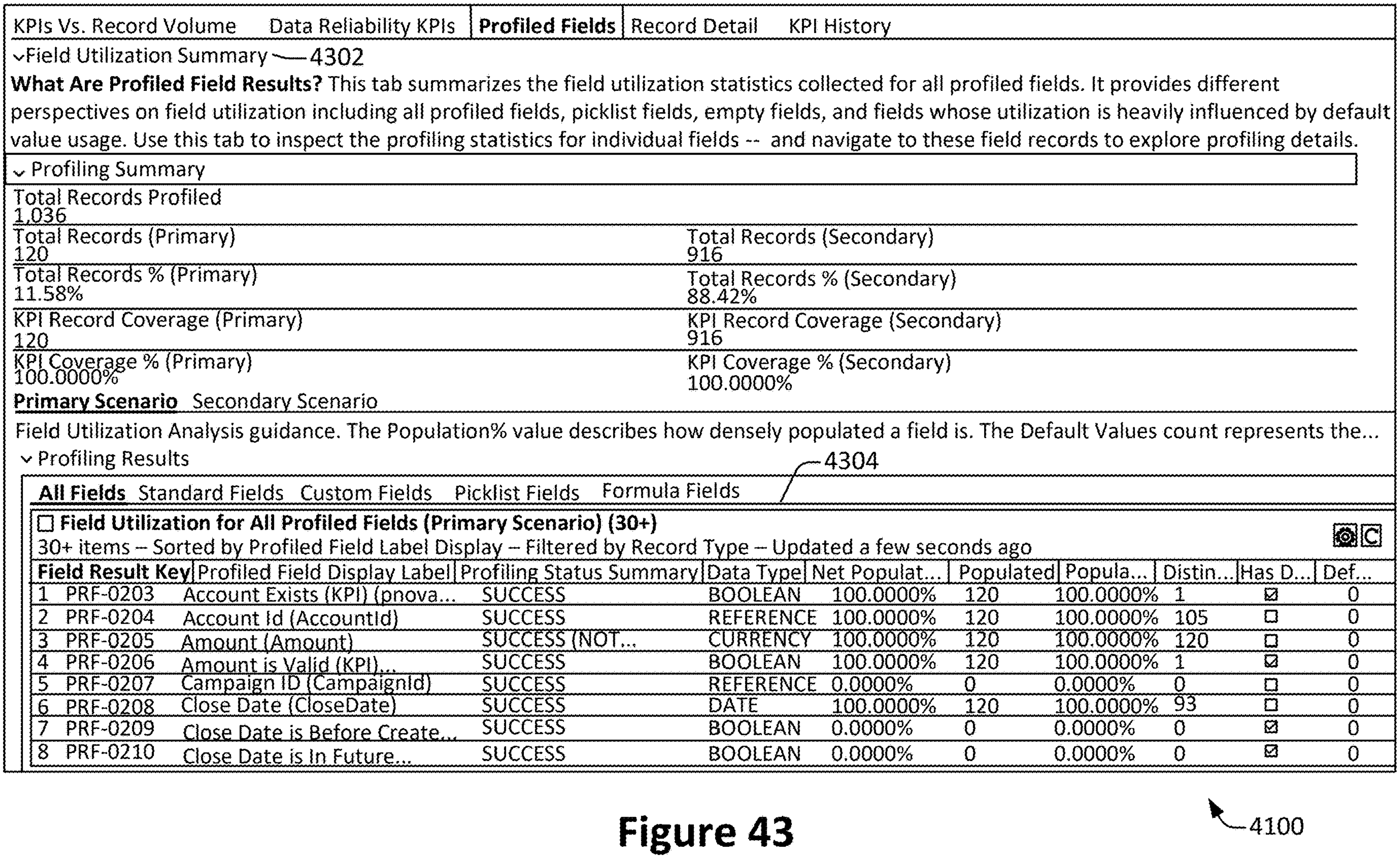

FIG. 43 illustrates yet another view of the KPI profiling report user interface 4100. In FIG. 43, a field utilization summary 4302 includes a table 4304 that includes field utilization for profiled fields.

Figure 44:
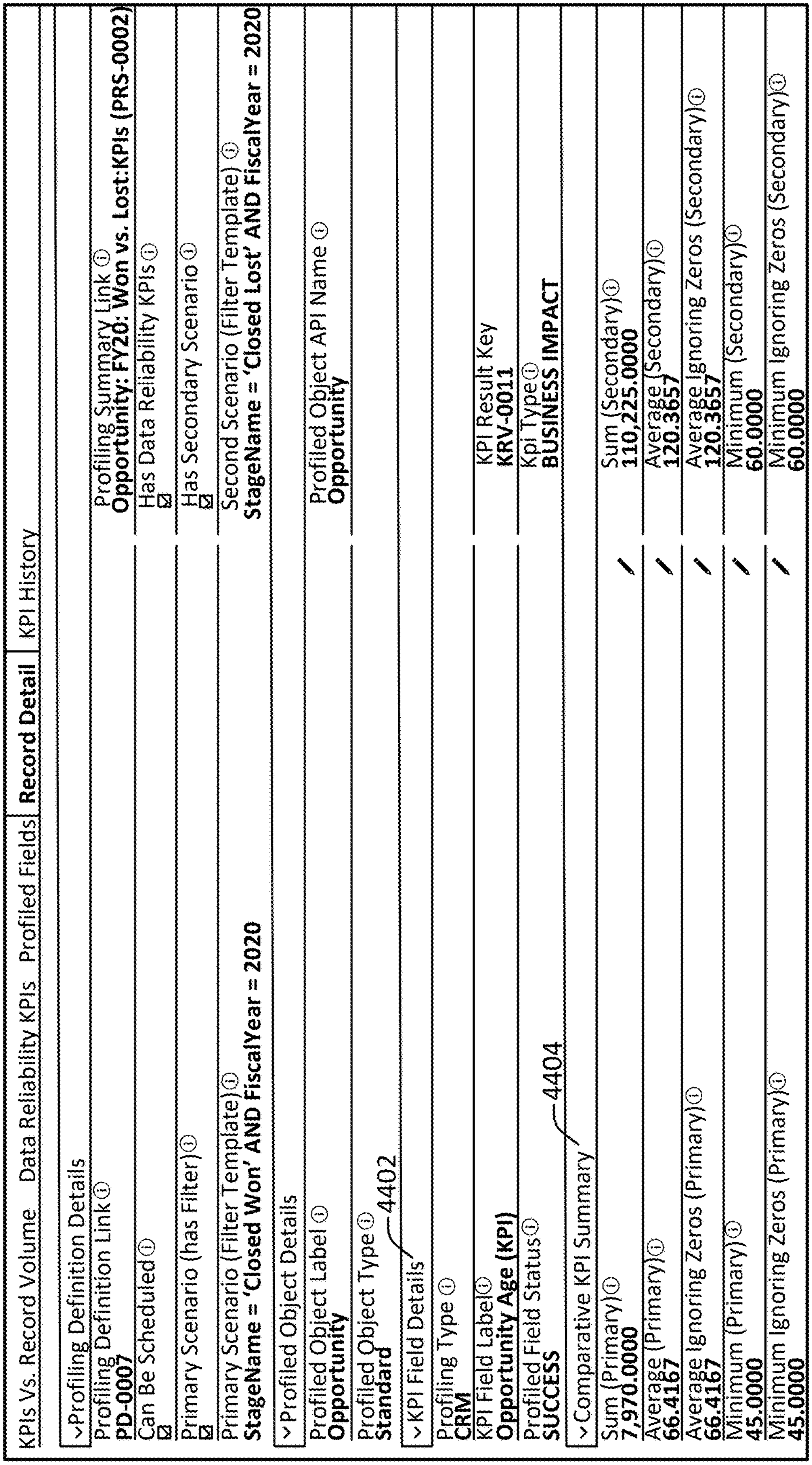
Figure 45:
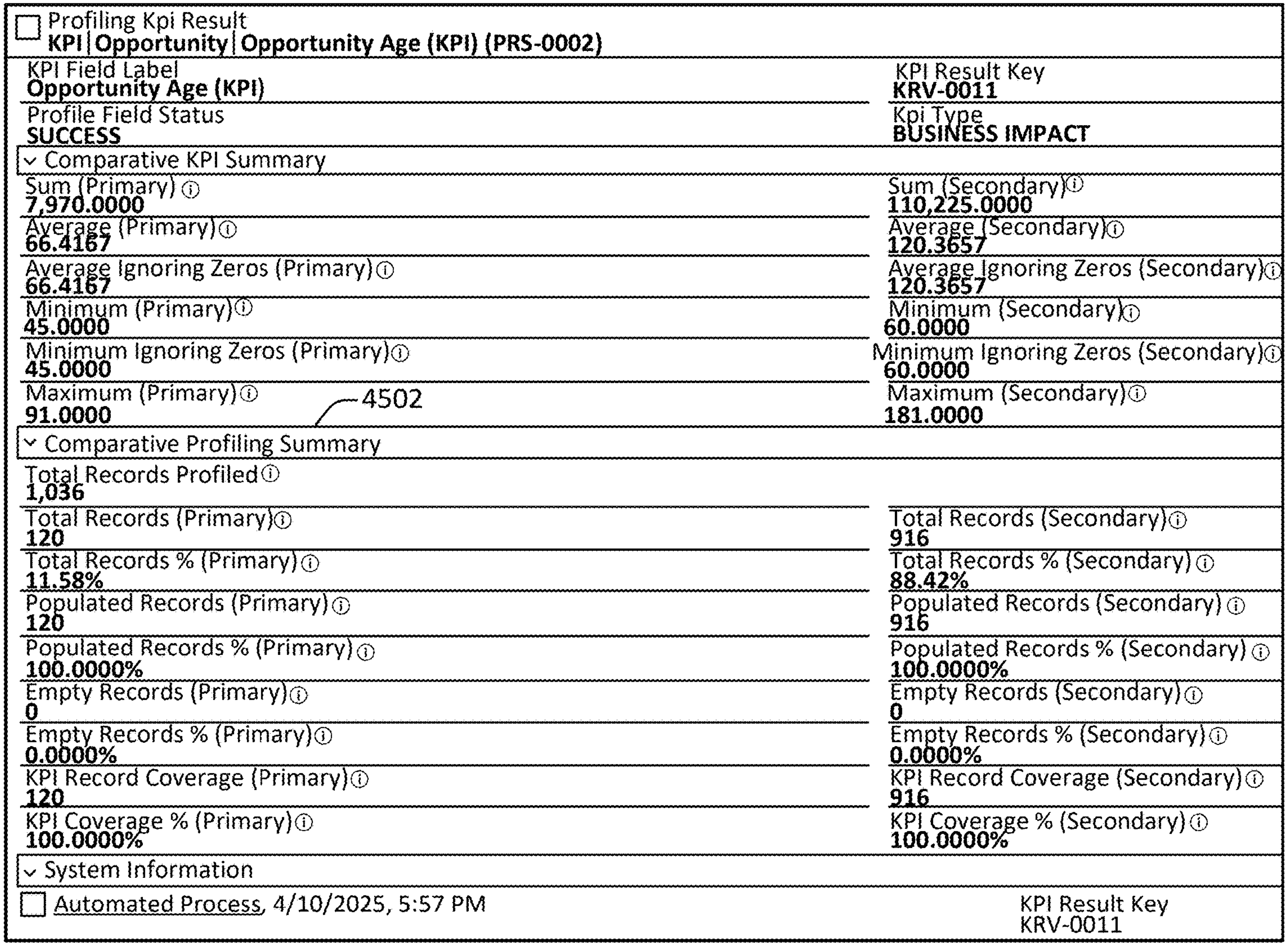

FIG. 44 illustrates still another view of the KPI profiling report user interface 4100. In FIG. 44, a record detail view 4402 includes information illustrating the KPI field details. The comparative KPI summary view 4404 includes a comparison of various statistics for the selected KPI in both the primary and secondary scenarios. Additional details within the KPI summary view 4404, including a comparative profiling summary 4502, are shown in FIG. 45.

Figure 46:
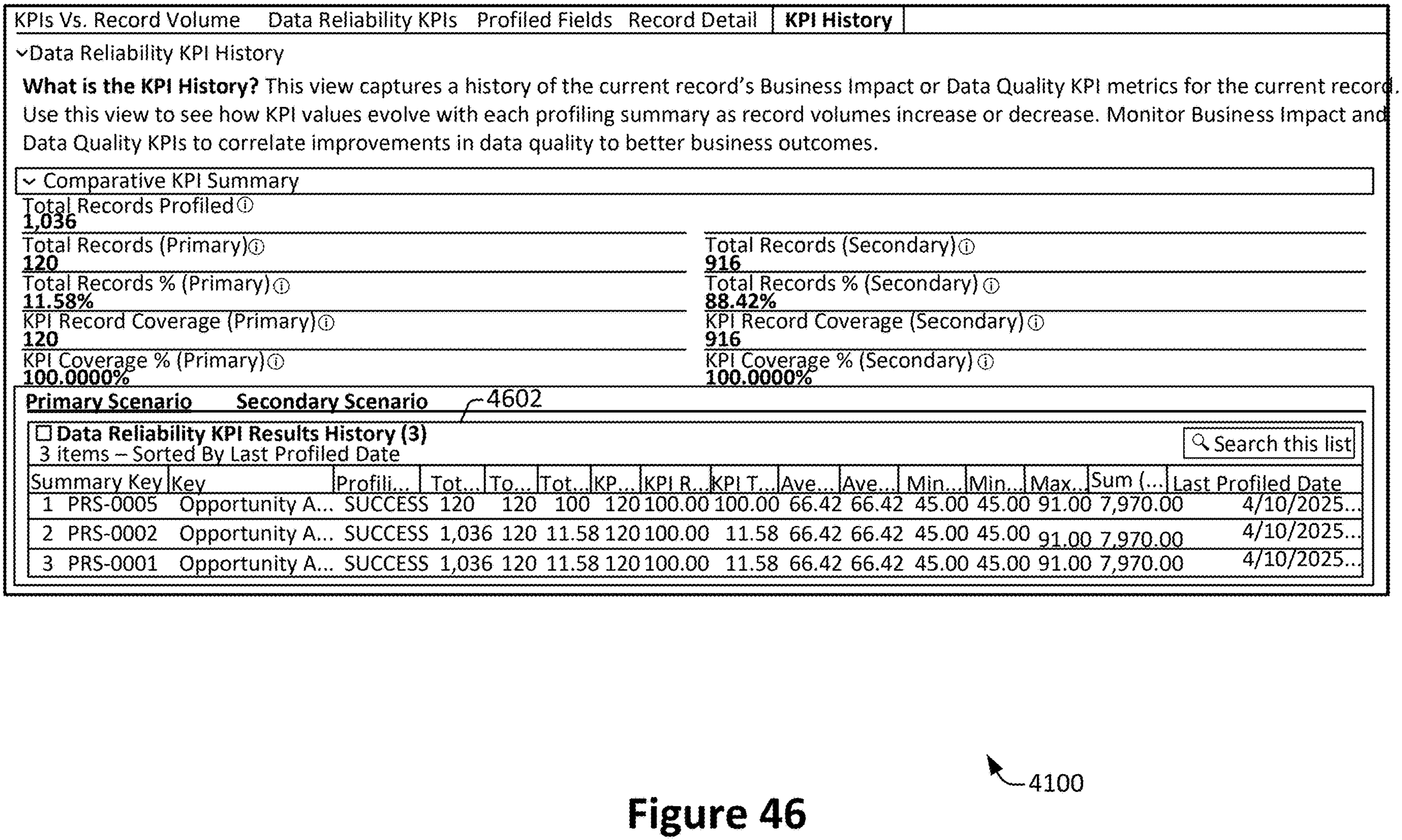

Still another view of the KPI profiling report user interface 4100 is shown in FIG. 46. In FIG. 46, a table 4602 shows various values for the selected KPI as determined at various points in time.

Data Integration Evaluation and Profiling

Figure 35:
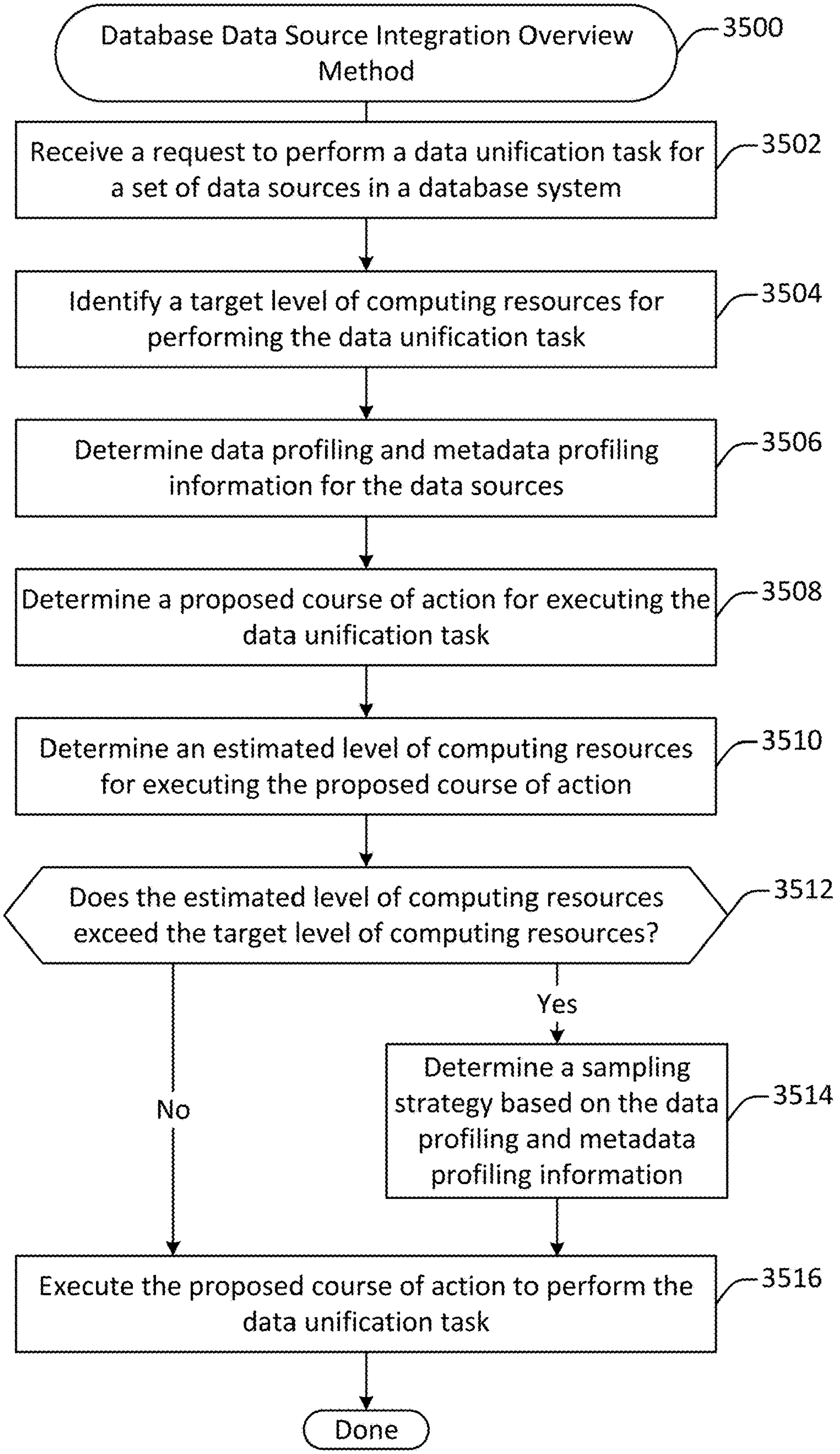
FIG. 35 illustrates an overview method for integrating one or more data sources in a database system.

FIG. 35 illustrates an overview method 3500 for integrating one or more data sources in a database system. A request to perform a data unification task for a set of data sources in a database system is received at 3502. In some embodiments, the request may be received at the database system from a client machine via a network.

In some embodiments, a data source may include data that resides in the database system. Alternatively, a data source may include data that is accessible via the database system but resides elsewhere, such as at the client machine that generated the request.

According to various embodiments, any of various types of data unification tasks may be requested. Examples of such tasks may include, but are not limiting to: (1) querying the data sources, (2) transforming the data sources (e.g., to a single data source), and (3) performing entity resolution across the data sources.

A target level of computing resources for performing the data unification task is identified at 3504. In some embodiments, the target level of computing resources may be specified based on availability, user input, one or more configuration parameters, or a combination thereof. The target level of computing resources may be specified in a manner that is specific to the computing environment. For instance, the target level of computing resources may be specified in terms of a number of credits within a cloud computing system, an amount of currency corresponding to an allocation of computing resources, a number of operations, an amount of storage space, a number of calculations, or any other suitable metrics.

Data profiling and metadata profiling information for the data sources is determined at 3506. A proposed course of action for executing the data unification task is determined at 3508. An estimated level of computing resources for executing the proposed course of action is determined at 3510.

A determination is made at 3512 as to whether the estimated level of computing resources exceeds the target level of computing resources. In some embodiments, the determination may involve identifying the fields that may need to be normalized into their own entities. The number of records that would be transformed and then used in identity resolution may then be calculated. Such a value may be determined by summing the object record count and the count of field-level populated records for the fields that need to be normalized. The system may then determine an amount of resources needed based on the identified data transformations. Such a determination may be platform-specific, since different on-demand platforms may have different approaches for determining resource usage.

Upon determining that the estimated level of computing resources exceeds the target level of computing resources, a sampling strategy is determined at 3514 based on the data profiling and metadata profiling information. In some embodiments, the system may use information such as field distinct rates and data types to identify fields that are fit for sampling. For instance, a field that may be fit for sampling may be one with a distinct value rate of less than 100% but more than 40%, and where the field type is not a currency, date, or number. The system may then identify one or more permutations to determine what may create an acceptable deliberate sample set that would not exceed credit consumption levels.

As one example, consider a situation in which the operations have been allocated credits for 1,000 operations, but 3,000 operations would be needed to perform the data unification task with all of the data from the data sources. In this example, suppose that Country and State/Province fields have high distinct density, and that the value frequency within these fields is known from the data profiling operations. To identify a data set below 1000 records, the system may identify one or more field values within Country or State/Province that would yield a number of observations below but close to 1,000. The system may then use information such as source object field distinct density percentage and field value frequencies for these fields to recommend a series of fields and then field values to provide lower credit consumption record subset formulas. In this example, suppose that selecting on observations where country is United States would consume 1,600 credits, while United Kingdom would only use 400 credits and Germany 350. Within United States, California would account for 500 credits and Texas 400 credits. In this example, the system may propose, for instance (Texas+California) or (Germany+United Kingdom) as potential selection criteria for deliberate sampling.

The proposed course of action to perform the data unification task, and optionally the sampling strategy, is executed at 3516. Executing the proposed course of action may involve performing one or more operations for unifying, transforming, and/or querying the data sources.

Figure 36:
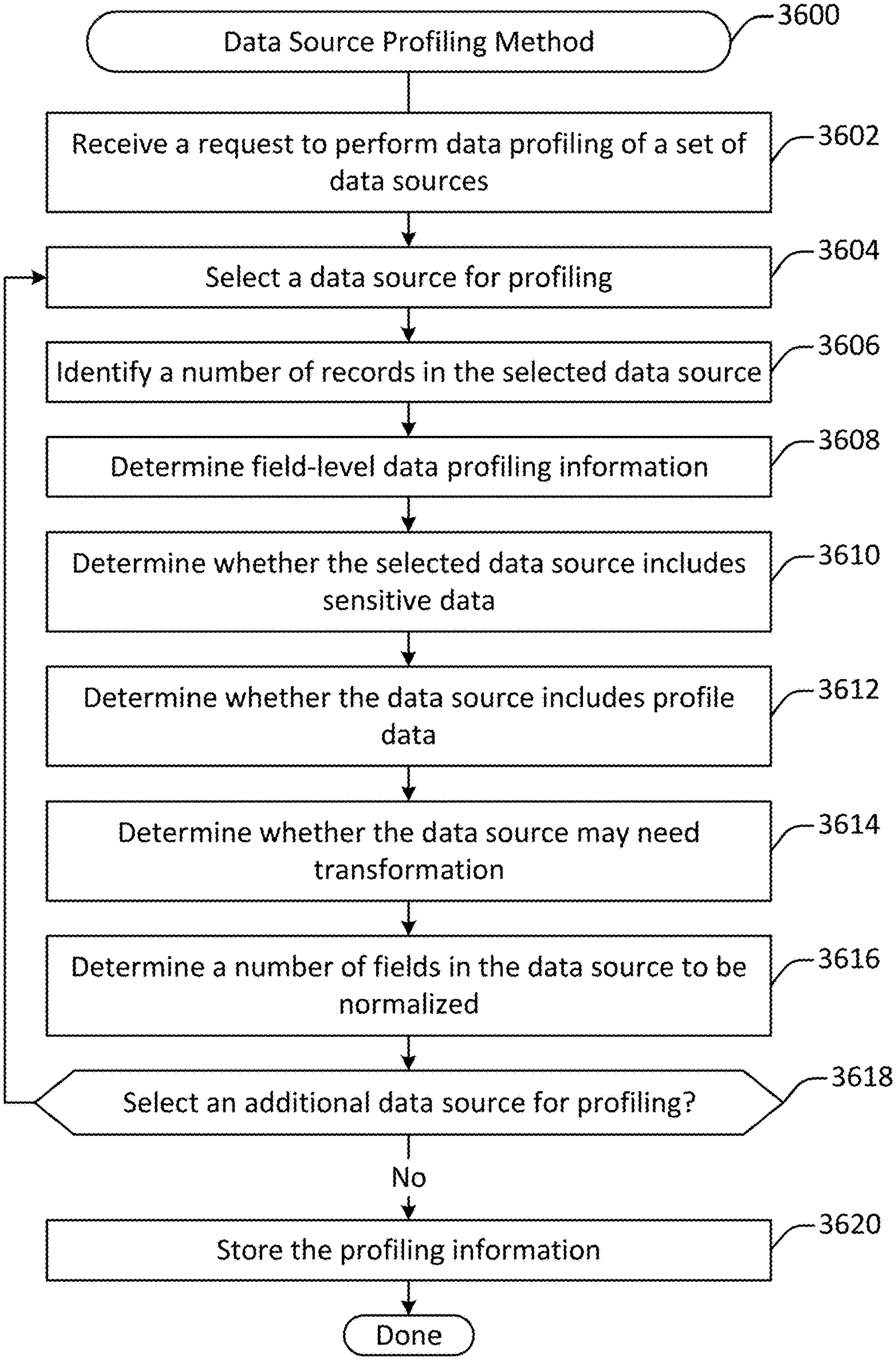
FIG. 36 illustrates a method for data profiling, performed in accordance with one or more embodiments.

FIG. 36 illustrates a method 3600 for data profiling, performed in accordance with one or more embodiments. The method 3600 may be performed instead of, or in concert with, other data profiling operations described herein, such as those shown in the method 1400 in FIG. 14.

A request to perform data profiling of a set of data sources is received at 3602. The request may be generated as discussed with respect to the operation 1006 shown in FIG. 10.

A data source is selected for profiling at 3604. In some embodiments, the data sources to analyze may be identified in the request received at operation 3602.

A number of records in the data source is determined at 3606. In some embodiments, the number of records may aid in determining whether sampling is indicated.

If sampling is performed, then a secondary field may be needed to capture the full data volume.

Field-level data profiling information is determined at 3608. Additional details regarding the determination of field-level data profiling information are discussed with respect to the method 3700 shown in FIG. 37.

A determination is made at 3610 as to whether the selected data source includes sensitive data. In some embodiments, sensitive data such as personally identifying information may need to be filtered in place rather than copied, for instance for compliance reasons. The classification of a data source as including sensitive data may be determined at least in part based on the field-level data profiling information.

A determination is made at 3612 as to whether the data source includes profile data. In some embodiments, the determination may be made at least in part based on the field-level data profiling information. For instance, a data source may be determined to include profile data if it includes one or more fields storing personally identifying information such as email, URL, mailing address, phone number, or the like. Such information may be determined based on data type, field shape, user input, or other such indicators. Profile data may need to be normalized to maintain data integrity.

A determination is made at 3614 as to whether the data source may need transformation. Such information may be determined based on the field-level data profiling information determined at 3608. For example, profile data, engagement data, and/or other types of data may need to be transformed to ensure data consistency or cleanliness.

A number of fields to be normalized in the data source is determined at 3616. In some embodiments, data normalization may be needed if multiple fields have metadata profiles associated with match rules. For instance, match rules may be associated with fields having a data type of email, phone, or URL. However, data normalization may not be needed even for such fields, for instance if the fields are not used as indicated by field fill frate calculations.

A determination is made at 3618 as to whether to select an additional data source for profiling. According to various embodiments, additional data sources may continue to be selected and analyzed, in parallel or in any suitable sequence, until all data sources identified in the request have been selected and analyzed.

Upon determining not to select an additional data source for profiling, the profiling information is stored at 3620. In some embodiments, any or all of the information determined as discussed with respect to the method 3600 may be stored in the database system.

Figure 37:
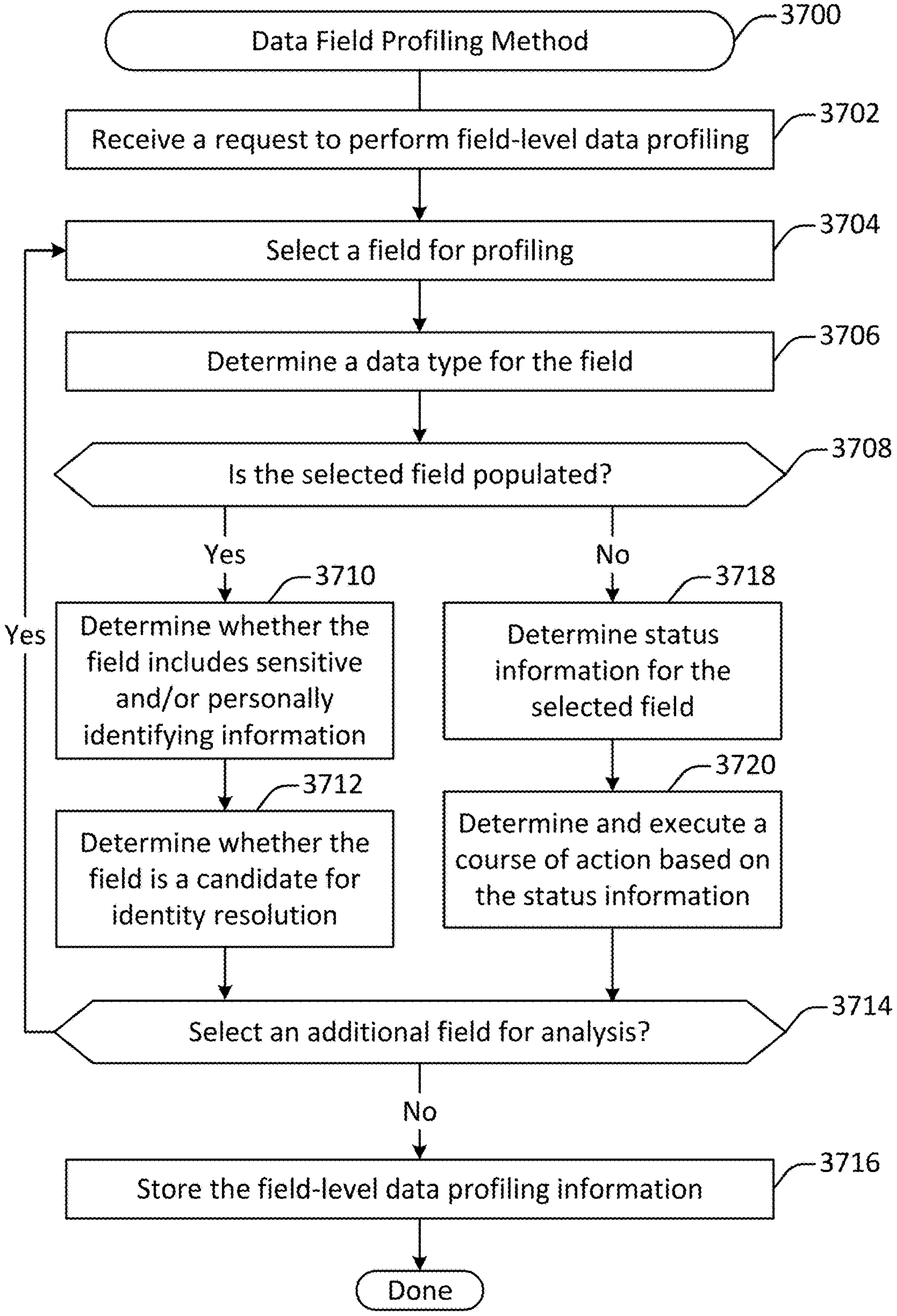
FIG. 37 illustrates a method for determining field-level data profiling information, performed in accordance with one or more embodiments.

FIG. 37 illustrates a method 3700 for determining field-level data profiling information, performed in accordance with one or more embodiments. The operations shown in FIG. 37 may be performed in conjunction with one or more other data profiling operations described herein, such as those shown in FIG. 14.

A request to perform field-level data profiling is received at 3702. In some embodiments, the request may be generated as discussed with respect to the operation 3608 shown in FIG. 36.

A data field is selected for profiling at 3704. A field type for the selected data field is determined at 3706. In some embodiments, the field type may be determined based on metadata, user input, data shape, and/or any other suitable indicators. Examples of data field types include, but are not limited to: phone number, email address, mailing address, URL.

A determination is made at 3708 as to whether the field is populated. In some embodiments, the determination may involve identifying whether any of the data objects in the data source have a non-default value stored for the field. Fields that are not populated may be safely ignored for the purpose of modeling and executing the data unification task.

Returning to FIG. 37, upon determining that the field is populated, a determination is made at 3710 as to whether the field includes sensitive and/or personally identifying information. Such information may be determined based on metadata, user input, data shape, and/or any other suitable indicators.

A determination is made at 3712 as to whether the selected field is a candidate for identity resolution. In some embodiments, the determination may be made based on a distinct rate associated with the field. For instance, a field storing a LinkedIn URL may be classified as not storing personally identifying information but as having a high distinct rate, implying that it can be used to identify records when it is uniquely populated.

In some embodiments, the information determined in the methods 3700 and 3600 may be used to determine whether normalization is needed for a field. For example, a data source may include three different fields (e.g., Phone, Home Phone, and Mobile) identified by the profiling operation as storing phone numbers for a contact record. If two or more of these fields are populated, then normalization may be needed. As another example, the same data source may include two different fields (e.g., Email and Personal Email) identified by the profiling operation as storing email addresses for the contract record. However, if Email is populated but Personal Email is not, then normalization for these fields is not needed.

Returning to operation 3708, upon determining instead that the selected field is not populated, status information for the selected field is determined at 3718. According to various embodiments, any of various types of status information may be identified. Examples of such status information may include, but is not limited to when the field was created and whether the field is referenced elsewhere in the database system.

At 3720, a course of action is determined and executed based on the status information. For example, if the field is old (i.e., created before a designated point of time in the past) and the field is not referenced elsewhere, then the system may generate and present a recommendation to ignore the field. As another example, if the field is new and not referenced elsewhere, then the system may generate and present a recommendation to reference the field in the user interface. As yet another example, if the field is referenced elsewhere, then the system may generate and present a recommendation to adopt the field for population and/or data profiling.

A determination is made at 3714 as to whether to select an additional field for analysis. In some embodiments, additional fields may be analyzed, in parallel or in any suitable sequence, until all fields in the object have been analyzed.

Upon determining not to select additional fields, the field-level data profiling information is stored in the database system at 3716.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of cloud computing environments. However, the techniques of the present invention apply to a wide variety of computing environments, such as privately operated database systems. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A database system comprising:

a storage system storing a first data set including a first plurality of database records including a first plurality of database values corresponding to a first plurality of database fields and a second data set including a second plurality of database records including a second plurality of database values corresponding to a second plurality of database fields;

a data source profiler determining data set profiling information for the first plurality of database fields and the second plurality of data fields, the data set profiling information including a plurality of field-level statistics summarizing the first plurality of database values and the second plurality of database values;

a data source unifier (1) determining one or more operations to unify the first data set and the second data set based on the data set profiling information, (2) determining an estimated level of computing resources for executing the one or more operations, (3) determining whether the estimated level of computing resources exceeds a designated threshold, (4) determining a sampling strategy for selecting a subset of first data set and the second data set upon determining that the estimated level of computing resources exceeds the designated threshold, the sampling strategy being determined based on the data set profiling information, (5) selecting the subset based on the sampling strategy, (6) executing the one or more operations on the subset to determine data unification information linking the first data set and the second data set, and (7) storing the data unification information in the storage system.

2. The database system recited in claim 1, wherein the one or more operations include merging or linking the first data set with the second data set.

3. The database system recited in claim 1, wherein the one or more operations include resolving a plurality of entities referenced in one or more of the first plurality of database fields.

4. The database system recited in claim 1, wherein the sampling strategy includes selecting the subset based at least in part on a random number generator.

5. The database system recited in claim 1, wherein the sampling strategy includes selecting all database records that satisfy one or more identified characteristics.

6. The database system recited in claim 5, wherein the one or more identified characteristics includes a database record group value associated with a database field of the plurality of database record fields, the subset including all database records having a database value matching the database record group value for the database field.

7. The database system recited in claim 1, wherein the sampling strategy includes selecting all database fields that satisfy one or more identified characteristics.

8. The database system recited in claim 7, wherein the one or more identified characteristics include a first criteria excluding database fields that are always filled or that are never filled.

9. The database system recited in claim 1, wherein a field-level statistic of the plurality of field-level statistics characterizes a proportion of database field values that are populated for a corresponding database field.

10. The database system recited in claim 1, further comprising:

a field evaluator configured to determine a relation between the plurality of database fields and one or more outcome field values based on the plurality of field-level statistics, the relation identifying a correlation between a population rate for the database fields and the one or more outcome field values.

11. The database system recited in claim 1, wherein the database system resides in a shared infrastructure cloud computing environment configured to provide computing services to a plurality of entities via the Internet.

12. The database system recited in claim 11, wherein the estimated level of computing resources corresponds to a number of credits within the shared infrastructure cloud computing environment.

13. The database system recited in claim 1, further comprising a configuration engine configured to provide a graphical user interface facilitating configuration of the data source profiler, the graphical user interface facilitating specification of the sampling strategy.

14. The database system recited in claim 1, wherein the data profiler is further configured to determine a net fill rate for a database field of the plurality of database fields, the net fill rate indicating indicate a number or proportion of corresponding database field values that have a filled value that is different from a default value.

15. The database system recited in claim 1, wherein the data profiler is further configured to determine a distinct value density for a database field of the plurality of database fields, the distinct value density indicating a percentage of distinct values for the database field relative to the number of database records in the first plurality of database records.

16. A method implemented in a cloud-accessible database system, the method comprising:

accessing from a storage system a first data set including a first plurality of database records including a first plurality of database values corresponding to a first plurality of database fields and a second data set including a second plurality of database records including a second plurality of database values corresponding to a second plurality of database fields;

determining data set profiling information for the first plurality of database fields and the second plurality of data fields via a data source profiler, the data set profiling information including a plurality of field-level statistics summarizing the first plurality of database values and the second plurality of database values;

determining one or more operations to unify the first data set and the second data set based on the data set profiling information;

determining an estimated level of computing resources for executing the one or more operations;

determining whether the estimated level of computing resources exceeds a designated threshold;

determining a sampling strategy for selecting a subset of first data set and the second data set upon determining that the estimated level of computing resources exceeds the designated threshold, the sampling strategy being determined based on the data set profiling information;

selecting the subset based on the sampling strategy;

executing the one or more operations on the subset to determine data unification information linking the first data set and the second data set; and storing the data unification information in the storage system.

17. The method recited in claim 16, wherein the sampling strategy includes selecting all database records that satisfy one or more identified characteristics including a database record group value associated with a database field of the plurality of database record fields, the subset including all database records having a database value matching the database record group value for the database field.

18. The method recited in claim 16, wherein the sampling strategy includes selecting all database records that satisfy one or more identified characteristics, wherein the one or more identified characteristics includes a database record group value associated with a database field of the plurality of database record fields, the subset including all database records having a database value matching the database record group value for the database field.

19. One or more non-transitory computer readable media having instructions stored thereon for performing a method implemented in a cloud-accessible database system, the method comprising:

accessing from a storage system a first data set including a first plurality of database records including a first plurality of database values corresponding to a first plurality of database fields and a second data set including a second plurality of database records including a second plurality of database values corresponding to a second plurality of database fields;

determining data set profiling information for the first plurality of database fields and the second plurality of data fields via a data source profiler, the data set profiling information including a plurality of field-level statistics summarizing the first plurality of database values and the second plurality of database values;

determining one or more operations to unify the first data set and the second data set based on the data set profiling information;

determining an estimated level of computing resources for executing the one or more operations;

determining whether the estimated level of computing resources exceeds a designated threshold;

determining a sampling strategy for selecting a subset of first data set and the second data set upon determining that the estimated level of computing resources exceeds the designated threshold, the sampling strategy being determined based on the data set profiling information;

selecting the subset based on the sampling strategy;

executing the one or more operations on the subset to determine data unification information linking the first data set and the second data set; and storing the data unification information in the storage system.

20. The one or more non-transitory computer readable media recited in claim 19, wherein the sampling strategy includes selecting all database records that satisfy one or more identified characteristics including a database record group value associated with a database field of the plurality of database record fields, the subset including all database records having a database value matching the database record group value for the database field.

* * * * *